US009432802B2

(12) United States Patent
Matsushita et al.

(10) Patent No.: US 9,432,802 B2
(45) Date of Patent: Aug. 30, 2016

(54) COMMUNICATION DEVICE AND COMMUNICATION SYSTEM

(71) Applicants: Yusuke Matsushita, Kanagawa (JP); Seiji Miyawaki, Kanagawa (JP); Yasuo Ohashi, Kanagawa (JP); Michitaka Fukuda, Kanagawa (JP); Shin Kusakari, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP)

(72) Inventors: Yusuke Matsushita, Kanagawa (JP); Seiji Miyawaki, Kanagawa (JP); Yasuo Ohashi, Kanagawa (JP); Michitaka Fukuda, Kanagawa (JP); Shin Kusakari, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 13/923,596

(22) Filed: Jun. 21, 2013

(65) Prior Publication Data
US 2014/0004879 A1 Jan. 2, 2014

(30) Foreign Application Priority Data

Jun. 27, 2012 (JP) ................. 2012-144140
Mar. 14, 2013 (JP) ................. 2013-052514

(51) Int. Cl.
H04W 4/04 (2009.01)
H04W 12/00 (2009.01)
H04W 28/02 (2009.01)
H04W 4/02 (2009.01)

(52) U.S. Cl.
CPC ..................... H04W 4/02 (2013.01)

(58) Field of Classification Search
CPC ................. H04W 4/02; H04W 4/021–4/023; H04W 12/00; H04W 12/06; H04W 12/08; H04W 40/20; H04W 40/205; H04W 64/00; H04W 64/003; H04W 64/006
USPC ........ 455/456.1–456.6, 404.2, 433, 440, 457
See application file for complete search history.

(56) References Cited

U.S. PATENT DOCUMENTS 8,280,398 B2 10/2012 Ishii et al.
2004/0024522 A1* 2/2004 Walker et al. ................ 701/210
(Continued)

FOREIGN PATENT DOCUMENTS

JP       2005-158007      6/2005
JP    WO2005/086375 A1   9/2005
(Continued)

OTHER PUBLICATIONS
U.S. Appl. No. 13/795,383, filed Mar. 12, 2013.
(Continued)

Primary Examiner — Christopher M Brandt
Assistant Examiner — Ki Ha Nam
(74) Attorney, Agent, or Firm — Harness, Dickey & Pierce, P.L.C.

(57) ABSTRACT

A communication device communicating position information indicative of a position of the communication device with a wireless terminal, includes: a storage section configured to store the position information and a certificate to guarantee correctness of the position information, the certificate being issued upon the position information being authenticated; a sending section configured to send the position information; and a control section configured to control the sending section so that the position information stored in the storage section is sent to the wireless terminal along with the certificate.

16 Claims, 59 Drawing Sheets

(56) References Cited

U.S. PATENT DOCUMENTS

| | | | |
|---|---|---|---|
| 2007/0200756 A1* | 8/2007 | Saito | 342/357.09 |
| 2008/0054072 A1* | 3/2008 | Katragadda | G08G 1/123 235/384 |
| 2009/0217047 A1* | 8/2009 | Akashika | G06F 21/33 713/175 |
| 2010/0298008 A1* | 11/2010 | Burroughs | 455/456.1 |
| 2011/0225427 A1* | 9/2011 | Wood et al. | 713/176 |
| 2012/0328101 A1* | 12/2012 | Lakshminarayanan | 380/258 |
| 2013/0095847 A1* | 4/2013 | Powell | H04W 64/00 455/456.1 |
| 2013/0102324 A1* | 4/2013 | Qiu | H04W 4/023 455/456.1 |
| 2013/0283352 A1* | 10/2013 | Edge et al. | 726/4 |

FOREIGN PATENT DOCUMENTS

| | | |
|---|---|---|
| JP | 2010-159980 | 7/2010 |
| JP | 4620410 | 1/2011 |

OTHER PUBLICATIONS

U.S. Appl. No. 13/784,961, filed Mar. 5, 2013.

* cited by examiner

FIG.11

| FLOOR | LATITUDE | LONGITUDE | BUILDING |
|---|---|---|---|
| 16 | 35.459555 | 139.387110 | C |

FIG.12

| FLOOR | LATITUDE | LONGITUDE | BUILDING |
|---|---|---|---|
| 16 | 35.459555 | 139.387110 | C |

FIG.13

| FLOOR, 9 BITS | LATITUDE, 21 BITS | LONGITUDE, 21 BITS | BUILDING, 8 BITS |
|---|---|---|---|

FIG.14

| ID INFO | LATITUDE | LONGITUDE | FLOOR | BUILDING | RECEIVED DATE-TIME | DEVICE NAME | OWNER DIVISION |
|---|---|---|---|---|---|---|---|
| 002673abcdef01 | 35.459555 | 139.387110 | 16 | C | 11/12/12 13:30:01 | PJ WX4310 | SALES DIVISION 1 |
| 002673abcdef02 | 35.459483 | 139.388437 | 4 | A | 11/12/12 13:30:03 | UCS P3000 | SALES DIVISION 1 |
| .. | .. | .. | .. | .. | .. | .. | |
| .. | .. | .. | .. | .. | .. | .. | |

FIG.16

LOCATION SEARCH SYSTEM

| OWNER DIVISION | DEVICE NAME |
|---|---|
| SALES DIVISION 1 | PJ WX4310 |
| | UCS P3000 |
| | .. |
| | .. |
| SALES DIVISION 2 | PJ WX3231N No.1 |
| | PJ WX3231N No.2 |
| | PJ WX3231N No.3 |

EXECUTE SEARCH

FIG.30

| RECIPIENT | SENDER | DATA CONTENT |

FIG.34

| TERMINAL ID INFO | DEVICE NAME | OWNER/ ADMINISTRATOR NAME | POSITION INFO x ||||  RECEIVED DATE-TIME |
|---|---|---|---|---|---|---|---|
| | | | LATITUDE | LONGITUDE | FLOOR | BUILDING | |
| 002673abcd01 | PJ WX4310 | SALES DIVISION 1 | 35.459555 | 139.387110 | 16 | C | 11/12/12 13:30:01 |
| 002673abcd02 | UCS P3000 | SALES DIVISION 2 | 35.459483 | 139.388437 | 4 | A | 11/12/12 13:30:03 |
| ... | ... | ... | ... | ... | ... | ... | ... |
| ... | ... | ... | ... | ... | ... | ... | ... |

FIG.55

| MANAGEMENT ID | ID INFO | LATITUDE | LONGITUDE | FLOOR | BUILDING | RECEIVED DATE-TIME | ... |
|---|---|---|---|---|---|---|---|
| 1 | 002673abcd01 | 35.50413 | 139.62082 | 1 | Y | 2013/1/10 11:22:05 | ... |
| 2 | 002673abcd02 | 35.55711 | 139.72015 | 3 | Y | 2013/1/10 11:22:40 | ... |
| 3 | 002673abcd03 | 35.66660 | 139.76520 | 2 | X | 2013/1/10 11:22:21 | ... |
| 4 | 002673abcd04 | 35.50426 | 139.62051 | 1 | Y | 2013/1/10 11:21:57 | ... |
| 5 | 002673abcd05 | 35.50427 | 139.62052 | 1 | Y | 2013/1/10 11:22:02 | ... |
| 6 | 002673abcd06 | 35.50409 | 139.62032 | 1 | Y | 2013/1/10 11:21:55 | ... |
| 7 | 002673abcd07 | 35.50432 | 139.62013 | 1 | Y | 2013/1/10 11:21:52 | ... |
| ... | ... | ... | ... | ... | ... | ... | ... |
| 10 | 002673abcd10 | 35.86210 | 142.76314 | 7 | Z | 2013/1/9 16:32:30 | ... |
| ... | ... | ... | ... | ... | ... | ... | ... |

| MANAGEMENT SERVER ID | MANAGEMENT SERVER ID INFO | MANAGED BUILDING NAME | MANAGED BUILDING ADDRESS | EAST END | WEST END | SOUTH END | NORTH END | ... |
|---|---|---|---|---|---|---|---|---|
| 1 | 0012345678a | FACILITY A | TOKYO... | 139.62101 | 139.62003 | 35.50400 | 35.50450 | ... |
| 2 | 0012345678b | FACILITY B | KANAGAWA... | 139.62101 | 139.62003 | 35.50470 | 35.50540 | ... |
| ... | ... | ... | ... | ... | ... | ... | ... | ... |

| MSG TYPE, 3 BITS | NOTE |
|---|---|
| 010 | POSITION INFO MANUALLY SET BY ADMINISTRATOR |
| 101 | POSITION INFO NOT SET |
| 110 | ESTIMATED POSITION INFO SET BY A REQUEST |

COMMUNICATION DEVICE AND COMMUNICATION SYSTEM

BACKGROUND OF THE INVENTION

1. Field of the Invention

The disclosures herein generally relate to a communication system.

2. Description of the Related Art

Various position information management systems have been proposed for determining positions of a person or an object that has a wireless terminal in facilities indoors where accurate positioning with GPS or the like is difficult.

Japanese Patent No. 4620410 (referred to as Patent document 1 hereafter) discloses a system in which a passive RF tag attached to a person is read by a fixed RF reader/writer, with which the position of the person is indicated to other wireless terminals or the like.

Japanese Laid-open Patent Application No. 2010-159980 (referred to as Patent document 2 hereafter) discloses a system in which a wireless terminal identifies its own position by converting an identifier sent from a nearby transmitter into position identification information.

WO 2005/086375 (referred to as Patent document 3 hereafter) discloses a system in which a wireless terminal receives intrinsic information from an illuminator, which is sent to a server to identify the position of the wireless terminal.

However, the system in Patent document 1 may increase the initial cost for installing the infrastructure because a number of RF reader/writers may need to be installed for reading passive RF tags whose communication ranges are limited.

Also, the system in Patent document 2 may have considerable power consumption depending on a communication method between a wireless terminal and a server.

Moreover, the system in Patent document 3 does not take power consumption into account as in the system in Patent document 2. It may have a higher computation cost at the server to search for positions associated with the intrinsic information to identify the positions of the wireless terminals.

SUMMARY OF THE INVENTION

It is a general object of at least one embodiment of the invention to provide a position information management system that substantially obviates one or more problems caused by the limitations and disadvantages of the related art.

According to at least one embodiment of the invention, a communication device communicating position information indicative of a position of the communication device with a wireless terminal, includes: a storage section configured to store the position information and a certificate to guarantee correctness of the position information, the certificate being issued upon the position information being authenticated; a sending section configured to send the position information; and a control section configured to control the sending section so that the position information stored in the storage section is sent to the wireless terminal along with the certificate.

Also, according to at least one embodiment of the invention, a communication system includes a wireless terminal and a communication device communicating position information indicative of a position of the communication device with the wireless terminal. The communication device includes: a first storage section configured to store the position information of the communication device, and a certificate to guarantee correctness of the position information, the certificate being issued upon the position information being authenticated; a sending section configured to send the position information and the certificate; and a control section configured to control the sending section so that the position information stored in the first storage section is sent to the wireless terminal along with the certificate. The wireless terminal includes: a second storage section configured to store a decryption key to decrypt the certificate, the decryption key being issued along with the certificate; a receiving section configured to receive the position information from the communication device, and the certificate; and a decryption section configured to decrypt the certificate received by the receiving section, with the decryption key stored in the second storage section.

According to at least one embodiment of the invention, it is possible to provide a position information management system that can manage position information efficiently.

BRIEF DESCRIPTION OF THE DRAWINGS

Other objects and further features of embodiments will be apparent from the following detailed description when read in conjunction with the accompanying drawings, in which:

FIG. 11 is a schematic view illustrating information held by a communication device according to an embodiment of the invention;

FIG. 12 is a schematic view illustrating information held by a wireless terminal according to an embodiment of the invention;

FIG. 13 is a schematic view illustrating a format of position information sent by a wireless terminal according to an embodiment of the invention;

FIG. 14 is a schematic view illustrating information held by a management server according to an embodiment of the invention;

FIG. 16 is a schematic view illustrating a search screen on a management server according to an embodiment of the invention;

FIG. 30 is a schematic view illustrating a data structure including position information according to an embodiment of the invention;

FIG. 34 is a schematic view illustrating management information managed by a position information management system according to an embodiment of the invention;

FIG. 55 is a schematic view illustrating information stored in a communication-terminal-position storage section of a management server according to an embodiment of the invention;

FIG. 56 is a schematic view illustrating information stored in a management-server-information storage section of an authentication server according to an embodiment of the invention;

FIG. 60 is a table for operations executed by a position information setting system according to another modified example of an embodiment of the invention.

DESCRIPTION OF THE PREFERRED EMBODIMENTS

In the following, embodiments of the invention will be described with reference to the accompanying drawings.

First Embodiment

1. System
2. Hardware configuration example
3. Functions
4. Operational sequence <1. System>

Figure 1:
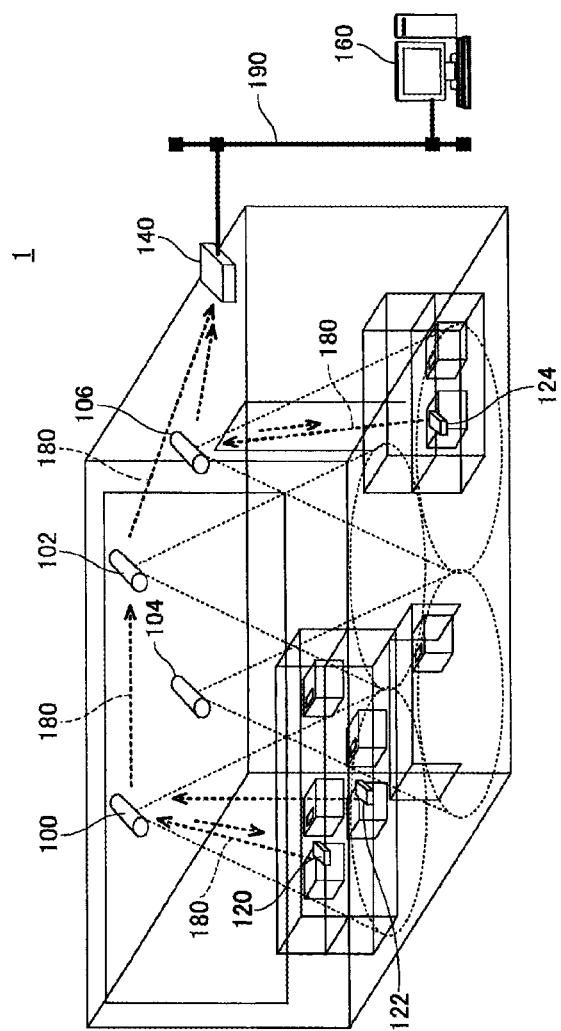
FIG. 1 is a schematic view illustrating a position information management system according to an embodiment of the invention.

FIG. 1 is a schematic view illustrating a position information management system 1 according to the present embodiment. The position information management system 1 includes a communication device 100, communication terminals, a management device 140, and a management server 160. In the following, it is assumed that the communication terminals are wireless terminals, and the position information management system 1 includes communication devices 100, 102, 104, and 106, and wireless terminals 120, 122, and 124, a management device 140, a management server 160, a network 180 configured with the communication devices, the wireless terminals and the management device, and a network 190. Here, the network 180 is a wireless network managed by the management device 140.

In the following, when referring to the wireless terminals 120, 122, and 124 where explicit distinction of these is not required, it may be referred to as a/the wireless terminal 120 or (the) wireless terminals 120. Also, communication devices 100, 102, 104, and 106 may be referred to as a/the communication device 100 or (the) communication devices 100.

Figure 2:
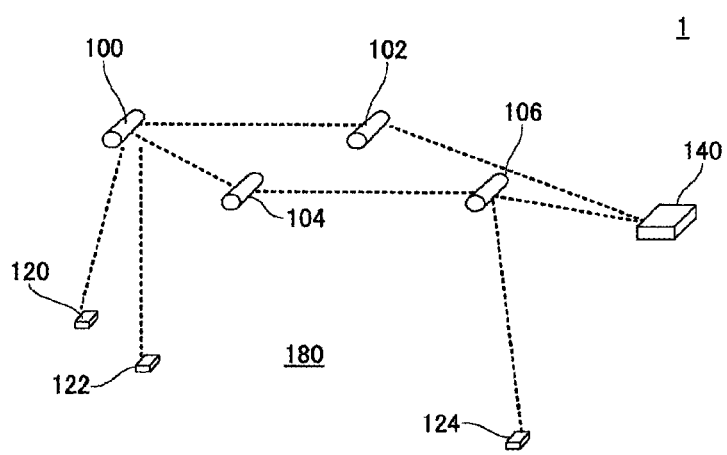
FIG. 2 is a schematic view illustrating a network configuring a position information management system according to an embodiment of the invention.

FIG. 2 is a schematic view of the wireless network 180 configured with the communication devices 100-106, the wireless terminals 120-124, and the management device 140, extracted from FIG. 1.

The communication devices 100-106 are, for example, fixed on a ceiling or the like in a room, which send position information of the fixed position including latitude, longitude, floor, building, etc., with continuous or intermittent wireless communication. The communication devices 100-106 are included in independent cases to which power is fed from a power source installed in advance in a facility, or are built into illuminators, such as LED fluorescent light tubes that feed power to the communication devices 100-106 to operate. Each of the communication devices 100-106 sends its own position information by a wireless signal within a predetermined area. The predetermined area is defined by the signal strength of a wireless signal used for communication. The communication devices 100-106 are disposed so that the predetermined areas are covered, and the areas are not overlapped with each other. Alternatively, overlaps may be allowed as long as one of the communication devices 100-106 can be identified by the signal strength of the wireless signals when the signals are received at a location where the areas are overlapped. In the example shown in FIG. 1, the predetermined areas are designated by dotted lines forming cones. As for a communication method to send position information, for example, an IMES (Indoor Messaging System) signal may be used.

The wireless terminals 120-124 can receive wireless signals sent by nearby communication devices among the communication devices 100-106. In FIG. 1, the wireless terminals 120-124 are attached to box-shaped objects whose positions need to be managed.

These objects will be referred to as position information managed objects, or managed objects, hereafter. The wireless terminal 120-124 are terminals that can send wireless signals from themselves such as active tags. The wireless terminal 120 will be described in the following.

<Wireless Terminal 120>

The wireless terminal 120 is positioned in an area where a wireless signal sent from the communication device 100 can be received so that the position information of the communication device 100 is received, for example, with IMES. The wireless terminal 120 sends the received position information along with ID information that identifies itself, for example, the network address of the wireless terminal 120, back to the communication device 100. The transmission is done by, for example, NFC (Near Field Communication), such as IEEE 802.15.4 and ZigBee abbreviated address in IEEE 802.15.4 or an IEEE extended (MAC) address may be used as the ID (identification) information of the wireless terminal 120. Next, the ID information and position information sent to the communication device 100 is sent to the management device 140 via the adjacent communication device 102. Here, the sending/receiving operation at the wireless terminal 120 is executed at a predetermined timing by the wireless terminal 120, or when an acceleration change is detected by an acceleration sensor that may be included in the wireless terminal 120.

The management device 140 is a bridge between the network 180 and network 190 to transfer data sent from the network 180 to the network 190. The management device 140 is installed, for example, in each floor in a building, or in each room partitioned by walls on a floor. If the network 180 is a PAN (Personal Area Network) based on IEEE 802.15.4 and ZigBee (trademark), and the network 190 is a LAN based on IEEE 802.3 standard, the management device 140 converts the communication methods between the networks 180 and 190. Also, if the ID information of the wireless terminal 120 is represented with an abbreviated address based on IEEE 802.15.4, the management device 140 converts the abbreviated address into an IEEE extended address based on PAN configuration information, to send the converted address to the management server 160.

The management server 160 records the ID information and the position received via the management device 140 with received date and time, to manage positions of the communication devices. The management server 160 has a list of managed objects attached with the wireless terminals 120-124 in advance. Thus, using the above information, positions of the managed objects can be identified.

The network 180 is a PAN connecting the communication devices 100-106, the wireless terminals 120-124, and the management device 140, based on a standard, for example, IEEE 802.15.4 and ZigBee (trademark). If the PAN is configured with the standards of IEEE 802.15.4 and ZigBee (trademark), the wireless terminals 120-124, the communication devices 100-106, and the management device 140 are end devices, routers, and a coordinator, respectively, defined in the ZigBee (trademark) standard. When started up, each of the communication devices 100-106 and wireless terminals 120-124 is built into the PAN managed by the management device 140, and the shortest path to the management device 140 is determined.

The network 190 is a network for connecting the management device 140 and the management server 160 with each other, which may be, for example, a LAN based on the IEEE 802.3 standard.

As described above, in the position information management system 1, the wireless terminals 120-124 can send their ID information and position information to the management server 140 using minimal power for communication with one of the communication devices 100-106 nearby. Therefore, new infrastructure does not need to be constructed when installing the communication devices 100-106, which reduces the installation cost.

Here, position information of the communication devices 100-106 may be transmitted via the network 180. In this case, IMES is not required to send the position information.

Also, the wireless terminals 120-124 may send the ID information and the position information directly to the management device 140 if the management device 140 is located closer than the communication devices 100-106 that normally send the position information. In this case, the ID information and the position information can be sent to the management server 160 via the shortest path.

Also, the management server 160 may include functions of the management device 140. In this case, the separate management device 140 is not required.

Also, the wireless terminals 120-124 may be wireless terminals such as smart phones, PDAs, PCs, or smart meters that have equivalent functions as active tags. In this case, position information of an existing wireless terminal can be incorporated to the position information management system 1 without attaching a tag.

Also, in addition to the position information described above, finer information may be included to identify a position more precisely, for example, information of a partition in a room. In this case, finer position management is possible.

Also, a person may be a managed object. In this case, the position of the person can be managed.

Also, the network 180 may be configured with NFC (Near Field Communication), for example, Bluetooth LE, ANT, or Z-Wave. In this case, position information of a wide variety of wireless terminals can be managed.

Also, the network 190 may include multiple types of networks, for example, the Internet. In this case, it is possible to manage position information of the wireless terminals 120-124 regardless of a physical distance between the network 180 and the management server 160.

<2. Hardware Configuration Example>

Next, hardware configurations of the communication device 100, the wireless terminal 120, the management device 140, and the management server 160 in the position information management system 1 will be described with reference to FIG. 3, FIG. 4, FIG. 5, and FIG. 6, respectively.

Figure 3:
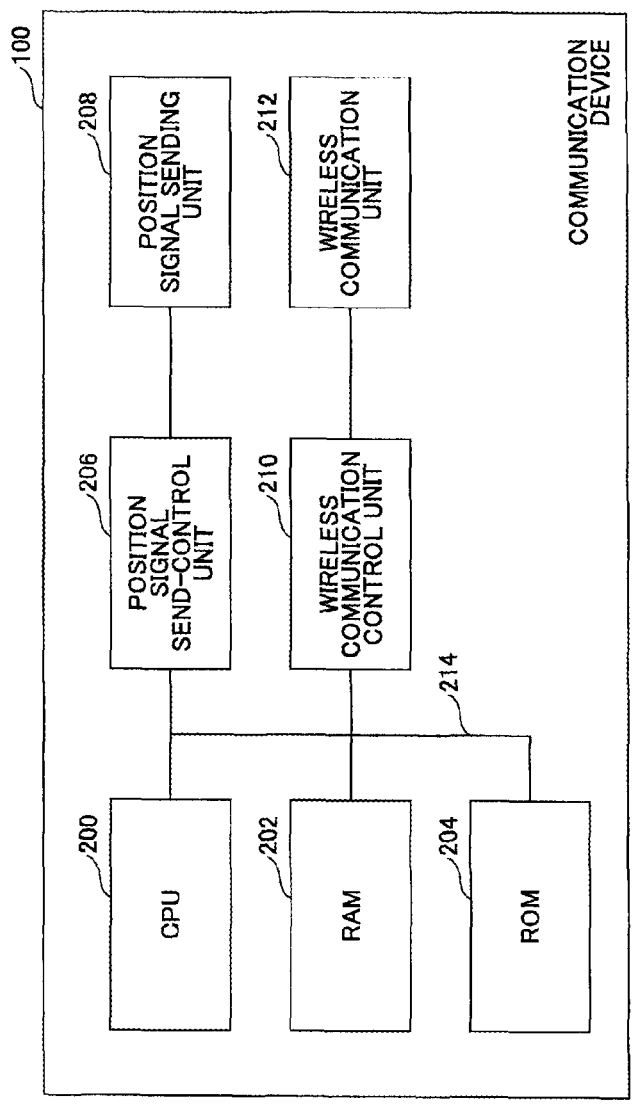
FIG. 3 is a hardware configuration diagram of a communication device according to an embodiment of the invention.

FIG. 3 is a hardware configuration diagram of the communication device 100 according to the present embodiment. The communication device 100 includes a CPU 200, a RAM 202, a ROM 204, a position signal send-control unit 206, a position signal sending unit 208, a wireless communication control unit 210, a wireless communication unit 212, and a bus 214.

The CPU 200 executes programs to control the communication device 100. The RAM 202 is used for a work area for the CPU 200. The ROM 204 stores the programs executed by the CPU 200, as well as the position information of the communication device 100. The position signal send-control unit 206 executes operations for sending a positioning signal including the position information of the communication device 100 via the position signal sending unit 208. The position signal sending unit 208 is a unit for sending the positioning signal, for example, an IMES signal, with an antenna. The wireless communication control unit 210 executes wireless communication operations via the wireless communication unit 212. The wireless communication unit 212 is a unit for sending/receiving a radio wave compliant with, for example, the IEEE 802.15.4 standard, with an antenna. The bus 214 electrically connects the above units with each other.

Configured as above, the communication device 100 in the present embodiment can send its position information to the wireless terminal 120, and receive the ID information and the position information from the wireless terminal 120, to send the received information to the management server 160 via the management device 140.

As mentioned above, if the position information is sent with wireless communication, the position signal send-control unit 206 and the position signal sending unit 208 are not required.

Figure 4:
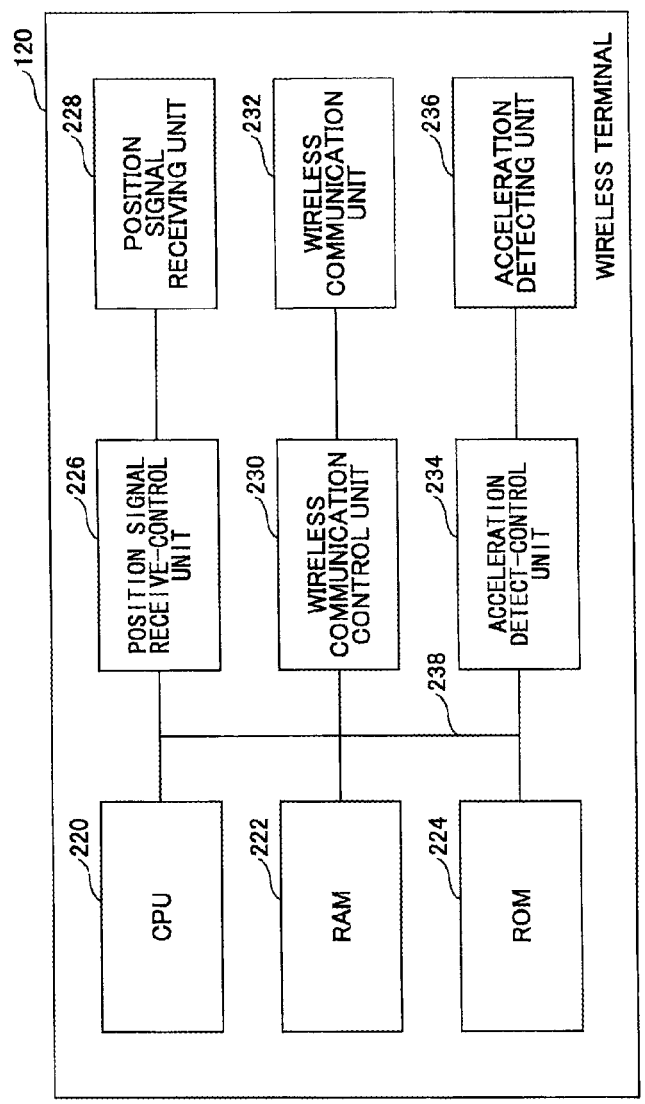
FIG. 4 is a hardware configuration diagram of a wireless terminal according to an embodiment of the invention.

FIG. 4 is a hardware configuration diagram of the wireless terminal according to the present embodiment. The wireless terminal 120 includes the CPU 220, a RAM 222, a ROM 224, a position signal receive-control unit 226, a position signal receiving unit 228, a wireless communication control unit 230, a wireless communication unit 232, an acceleration detect-control unit 234, an acceleration detecting unit 236, and a bus 238.

The CPU 220 executes programs to control the wireless terminal 120. The RAM 222 is used for a work area for the CPU 220. The ROM 224 stores the programs executed by the CPU 200, as well as the ID information of the wireless terminal 120, and the position information of the communication device 100. The position signal receive-control unit 226 executes operations for receiving a positioning signal via the position signal receiving unit 228. The position signal receiving unit 228 is a unit for receiving the positioning signal, for example, an IMES signal, with an antenna. The wireless communication control unit 230 executes wireless communication operations via the wireless communication unit 232. The wireless communication unit 232 is a unit for sending/receiving a radio wave compliant with, for example, the IEEE 802.15.4 standard, with an antenna. The acceleration detect-control unit 234 detects an acceleration change via the acceleration detecting unit 236. The acceleration detecting unit 236 is an acceleration sensor or a motion sensor using, for example, inertial force or magnetism. The bus 238 electrically connects the above units with each other.

Configured as above, the wireless terminal 120 in the present embodiment can receive the position information from the communication device 100, then send the position information and the ID information of the wireless terminal 120 to the communication device 100. Specifically, by sending/receiving a signal at timing when the wireless terminal 120 is moved, the ID information and the position information can be sent effectively.

Here, if the wireless terminal 120 is an information terminal such as a smart phone or a PC, the wireless terminal 120 may include an input control unit for receiving inputs from a user, for example, a touch panel, a dial key, a keyboard, a mouse, etc. The wireless terminal 120 may also include a display device with a screen and a display control unit.

Also, if the wireless terminal 120 includes a GPS antenna and a corresponding control unit, an IMES positioning signal can be received by the antenna, which can be used in the position information management system 1 having its software tuned.

Also, the acceleration detect-control unit 234 and the acceleration detecting unit 236 are optional elements in the configuration. If the acceleration detect-control unit 234 and the acceleration detecting unit 236 are not included, the wireless terminal 120 may send/receive a signal at a predetermined interval or time.

Also, as mentioned above, if the position information is sent with wireless communication, the position signal receive-control unit 226 and the position signal receiving unit 228 are not required.

Figure 5:
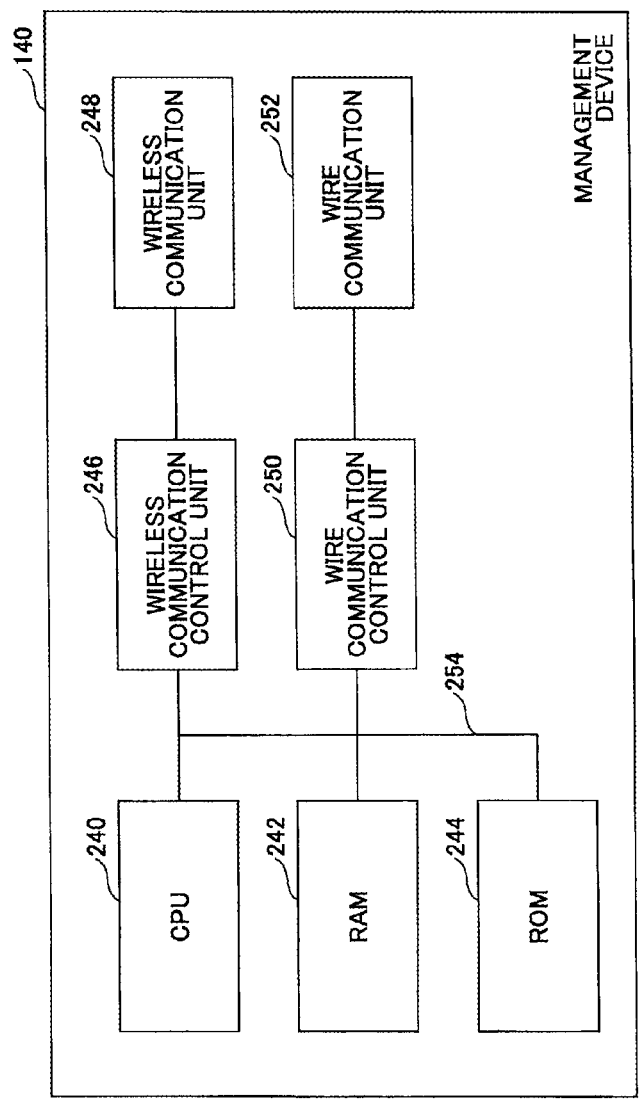
FIG. 5 is a hardware configuration diagram of a management device according to an embodiment of the invention.

FIG. 5 is a hardware configuration diagram of the management device 140 according to the present embodiment. The management device 140 includes a CPU 240, a RAM 242, a ROM 244, a wireless communication control unit 246, a wireless communication unit 248, a wire communication control unit 250, a wire communication unit 252, and a bus 254.

The CPU 240 executes programs to control the management device 140. The RAM 242 is used for a work area for the CPU 240. The ROM 244 stores the programs executed by the CPU 240, as well as data used by the programs. The wireless communication control unit 246 executes wireless communication operations via the wireless communication unit 248. The wireless communication unit 248 is a unit for sending/receiving a radio wave compliant with, for example, the IEEE 802.15.4 standard, with an antenna. The wire communication control unit 250 executes wireless communication operations via the wire communication unit 252. The wire communication unit 252 is a unit that has, for example, a network interface compliant with the IEEE 802.3 standard. The bus 254 electrically connects the above units with each other.

Configured as above, the management device 140 in the present embodiment can convert a signal from the network 180 including the communication device 100 and the wireless terminal 120 into a signal suitable for the network 190 including the management server 160. Also, if the network 180 constituting the PAN is based on ZigBee (trademark), the management device 140 can be a coordinator of ZigBee to control devices participating in the PAN.

Figure 6:
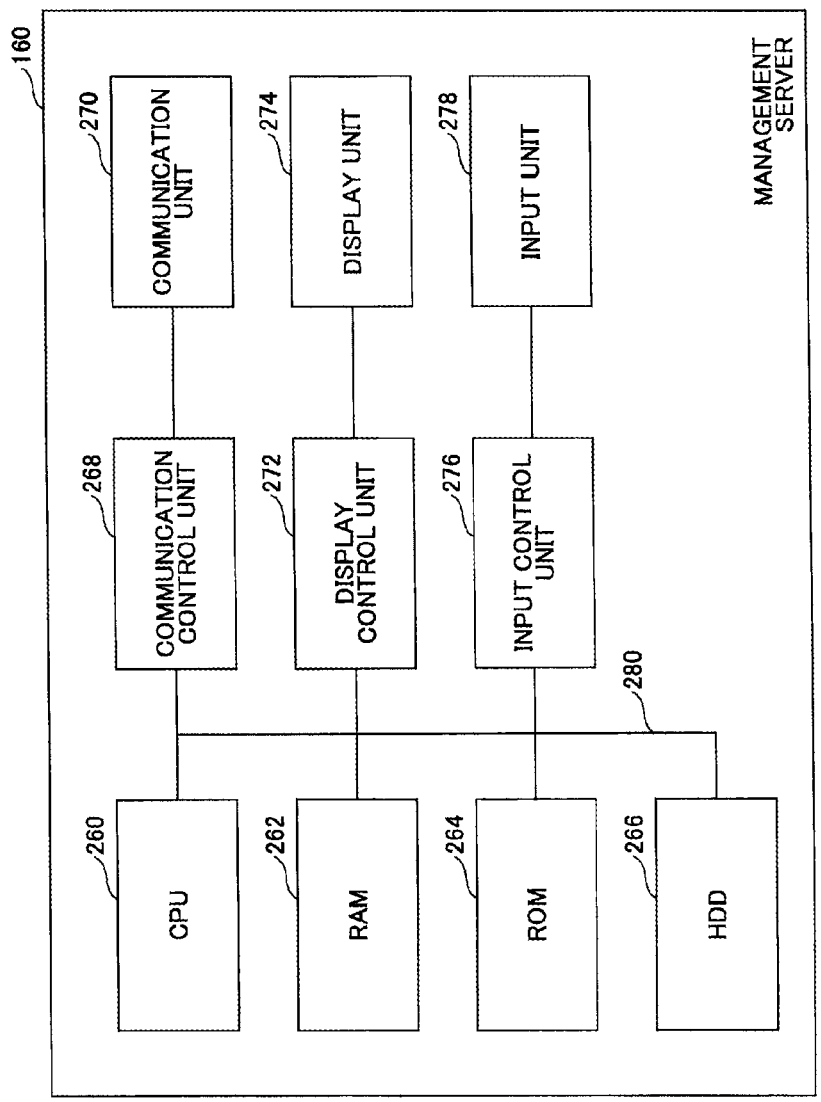
FIG. 6 is a hardware configuration diagram of a management server according to an embodiment of the invention.

FIG. 6 is a hardware configuration diagram of the management server 160 according to the present embodiment. The management server 160 includes a CPU 260, a RAM 262, a ROM 264, an HDD 266, a communication control unit 268, a communication unit 270, a display control unit 272, a display unit 274, an input control unit 276, an input unit 278 and a bus 280.

The CPU 260 executes programs to control the management server 160. The RAM 262 is used for a work area for the CPU 260. The ROM 264 stores the programs executed by the CPU 260, as well as data used by the programs. The HDD 266 stores information for managing the positions of the wireless terminals 120 in the position information management system 1. The communication control unit 268 executes communication operations via the communication unit 270. The communication unit 270 is a unit that has, for example, a network interface compliant with the IEEE 802.3 standard. The display control unit 272 controls content displayed on the display unit 274 in response to operations executed by the programs for managing positions running on the management server 160. The display unit 274 is, for example, an LCD or a CRT display. The input control unit 276 processes signals from the input unit 278, such as a keyboard or a mouse to receive inputs from a user. The bus 280 electrically connects the above units with each other.

Configured as above, the management server 160 in the present embodiment can manage the positions of the wireless terminals 120 to identify places where the wireless terminals 120 are located.

Here, the HDD 266 may be any storage device including a tape drive, or a storage area accessible via a network.

Also, the management server 160 may include the wireless communication control unit 246 and the wireless communication unit 248 in the management device 140 described above, to execute the operations instead of the management device 140. In this case, the management device 140 does not need to be provided separately.

<3. Function>

Figure 7:
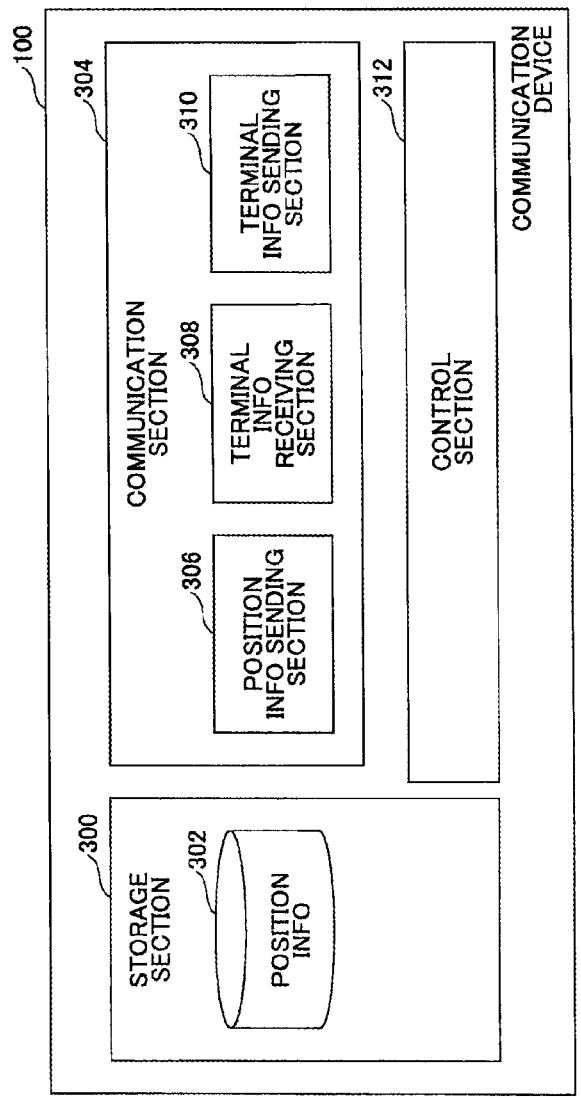
FIG. 7 is a function block diagram of a communication device according to an embodiment of the invention.

FIG. 7 is a function block diagram of the communication device 100 according to the present embodiment. The communication device 100 in the present embodiment includes a storage section 300, a communication section 304 and a control section 312.

The storage section 300 stores position information 302 of the communication device 100. The position information 302 is stored in a table as shown in FIG. 11. A record in the table in FIG. 11 includes fields of floor, latitude, longitude, and building. The floor field represents a floor in a building where the communication device 100 is installed. The latitude and longitude fields represent the latitude and longitude, respectively, of a position where the communication device 100 is located. The building represents the building where the communication device 100 is installed. In FIG. 11, the communication device 100 is located on the 16-th floor in a building "C", at the latitude of 35.459555 deg., and the longitude of 139.387110 deg.

The communication section 304 includes a position information sending section 306, a terminal information receiving section 308, and a terminal information sending section 310.

The position information sending section 306 sends the position information 302 that includes the fields of floor, latitude, longitude, and building to the wireless terminal 120 in the predetermined area, with continuous or intermittent wireless communication. The position information 302 is sent with, for example, a format compliant with IMES.

The terminal information receiving section 308 receives the ID information and the position information sent by the wireless terminal 120.

The terminal information sending section 310 sends the ID information and the position information sent by the wireless terminal 120 to the management server 160 via the management device 140. If the network 180 is configured with ZigBee (trademark) standard, the transmission is executed using routing information held by the communication device 100.

The control section 312 controls behavior of the communication device 100. The control section 312 makes the communication device 100 work as a router in Zigbee (trademark) if the communication device 100, the wireless terminal 120, and the management device 140 configure the PAN with ZigBee.

Configured as above, the communication device 100 in the present embodiment can hold the position information 302, send the position information 302 to the wireless terminal 120, receive the ID information and the position information from the wireless terminal 120, and send the ID information to the management server 160 via the management device 140.

Here, the position information 302 may include additional information such as a name of the building where the communication device 100 is installed, or a partition in a room. In this case, finer position management is possible.

Figure 8:
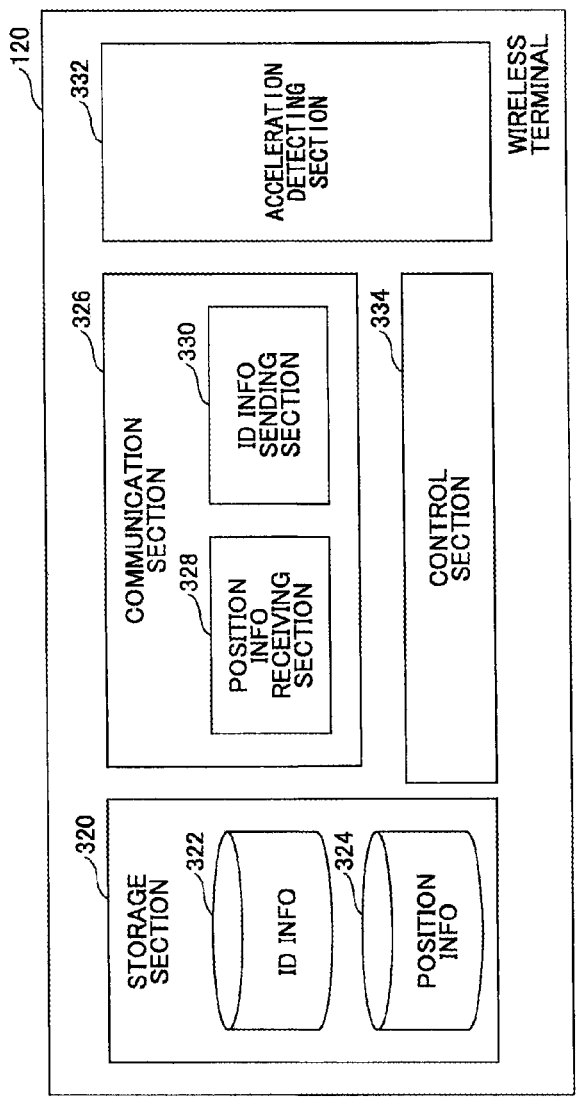
FIG. 8 is a function block diagram of a wireless terminal according to an embodiment of the invention.

FIG. 8 is a function block diagram of the wireless terminal 120 according to the present embodiment. The wireless terminal 120 in the present embodiment includes a storage section 320, a communication section 326, an acceleration detecting section 332, and a control section 334.

The storage section 320 includes ID information 322 and position information 324. The ID information 322 includes information such as the network address of the wireless terminal 120, with which the wireless terminal 120 can be identified in the position information management system 1. For example, if the network 180 is based on the standard of IEEE 802.15.4 and ZigBee (trademark), an abbreviated address in IEEE 802.15.4 or an IEEE extended (MAC) address can be used as the ID information of the wireless terminal 120. The position information 324 is equivalent to the position information 302 sent by the communication device 100. An example of a table for storing the position information 324 is shown in FIG. 12, which has the same structure as the table shown in FIG. 11.

The communication section 326 includes a position information receiving section 328 and an ID information sending section 330.

The position information receiving section 328 receives the position information 302 sent by the communication device 100. The received position information 302 is stored in the storage section 320 of the wireless terminal 120.

The ID information sending section 330 sends the ID information 322 and the position information 324 of the wireless terminal 120 to the communication device 100. The position information 322 is sent to the wireless terminal 120 in a format, for example, the one shown in FIG. 13. The format in FIG. 13 allocates 9 bits, 21 bits, 21 bits, and 8 bits to the fields of floor, latitude, longitude, building, respectively, which are a concatenation of the fields in a received message sent by the IMES standard. This format of the fields is compliant with the IMES standard. In an actual transmission, a header and a check sum prescribed by a communication method are added to the format. As a communication method, for example, the IEEE 802.15.4 and ZigBee (trademark) standards may be used.

The acceleration detecting section 332 detects an acceleration change of the wireless terminal 120. An acceleration change may be detected when, for example, the wireless terminal 120 starts moving, stops moving, starts being tilted, or the like. The detected acceleration change is used to determine timing when the wireless terminal 120 executes a sending/receiving operation.

Here, the acceleration detecting section 332 is an optional element in the configuration.

The control section 334 controls timing when the position information receiving section 238 receives the position information, as well as timing when the ID information sending section 330 sends the ID information 322 and the position information 324. The sending/receiving timing is determined based on an acceleration change detected by the acceleration detecting section 332 or determined at a prescribed interval or time. Also, the sending timing and the receiving timing may be determined independently from each other. In addition, the control section 334 makes the wireless terminal 120 work as an end device of Zigbee if the wireless terminal 120, the communication device 100, and the management device 140 configure the PAN with ZigBee (trademark).

Configured as above, the wireless terminal 120 in the present embodiment effectively receives the position information 324 from the communication device 100, and effectively sends the position information 324 and the ID information 322 to the communication device 100.

Here, if the wireless terminal 120 is an information terminal such as a smart phone or a PC, the wireless terminal 120 may include an input control section for receiving inputs from a user, and a display section to provide information to a user. In this case, it is possible for a user to view, input and modify the ID information and the position information.

Figure 9:
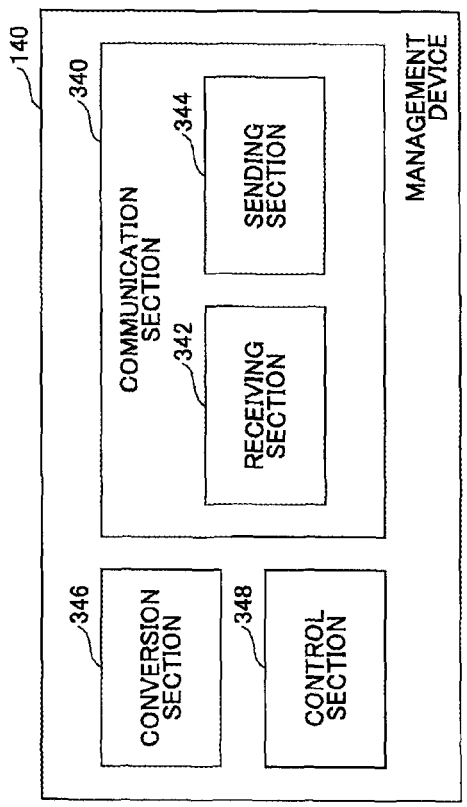
FIG. 9 is a function block diagram of a management device according to an embodiment of the invention.

FIG. 9 is a function block diagram of the management device 140 according to the present embodiment. The management device 140 in the present embodiment includes a communication section 340, a conversion section 346, and a control section 348.

The communication section 340 includes a receiving section 342 and a sending section 344. The receiving section 342 receives data sent by a communication device 100 or a wireless terminal 120 in the network 180. The sending section 344 sends the data converted by the management device 140 to the management server 160 in the network 190. The network 180 is the PAN based on, for example, the standard of IEEE 802.15.4 and ZigBee (trademark). The network 190 is, for example, a LAN based on IEEE 802.3 standard.

The conversion section 346 converts the data received by the receiving section 342 from the network 180 into a format suitable for the network 190. The converted data is sent to the management server 160 by the sending section 344 via the network 190. Here, if the ID information of the wireless terminal 120 included in the data is represented with an abbreviated address of IEEE 802.15.4, it is converted into an IEEE extended address based on the PAN configuration information.

The control section 348 controls behavior of the management device 140. The control section 348 makes the management device 140 work as a coordinator of Zigbee if the management device 140, the communication device 100, and the wireless terminal 120 configure a PAN with ZigBee (trademark).

Configured as above, the management device 140 in the present embodiment can bridge communications between the network 180 that includes the communication devices 100 and the wireless terminals 120, and the network 190 that includes the management server 160.

Figure 10:
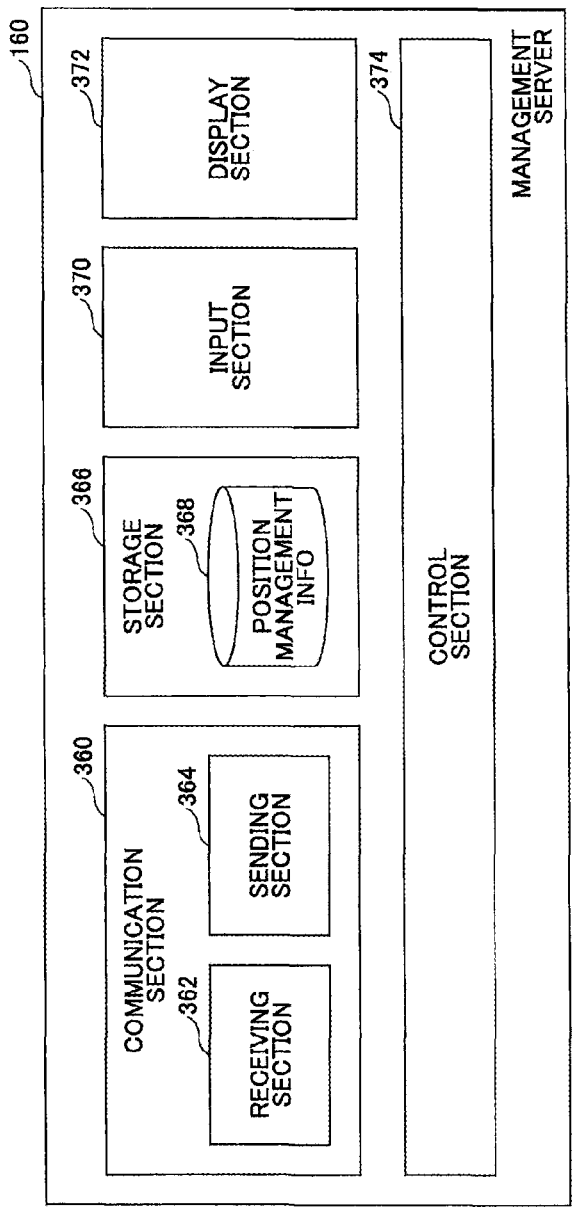
FIG. 10 is a function block diagram of a management server according to an embodiment of the invention.

FIG. 10 is a function block diagram of the management server 160 according to the present embodiment. The management server 160 in the present embodiment includes a communication section 360, a storage section 366, an input section 370, a display section 372, and a control section 374.

The communication section 360 includes a receiving section 362 and a sending section 364. The receiving section 362 receives the ID information and the position information sent by the wireless terminal 120 via the management device 140. The received ID information is stored in the storage section 366. The sending section 364 sends position information to an external server or the like, if receiving a request for position information.

The storage section 366 includes position management information 368. The position management information 368 includes the ID information and the position information received from the wireless terminal, with added management information such as received date and time. An example of a table for storing the position management information 368 is shown in FIG. 14. The table in FIG. 14 includes fields of ID information, device name, owner division, latitude, longitude, floor, building, and received date-time. The ID information field represents an ID of the wireless terminal 120 that sends the ID information, which is, for example, an IEEE extended address. The fields of latitude, longitude, floor, and building correspond to the position information received along with the ID information. The received date-time field represents the date and time when the management server 160 receives the information. The device name field represents the name of a managed object to which the wireless terminal 120 is attached, or the device name of the wireless terminal 120. The owner division field represents the name of a division that owns the wireless terminal 120 that sends the information. The device name and the owner division are associated with the ID information by the management server 160 in advance.

The input section 370 receives inputs from a user when the user searches for the positions of managed objects.

Figure 17:
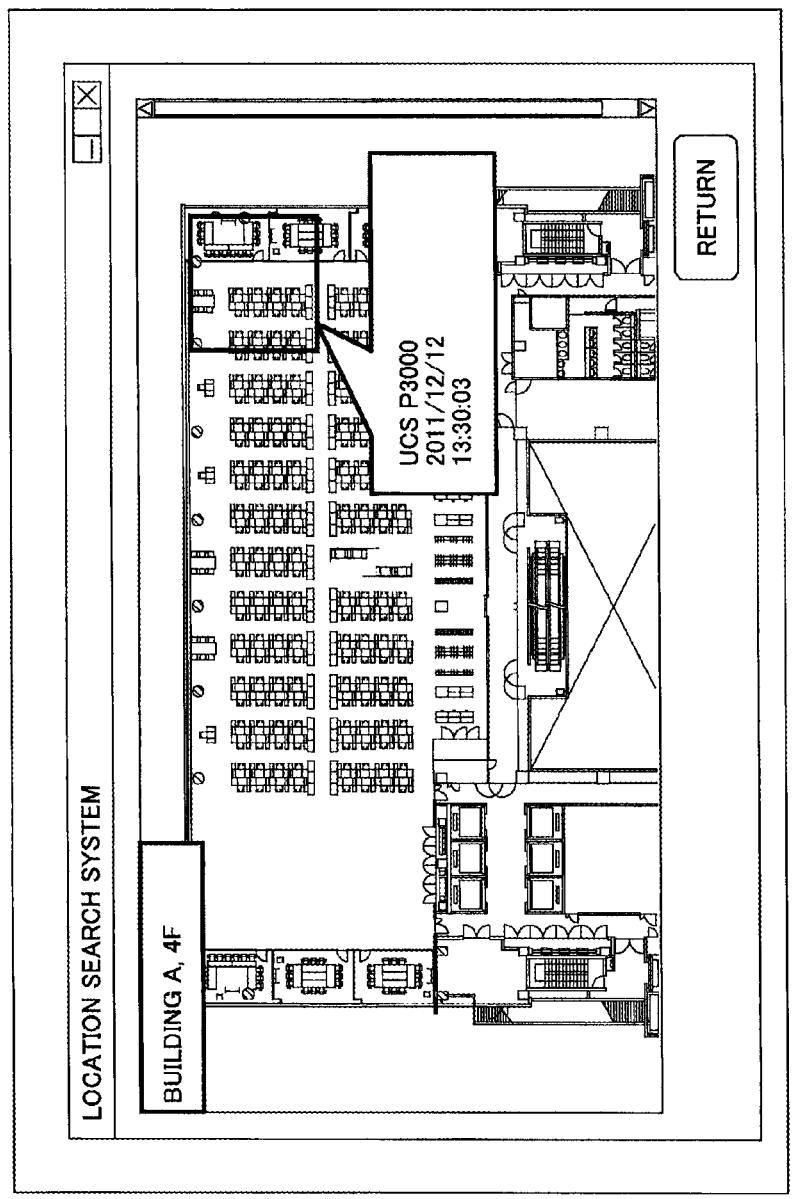
FIG. 17 is a schematic view illustrating a search result screen on a management server according to an embodiment of the invention.

The display section 372 displays a GUI on a screen when the user searches for the positions of the managed objects. An example of the search screen is shown in FIG. 16. A "location search system" shown in FIG. 16 displays a list of owner divisions and device names on a screen based on information stored in the storage section 366. If a user selects a check box of a device to be searched for via the input section 370, a check mark is attached. After having attached the check marks to devices to be searched for, the user selects the "Execute search" button to start a search for the devices, to display a search result screen. In FIG. 16, a user searches for a device "UCS P3000" owned by "Sales Division 1". The search result screen is shown in FIG. 17. When the "Execute search" button is selected, the display section 372 displays a floor layout of the fourth floor of the building A where the "UCS P3000" is located, the device name and the received date and time according to the data stored in the storage section 366.

The control section 374 controls behavior of the management server 160.

Configured as above, the management server 160 in the present embodiment can manage the positions of the wireless terminals to be searched for. It is noted that a search can be done without much computation because the positions of the wireless terminals are directly received and managed.

Alternatively, the management server 160 may include the functions of the conversion section 346, the control section 348 and the receiving section 342 of the management device 140. In this case, the management device 140 does not need to be provided separately.

Also, the position management information 368 stored in the management server 160 may include the date and time when a wireless terminal 120 sends the information, the ID of a communication device 100 or the management device 140 that relays the information, the elapsed time to receive the information, and electric field strength, along with or instead of the information shown in FIG. 14. In this case, position information can be managed with detailed conditions.

Also, the management server 160 may record past position information of the wireless terminals 120. In this case, movement of the wireless terminals 120 can be followed.

<4. Operational Sequence>

Figure 15:
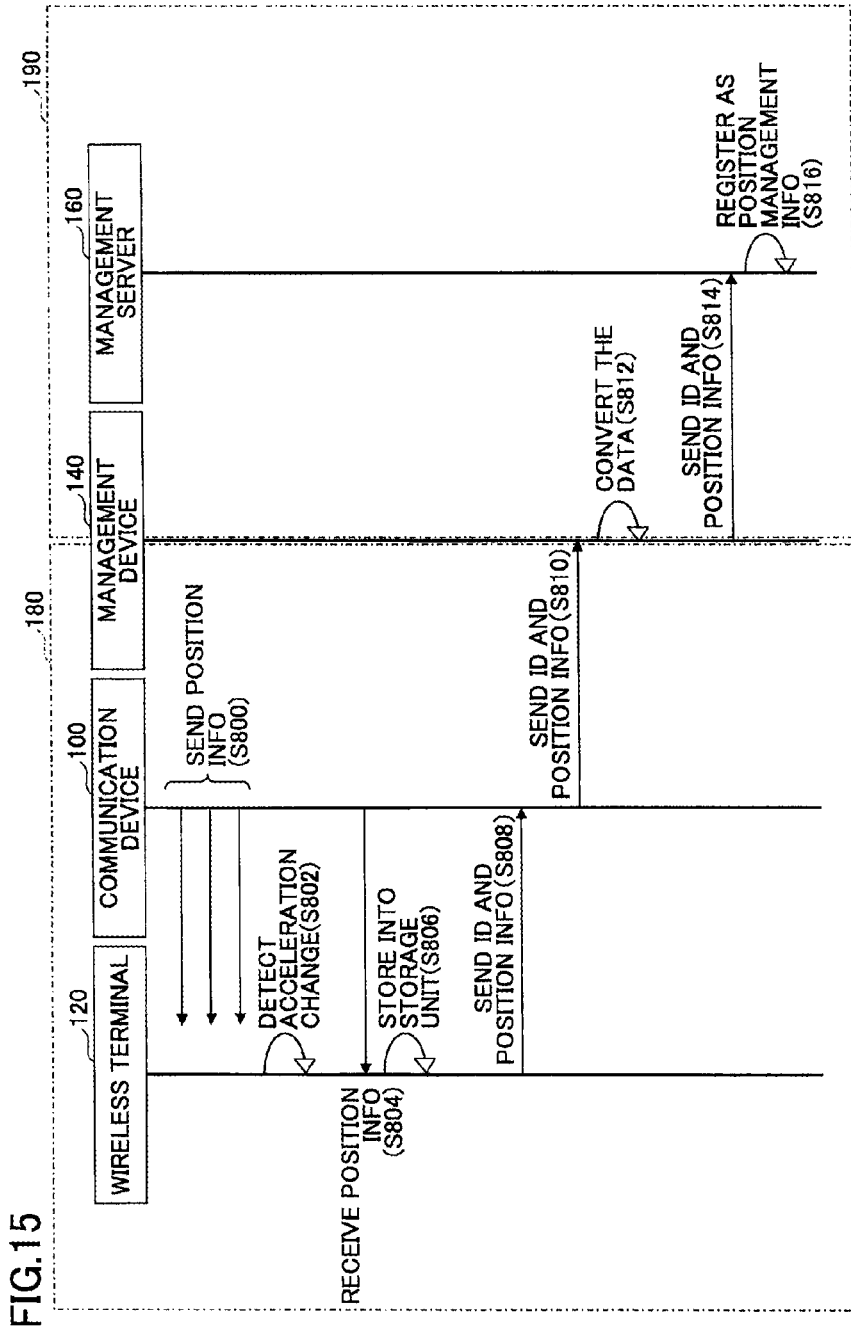
FIG. 15 is a schematic view illustrating an operational sequence of a position information management system according to an embodiment of the invention.

FIG. 15 is a schematic view illustrating an operational sequence of the position information management system 1 according to the present embodiment. In FIG. 15, an example is explained, which includes: the wireless terminal 120 that receives position information when an acceleration change is detected to send the ID information; the communication device 100 to send the position information to an area where the wireless terminal 120 is located; the management device 140 to bridge the PAN (IEEE 802.15.4 and ZigBee (trademark)) and the LAN (IEEE 802.3); and the management server 160. It is assumed that the PAN has been established among the communication device 100, the wireless terminal 120, and the management device 140.

At Step S800, the communication device 100 sends the position information continuously or intermittently using IMES or the like.

At Step S802, the wireless terminal 120 detects an acceleration change.

At Step S804, the wireless terminal 120 receives the position information sent by the communication device 100.

At Step S806, the wireless terminal 120 stores the position information.

At Step S808, the wireless terminal 120 sends its ID information and the received position information to the communication device 100.

At Step S810, the communication device 100 sends the ID information and position information received from the wireless terminal 120 to the management device 140 via the shortest path.

At Step S812, the management device 140 converts the data received in the network 180 including the ID information and position information sent by the communication device 100 into data suitable in the network 190.

At Step S814, the management device 140 sends the ID information and position information converted into the data suitable in the network 190 to the management server 160.

At Step S816, the management server 160 registers the ID information and position information received from the management device 140 as management information of the wireless terminal 120.

With the above steps executed in the position information management system 1 in the present embodiment, a wireless terminal 120 sends its ID information and the position information to a nearby communication device 100 effectively, which reduces power consumption of the wireless terminal 120.

Here, as mentioned above, the management server 160 may include and execute the functions of the management device 140. In this case, the management device 140 does not need to be provided separately.

Also, if the wireless terminal 120 does not include the acceleration detecting section 332, Step S802 is not executed. In this case, the receiving of the position information at Step S804 is executed at a predetermined time or a predetermined interval. In this case, the following steps are the same as Steps S806-S816.

In the above example, the communication device 100 sends the position information 302 stored in the storage section 300 by the position signal sending unit 208. The position signal sending unit 208 sends the position information 302, for example, as an IMES message.

The wireless terminal 120 receives the position information from the communication device 100, then sends the received position information with the ID of the wireless terminal 120.

In such a position information management system as described above, it is desirable to secure genuineness of position information.

Especially, if an IMES message is used whose specification is publicly known, a fake signal could be sent because an IMES transmitter can be manufactured if one has a certain level of technological knowledge.

By sending position information whose genuineness is secured, reliability of a position information management system can be increased in which an IMES based positioning system is used.

In the following, IMES based positioning will be described that can secure genuineness of position information sent by the communication device 100 in the position information management system 1.

To secure that genuine position information is sent by the communication device 100, the position information management system 1 uses a management terminal 500. The wireless terminal 120 may include the function of the management terminal 500.

<Management Terminal 500>

Figure 18:
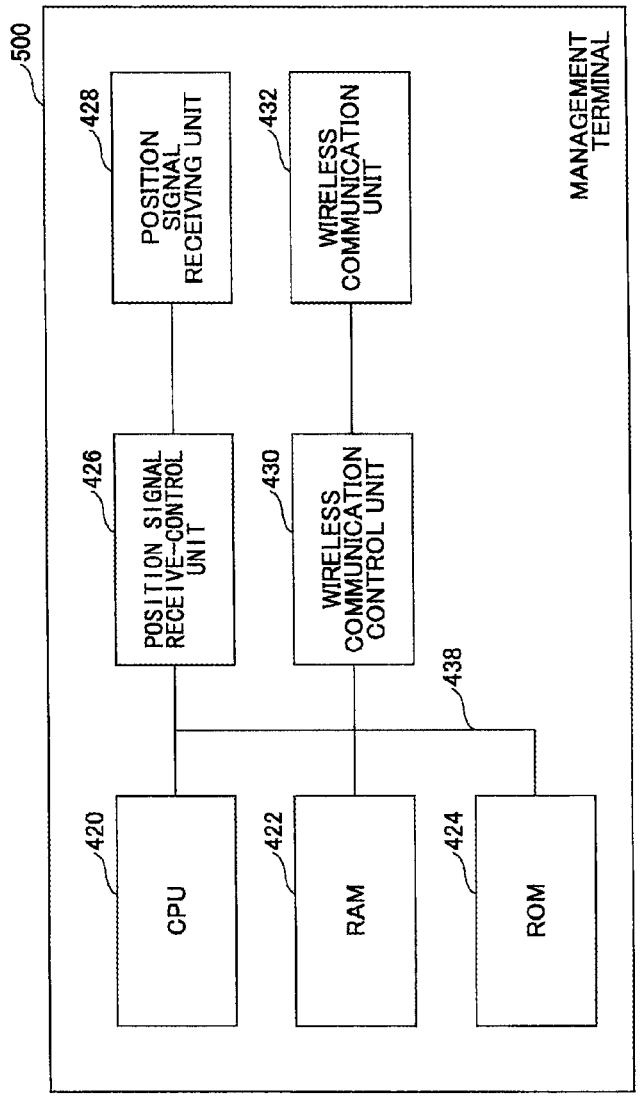
FIG. 18 is a hardware configuration diagram of a management terminal according to an embodiment of the invention.

FIG. 18 is a hardware configuration diagram of the management terminal 500 according to the present embodiment.

The management terminal 500 includes a CPU 420, a RAM 422, a ROM 424, a position signal receive-control unit 426, a position signal receiving unit 428, a wireless communication control unit 430, a wireless communication unit 432, and a bus 438.

The CPU 440 executes programs to control the management terminal 500. The RAM 422 is used for a work area for the CPU 420. The ROM 424 stores the programs executed by the CPU 400. The position signal receive-control unit 426 executes operations for receiving a positioning signal via the position signal receiving unit 428. The position signal receiving unit 428 is a unit for receiving a positioning signal, for example, an IMES signal, with an antenna. The wireless communication control unit 430 executes wireless communication operations via the wireless communication unit 432. The wireless communication unit 432 is a unit for sending/receiving a radio wave compliant with, for example, the IEEE 802.15.4 standard, with an antenna. The bus 438 electrically connects the above units with each other.

Configured as above, the management terminal 500 in the present embodiment can receive position information from the communication device 100, then send the position information to the management server 160. Here, the position information may be sent to the management server 160 via the management device 140. Also, if the management server 160 includes a wireless communication unit and a corresponding control unit, the management terminal 500 may send the position information to the management server 160.

Here, if the management terminal 500 is an information terminal such as a smart phone or a PC, the management terminal 500 may include an input device and a corresponding input control unit for receiving inputs from a user, for example, a touch panel, a dial key, a keyboard, a mouse, etc. The management terminal 500 may also include a display device with a screen and a display control unit.

Also, if the management terminal 500 includes a GPS antenna and a corresponding control unit, an IMES positioning signal can be received by the antenna, which can be used in the position information management system 1 having its software tuned.

Also, as mentioned above, if the position information is sent with wireless communication, the position signal receive-control unit 426 and the position signal receiving unit 428 are not required.

Figure 19:
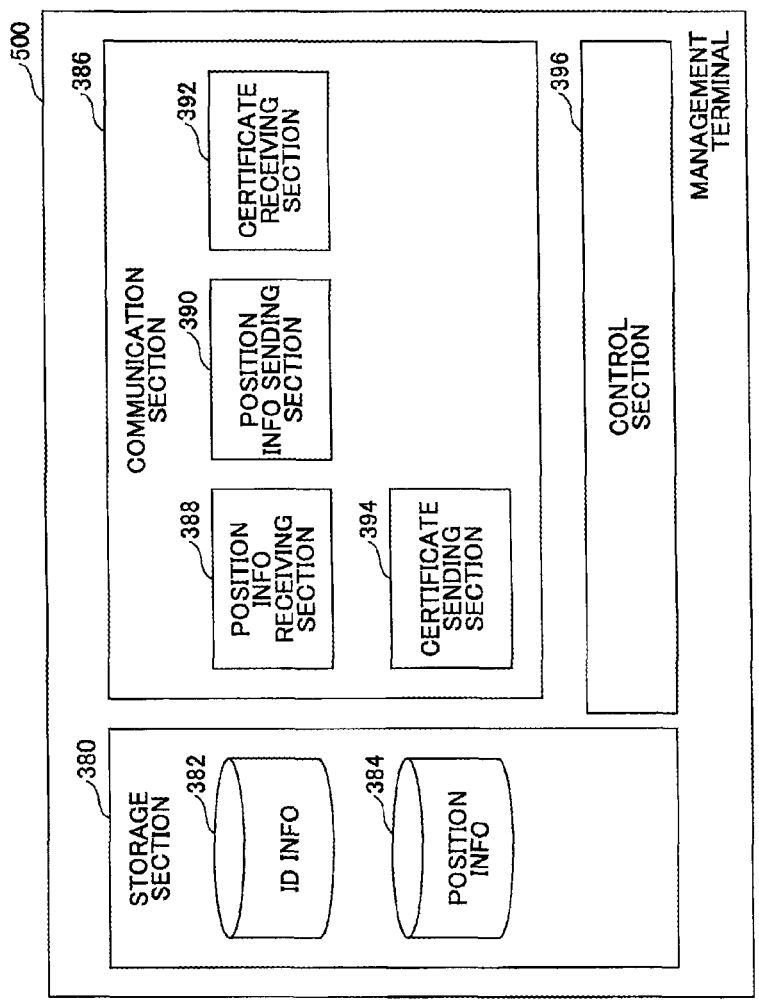
FIG. 19 is a function block diagram of a management terminal according to an embodiment of the invention.

FIG. 19 is a function block diagram of the management terminal 500 according to the present embodiment. The management terminal 500 includes a storage section 380, a communication section 386, and a control section 396.

The storage section 380 includes ID information 382 and position information 384. The ID information 382 includes information such as the network address of the management terminal 500, with which the management terminal 500 can be identified in the position information management system 1. For example, if the network 180 is based on the standard of IEEE 802.15.4 and ZigBee (trademark), an abbreviated address in IEEE 802.15.4 or an IEEE extended (MAC) address can be used. The position information 384 is the position information 302 sent by the communication device 100. An example of a table for storing the position information 384 is the same as the one shown in FIG. 12, which has the same structure as the table shown in FIG. 11.

The communication section 386 includes a position information receiving section 388 and an ID information sending section 330, a certificate receiving section 392, and a certificate sending section 394.

The position information receiving section 388 receives the position information 302 sent by the communication device 100. Specifically, the position information receiving section 388 receives the position information 302 with the position signal receiving unit 428. The received position information 302 is stored in the storage section of the management terminal 500. The position information 302 is sent to the management terminal 500 in a format, for example, shown in FIG. 12. The format in FIG. 12 allocates 9 bits, 21 bits, 21 bits, and 8 bits to the fields of floor, latitude, longitude, and building, respectively, which are a concatenation of the fields in a received message sent by the IMES standard. This format of the fields is compliant with the IMES standard. In an actual transmission, a header and a check sum prescribed by a communication method are added to the format. As a communication method, for example, the IEEE 802.15.4 and ZigBee (trademark) standard may be used.

The position information sending section 390 sends the position information received by the position information receiving section 388 to the management server 160 to make a request for issuing a public key certificate (called "certificate", hereafter). Specifically, the position information sending section 390 sends the position information sent by the wireless communication unit 432 to the management server 160 to make the request for issuing the certificate. The position information may be sent to the management server 160 via the management device 140, or not via the management device 140.

The certificate receiving section 392 receives the certificate sent from the management server 160 regarding to the position information sent by the position information sending section 390. Specifically, the certificate receiving section 392 receives the certificate by the wireless communication unit 432. The certificate may be received as a response to the position information.

The certificate sending section 394 sends the certificate received by the certificate receiving section 392 to the communication device 100. Specifically, the certificate sending section 394 sends the certificate by the wireless communication unit 432. When deleting the certificate, the certificate sending section 394 sends a command for deleting the certificate.

The control section 396 controls a receiving of position information by the position information receiving section 388, a sending of the position information 384 by the position information sending section 390, a receiving of a certificate by the certificate receiving section 392, and a sending of the certificate by the certificate sending section 394. Also, sending timing and receiving timing may be determined independently from each other. In addition, the control section 396 makes the management terminal 500 work as an end device of Zigbee if the management terminal 500, the communication device 100, and the management device 140 configure the PAN with ZigBee (trademark).

Configured as above, the management terminal 500 in the present embodiment can receive the position information from the communication device 100, and send the position information to the management server 160. The management terminal 500 can also send the certificate from the management server 160 to the communication device 100.

Here, if the management terminal 500 is an information terminal such as a smart phone or a PC, the management terminal 500 may include an input section for receiving inputs from a user, and a display section to provide information to a user. In this case, it is possible for a user to view the position information and the certificate.

<Communication Device 100>

The hardware configuration of the communication device 100 that can handle a certificate of position information is substantially the same as the one shown in FIG. 3.

Figure 20:
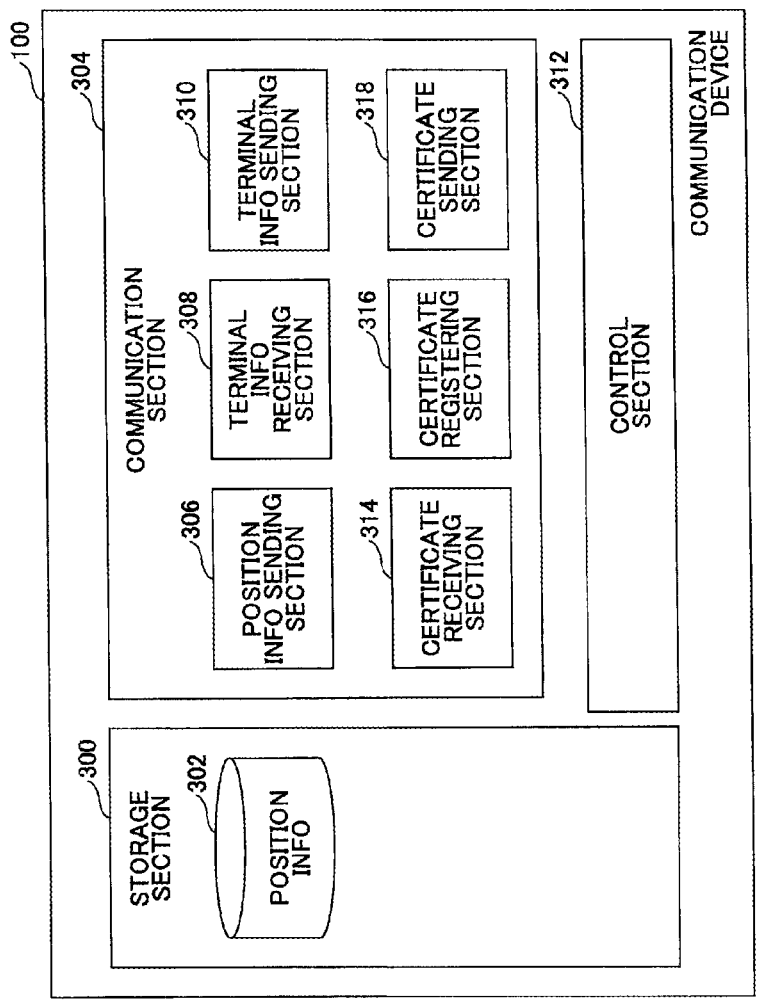
FIG. 20 is another function block diagram of a communication device according to an embodiment of the invention.

FIG. 20 is a function block diagram of the communication device 100 according to an example of the present embodiment.

The communication device 100 includes a certificate receiving section 314, a certificate registering section 316, and a certificate sending section 318, in addition to the sections described with FIG. 7.

The certificate receiving section 314 receives a certificate sent from the management terminal 500. Specifically, the certificate receiving section 314 receives the certificate by the wireless communication unit 212. The certificate receiving section 314 receives a certificate delete command sent by the management terminal 500. Specifically, the certificate receiving section 314 receives the certificate delete command by the wireless communication unit 212. The certificate delete command may be sent from the management server 160.

The certificate registering section 316 registers the certificate received by the certificate receiving section 314. Specifically, the certificate registering section 316 stores the certificate into the storage section 300. The certificate registering section 316 also deletes a certificate in response to a certificate delete command received by the certificate receiving section 314. Specifically, the certificate registering section 316 deletes the certificate from the storage section 300. The certificate registering section 316 may also delete a certificate registered in the storage section 300 if the communication device 100 is moved, or if the validity of a certificate has expired.

The certificate sending section 318 sends a certificate stored in the storage section 300 by the certificate registering section 316. Specifically, the certificate sending section 318 may send a certificate by the position signal sending unit 208 when the position information sending section 306 sends the position information. Alternatively, the certificate sending section 318 may send a certificate by the wireless communication unit 212 when the position information sending section 306 sends the position information.

<Management Server 160>

Another example of the management server 160, which will be described below, has substantially the same hardware configuration as the one shown in FIG. 6.

Figure 21:
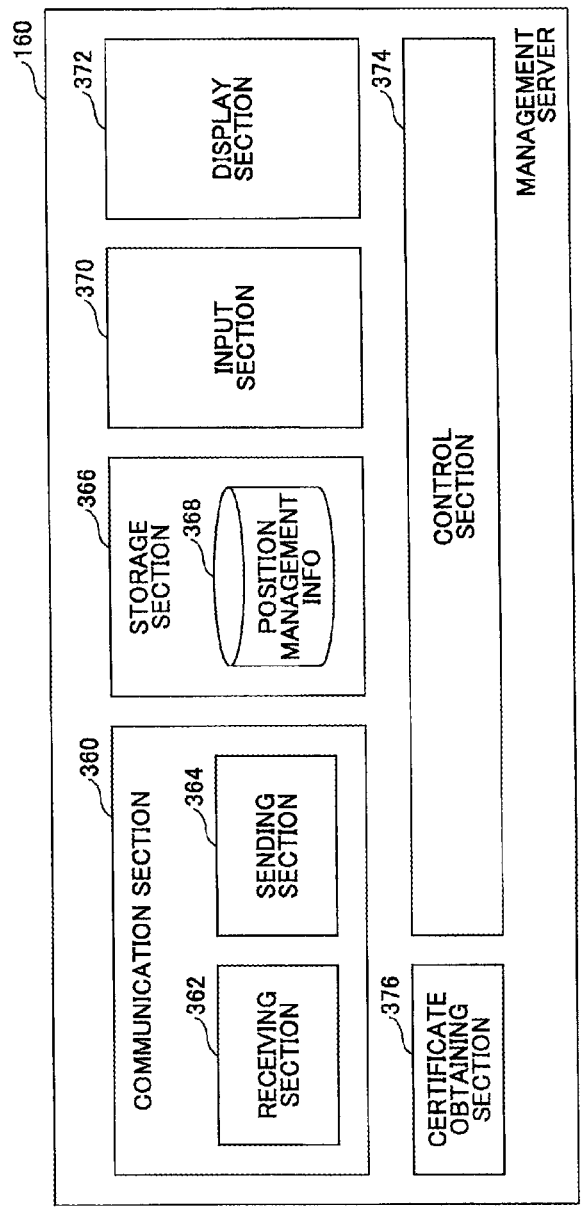
FIG. 21 is another function block diagram of a management server according to an embodiment of the invention.

FIG. 21 is a function block diagram of the management server 160 according to the present example.

The management server 160 in FIG. 21 has a certificate obtaining section 376 in addition to the sections of the management server 160 shown in FIG. 10.

The certificate obtaining section 376 makes a query to a certificate authority server about the position information received by the receiving section 362. When making the query to the certificate authority server, the certificate obtaining section 376 has the sending section 364 send management information including the position information. In addition to the position information, the management information may include the MAC address of the management server 160, ISP information, a management agent, a building name, and the like.

The certificate authority server identifies the management server 160, authenticates the position information, and issues the certificate based on the management information sent by the management server 160. The certificate authority server determines whether the position information included in the management information is correct. For example, the certificate authority server may determine whether the MAC address of the management server 160 is correct. If the MAC address is correct, the position information may be determined as correct; otherwise the position information may be determined as wrong. Alternatively, the certificate authority server may determine whether the ISP information of the management server 160 is correct. If the ISP information is correct, the position information may be determined as correct; otherwise the position information may be determined as wrong. Also, the certificate authority server may determine whether the management agent of the management server 160 is correct. If the management agent is correct, the position information may be determined as correct; otherwise the position information may be determined as wrong. Also, the certificate authority server may determine whether the position information is included in the area of the building. If included, the position information may be determined as correct; otherwise the position information may be determined as wrong. Specifically, the certificate authority server determines whether the position information is included in the area of the building by referring to the external outline of the building where the communication device 100 is installed, based on map information issued by an authentic institution, for example, the Geographical Survey Institute in Japan, or the like. If the position information is included in the external outline of the building, the position information may be determined as correct; otherwise the position information may be determined as wrong. Also, the agent name or the facility information may be referred to for determining whether the position information is correct. Moreover, the certificate authority server may use a combination of the above criteria to determine the correctness of the position information. The certificate authority server may use other conditions to determine the correctness of the position information included in the management information.

If the certificate authority server determines the position information is correct, the certificate authority server issues the certificate. The certificate authority server also generates a decryption key (public key) for the certificate if the certificate authority server determines the position information is correct. The authentication server adds the decryption key to the certificate, to send them to the management server 160.

The certificate and the decryption key from the certificate authority server are received by the receiving section 362. The certificate obtaining section 376 stores the certificate and the decryption key received by the receiving section 362 into databases. Specifically, the certificate, the decryption key, and the position information are stored in the databases. The databases (DBs) are a certificate DB, a decryption key DB, and a position management DB. The certificate obtaining section 376 stores the certificate into the certificate DB, the decryption key into the decryption key DB, and the position information into the position management DB.

The certificate obtaining section 376 sends the certificate to the management terminal 500.

If the certificate authority server determines that the position information is wrong, the certificate authority server indicates to the management server 160 that the position information cannot be authenticated. If the certificate obtaining section 376 receives and indication by the certificate authority server that the position information cannot be authenticated, the certificate obtaining section 376 indicates to the management terminal 500 that the position information is wrong.

By indicating to management terminal 500 that the position information is wrong, it is possible to determine whether the position information registered in the communication device 100 is correct.

If a request for the decryption key from a wireless terminal 120 is received by the receiving section 362, the control section 374 executes control operations to duplicate the decryption key stored in the DB to send the duplicated decryption key. The sending section 364 sends the duplicated decryption key to the wireless terminal 120. Specifically, the duplicated decryption key is sent by the communication unit 270 of the management server 160 as a wireless signal.

<Wireless Terminal 120>

Another example of the wireless terminal 120 has substantially the same hardware configuration as the one shown in FIG. 4.

Figure 22:
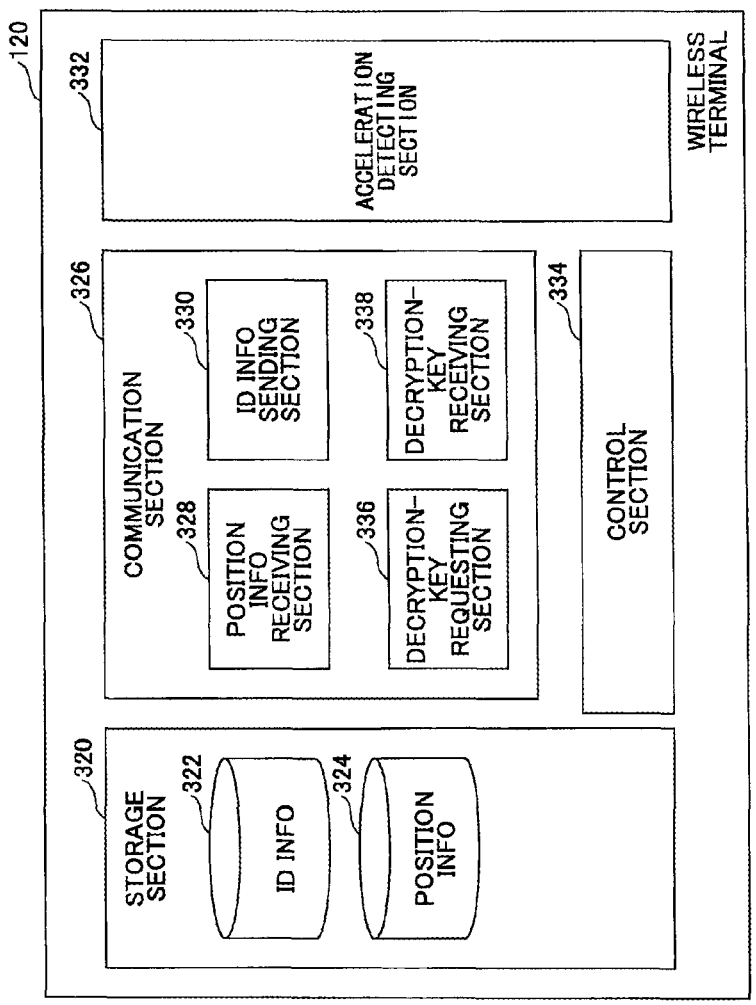
FIG. 22 is another function block diagram of a wireless terminal according to an embodiment of the invention.

FIG. 22 is a function block diagram of the wireless terminal 120 according to the present example.

The wireless terminal 120 includes a decryption-key requesting section 336 and a decryption-key receiving section 338, in addition to the sections of the wireless terminal 120 shown in FIG. 8.

The decryption-key requesting section 336 sends a request for a decryption key with the ID information of the wireless terminal 120 to obtain the decryption key for decrypting a certificate sent by the communication device 100 to the management server 160. The decryption-key requesting section 336 sends the request for the decryption key, for example, by the wireless communication unit 232. The request for the decryption key is received by the management server 160 via the management device 140.

The decryption-key receiving section 338 receives the decryption key from the management server 160 in response to the request for the decryption key. The decryption-key receiving section 338 stores the decryption key into the storage section 320.

The position information receiving section 328 decrypts the certificate sent by the communication device 100 with the position information by the decryption key stored in the storage section 320. The control section 334 determines genuineness of the position information by decrypting the certificate. The control section 334 determines that the position information is correct if the certificate is decrypted; otherwise the position information is wrong. If the control section 334 determines that the position information is correct, the position information can be regarded as successfully obtained with the positioning. In this case, the ID information sending section 330 sends the position information 324 along with the ID information 322 of the wireless terminal 120 to the communication device 100.

<Behavior of Position Information Management System, Example 1>

Figure 23:
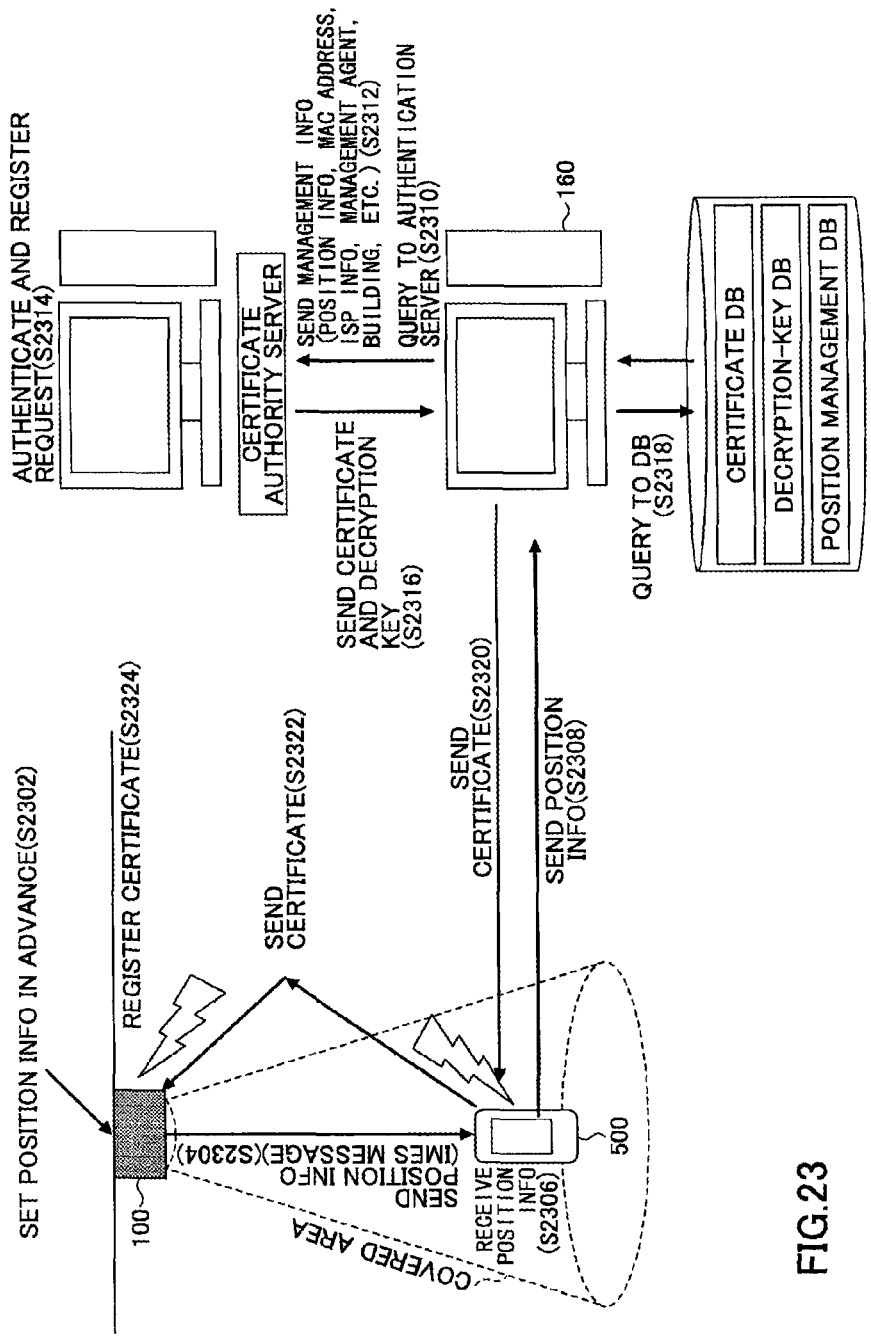
FIG. 23 is a schematic view illustrating a first operational sequence of a position information management system using a certificate according to an embodiment of the invention.

FIG. 23 is a schematic view illustrating a first operational sequence of the position information management system 1 using a certificate according to the present embodiment.

FIG. 23 mainly includes operations for issuing a certificate.

At Step S2302, position information is set in the communication device 100 in advance.

At Step S2304, the communication device 100 sends the position information. The communication device 100 sends the position information, for example, as an IMES message.

At Step S2306, the management terminal 500 receives the position information from the communication device 100.

At Step S2308, the management terminal 500 sends the position information received at Step S2306 to the management server 160 via the management device 140. In addition to the position information, the management information may be sent, which may include the MAC address of the management terminal 500, the ISP information, the management agent, the building name, and the like.

At Step S2310, the management server 160 makes a query about the position information to the certificate authority server.

At Step S2312, the management server 160 sends the management information including the position information to the certificate authority server. The management information includes the position information. In addition, the MAC address of the management server 160, the ISP information, the management agent, the building name, and the like, may be included. Also, the MAC address of the wireless terminal 120 may be included.

At Step S2314, the certificate authority server executes authentication and registration operations if the position information is determined as correct.

At Step S2316, the certificate authority server issues a certificate and a decryption key, then sends them to the management server 160.

At Step S2318, the management server 160 makes a request to the DBs for storing the certificate from the authentication server, the decryption key for the certificate, and the position information.

At Step S2320, the management server 160 sends the certificate to the management terminal 500.

At Step S2322, the management terminal 500 sends the certificate to the communication device 100.

At Step S2324, the communication device 100 registers the certificate received from the management terminal 500.

<Behavior of Position Information Management System, Example 2>

Figure 24:
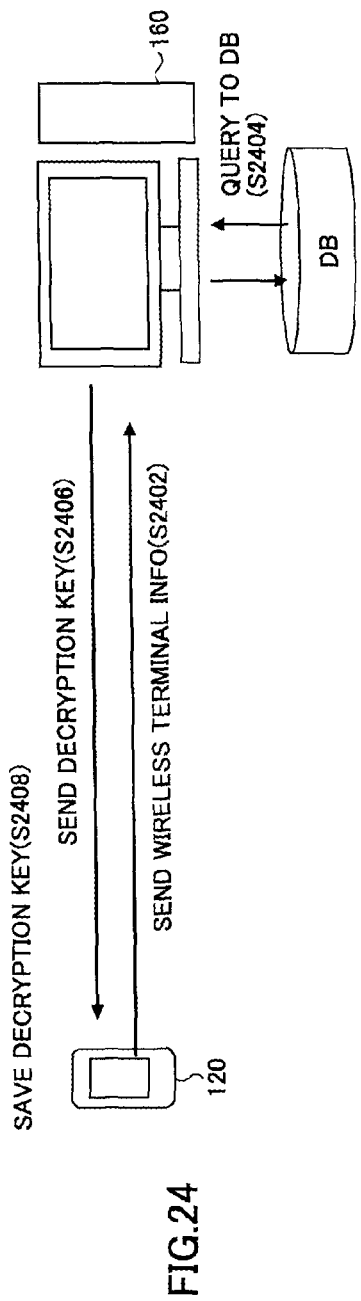
FIG. 24 is a schematic view illustrating a second operational sequence of a position information management system using a certificate according to an embodiment of the invention.

FIG. 24 is a schematic view illustrating a second operational sequence of the position information management system 1 using a certificate according to the present embodiment.

FIG. 24 mainly includes operations to register a decryption key into the wireless terminal 120.

At Step S2402, the wireless terminal 120 sends the information about the wireless terminal 120 to the management server 160. As the wireless terminal information, the ID information may be sent.

At Step S2404, the management server 160 makes a query to the DB to obtain the decryption key in response to receiving the wireless terminal information from the wireless terminal 120. Here, if the wireless terminal 120 is determined as included in the network 180 based on the wireless terminal information, the decryption key may be obtained by making a query to the DB. If the wireless terminal 120 is not included in the network 180, it may be indicated that a decryption key cannot be sent and a registration to the network 180 is required.

At Step S2406, the management server 160 sends the decryption key to the wireless terminal 120.

At Step S2408, the wireless terminal 120 stores the decryption key sent by the management server 160.

<Behavior of Position Information Management System, Example 3>

Figure 25:
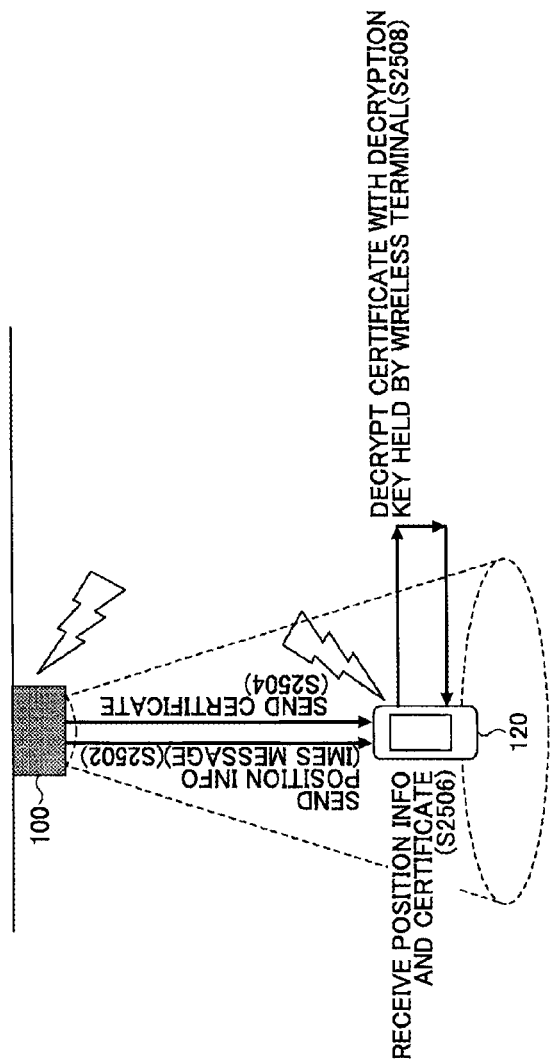
FIG. 25 is a schematic view illustrating a third operational sequence of a position information management system using a certificate according to an embodiment of the invention.

FIG. 25 is a schematic view illustrating a third operational sequence of the position information management system 1 using a certificate according to the present embodiment.

FIG. 25 mainly includes operations at the wireless terminal 120 for determining genuineness of the position information sent from the communication device 100 after the decryption key is stored in the wireless terminal 120.

At Step S2502, the communication device 100 sends the position information.

At Step S2504, the communication device 100 sends the certificate.

At Step S2506, the wireless terminal 120 receives the position information and the certificate from the communication device 100.

At Step S2508, the wireless terminal 120 decrypts the certificate by the decryption key. If the certificate is decrypted, the position information is determined as correct; otherwise wrong.

<Behavior of Position Information Management System, Example 4>

Figure 26:
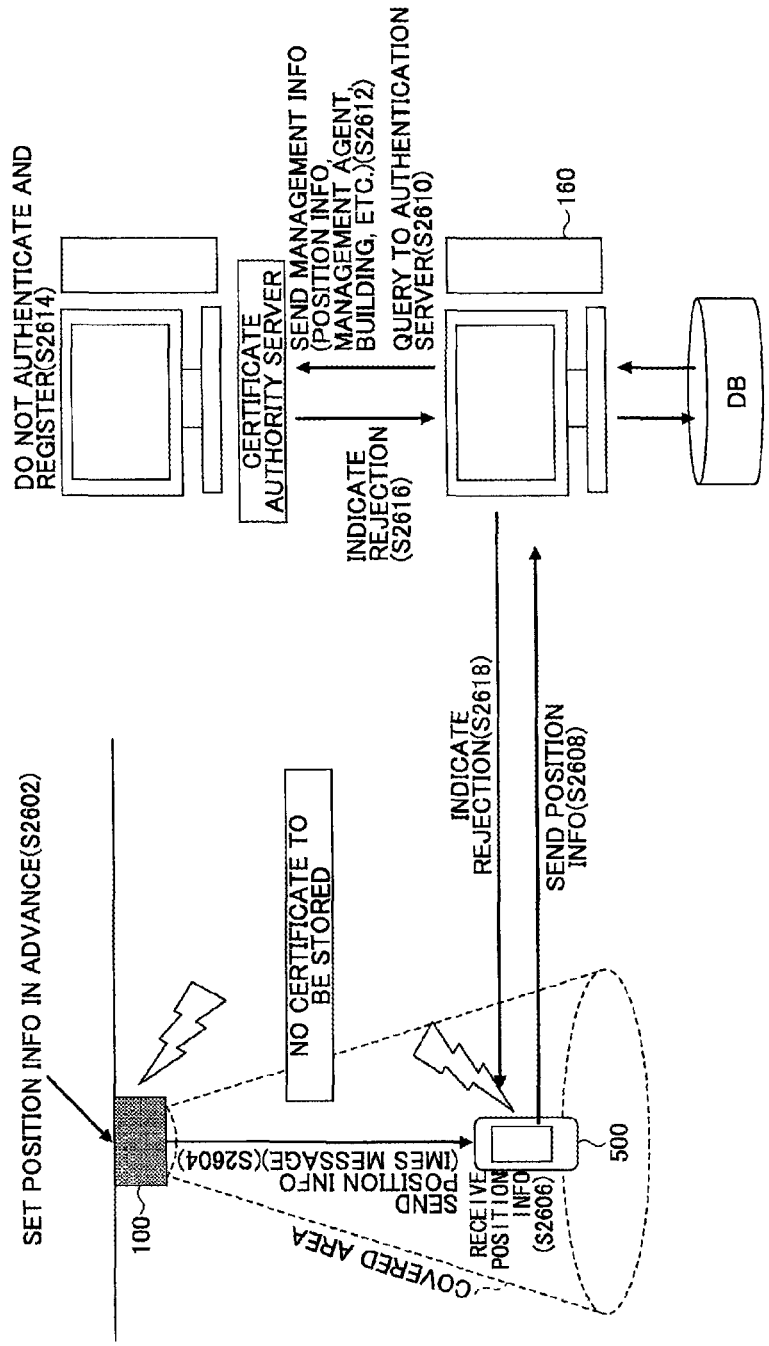
FIG. 26 is a schematic view illustrating a fourth operational sequence of a position information management system using a certificate according to an embodiment of the invention.

FIG. 26 is a schematic view illustrating a fourth operational sequence of a position information management system using a certificate according to the present embodiment.

FIG. 26 mainly includes operations executed when a certificate cannot be issued.

At Step S2602, position information is set in the communication device 100 in advance.

At Step S2604, the communication device 100 sends the position information. The communication device 100 sends the position information, for example, as an IMES message.

At Step S2606, the management terminal 500 receives the position information from the communication device 100.

At Step S2608, the management terminal 500 sends the position information received at Step S2606 to the management server 160 via the management device 140. In addition to the position information, the management information may be sent, which may include the MAC address of the management terminal 500, the ISP information, the management agent, the building name, and the like.

At Step S2610, the management server 160 makes a query about the position information to the certificate authority server.

At Step S2612, the management server 160 sends the management information including the position information to the certificate authority server. The management information includes the position information. In addition, the MAC address of the management server 160, the ISP information, the management agent, the building name, and the like, may be included. Also, the MAC address of the wireless terminal 120 may be included.

At Step S2614, the certificate authority server does not execute authentication and registration operations if the position information is determined as wrong.

At Step S2616, the certificate authority server sends an indication of rejection to the management server 160.

At Step S2618, the management server 160 sends the indication of rejection to the management terminal 500.

The management terminal 500 receives the indication of rejection from the management server 160. Upon receipt of the indication of rejection, the management terminal 500 cannot send a certificate to the communication device 100. Hence, certificate registration is not executed by the communication device 100.

In FIG. 26, at Step S2604, the communication device 100 may send the position information to the management server 160. Then, the steps after Step S2610 will be executed.

Also, the management server 160 may have the functions of the authentication server.

In the present embodiment, the communication device 100 can store the certificate that guarantees genuineness of the position information. The communication device 100 sends the position information along with the certificate. The wireless terminal 120 stores the decryption key of the certificate in advance. The wireless terminal 120 determines that the position information is correct if the certificate is decrypted by the decryption key sent along with the position information. Thus, genuineness of the position information sent by the communication device 100 can be secured.

To secure genuineness of the position information, one might consider that the communication device 100 would make a query to the management server 160 via the network 180 based on the ID information of the communication device 100, to obtain the genuine position information periodically, and the communication device 100 sends the position information as an IMES message.

However, this method may have a risk that a considerable number of queries are made by the communication devices 100, which might result in losing the position information when workload of the network 180 is overflowed or a fault occurs in the network 180.

According to the present embodiment, the communication device 100 does not need to make a query to the management server 160 because the position information and the certificate are registered. Therefore, workload of the network 180 can be kept reduced. Also, it is tolerant of a network fault when sending position information.

Second Embodiment

Usage of the position management system 1 is not limited to the above embodiment.

Figure 27:
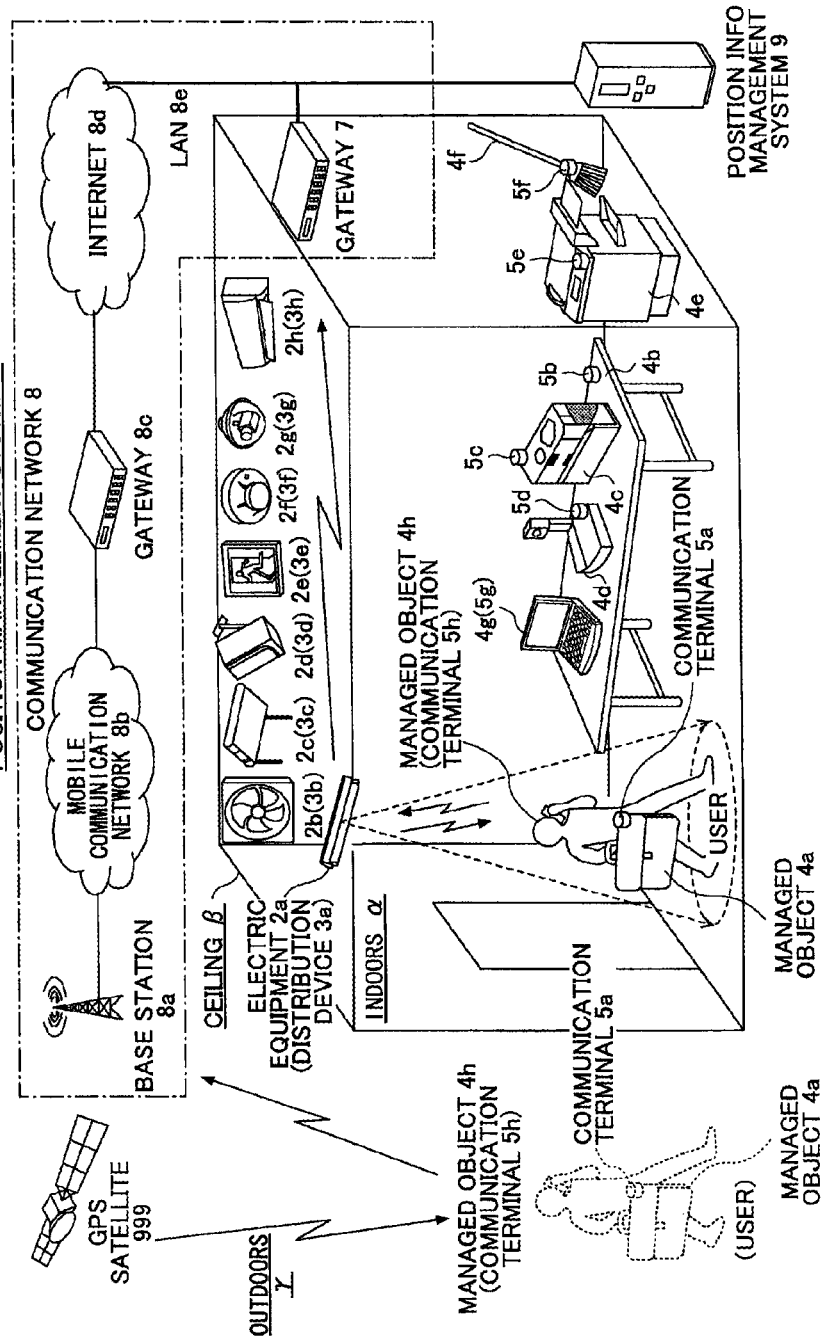
FIG. 27 is a schematic view illustrating a position information management system as a whole according to an embodiment of the invention.

FIG. 27 is a schematic view illustrating the position information management system 1 as a whole according to the present embodiment.

As shown in FIG. 27, the position management system 1 is configured with multiple distribution devices 3a, 3b, 3c, 3d, 3e, 3f, 3g, and 3h on the ceiling β in an indoor space α, multiple communication terminals 5a, 5b, 5c, 5d, 5e, 5f, 5g, and 5h on the floor of the indoor space α, and a position information management system 9.

The distribution devices 3a-3h store in themselves the position information where they are installed, Xa, Xb, Xc, Xd, Xe, Xf, Xg, and Xh, respectively, which are sent in a direction toward the floor of the indoors space α. In addition, the distribution devices 3a-3h store the device ID information Ba, Bb, Bc, Bd, Be, Bf, Bg, and Bh, respectively.

In the following, an arbitrary one of the multiple distribution devices 3a-3h is referred to as a "distribution device 3", and an arbitrary one of the multiple of communication terminals 5a-5h is referred to as a "communication terminal 5". A "distribution device 3" corresponds to the communication device 100 described above. Also, an arbitrary one piece of the multiple pieces of the position information is referred to as "position information X", an arbitrary one piece of the multiple pieces of the device ID information is referred to as "device ID information B". As the device ID information B, a MAC (Media Access Control) address may be used.

On the other hand, the communication terminals 5a-5h store in themselves the terminal ID information Aa, Ab, Ac, Ad, Ae, Af, Ag, and Ah of themselves, respectively. An arbitrary one piece of the multiple pieces of the terminal ID information is referred to as "terminal ID information A". As terminal ID information A, a MAC (Media Access Control) address may be used. A communication terminal 5 sends its position information X along with the terminal ID information A to a distribution device 3 in response to receiving the position information X from the distribution device 3. A communication terminal 5 corresponds to the wireless terminal 120 described above.

A distribution device 3 is installed in or on one of electric devices 2a, 2b, 2c, 2d, 2e, 2f, 2g, and 2h disposed on the ceiling β in the indoor space α. In the following, an arbitrary one of the multiple electric devices is referred to as an "electric device 2".

An electric device 2 feeds power to an installed distribution device 3. In FIG. 27, the electric devices 2a-2h are a fluorescent-type LED (Light Emitting Diode) illuminator, a ventilation fan, an access point of a LAN, a speaker, an emergency light, a fire alarm or a smoke alarm, a surveillance camera, and an air conditioner, respectively.

An electric device 2 may be another device other than the ones shown in FIG. 27 if it can feed power to an installed distribution device 3. For example, other than the ones above, a non-LED generic fluorescent light, an incandescent-lamp illuminator, or a security sensor to detect an intruder from the outside can be considered.

On the other hand, the communication terminals 5a-5h are attached on the exterior of the managed objects 4a, 4b, 4c, 4d, 4e, and 4f, respectively, whose positions are managed by the position information management system 9.

Here, the managed objects 4a-4f are, respectively, a bag, a table, a projector, a TV conference terminal, an MFP (Multifunction Peripheral) including a copy function, and a broom.

The managed object 4g is a PC, and is the communication terminal 5g as well, because the PC includes the function of the communication terminal 5. The managed object 4h is a cellular phone such as a smart phone, and is the communication terminal 5h as well, because the cellular phone includes the function of the communication terminal 5. In the following, an arbitrary one of the multiple managed objects is referred to as a "managed object 4".

A managed object 4 may be another object other than the ones shown in FIG. 27. For example, other than the ones above, a managed object 4 may be a facsimile machine, a scanner, a printer, a copy machine, an electronic blackboard, an air purifier, a shredder, a vending machine, a wristwatch, a camera, a gaming machine, a wheelchair, a medical device such as an endoscope, or the like.

Next, an example of a management method of position information using the position management system 1 will be described. In the present embodiment, for example, the distribution device 3a installed on the ceiling β of the indoors space α distributes the position information Xa that designates the position where the distribution device 3a is installed by wireless communication. The communication terminal 5a received the position information Xa. Next, the communication terminal 5a sends the terminal ID information Aa and the position information Xa to the distribution device 3a to identify the communication terminal 5a with wireless communication. In this case, the communication terminal 5a sends back to the distribution device 3a the position information Xa received from the distribution device 3a.

Thus, the distribution device 3a receives the terminal ID information Aa and the position information Xa. Next, the distribution device 3a sends the terminal ID information Aa and the position information Xa to a gateway 7 by wireless communication. The gateway then sends the terminal ID information Aa and the position information Xa to the position information management system 9 via a LAN 8e. In the position information management system 9, by managing the terminal ID information Aa and the position information Xa, a manager of the position information management system 9 can grasp the position of the communication terminal 5a (managed object 4a) in the indoor space α.

Among the communication terminals 5, it is possible for the communication terminals 5g and 5h, when located outdoors γ, to calculate a position on the earth by receiving a wireless signal (time information, orbit information, and the like) from a GPS (Global Positioning System) satellite 999 as shown in FIG. 27. The communication terminals 5g and 5h use a communication system compliant with 3G (3rd Generation), 4G (4th generation), or the like, to send the terminal ID information Ag and Ah, and the position information Xg and Xh to the position information management system 9 via a base station 8a, a mobile communication network 8b, a gateway 8c, the Internet 8d, and the LAN 8e to identify the communication terminals 5g and 5h.

Here, a communication network 8 is configured with the base station 8a, the mobile communication network 8b, the gateway 8c, the Internet 8d, the LAN 8e, and the gateway 7. Although at least three GPS satellites are required for positioning the latitude and longitude on the earth (four satellites if the altitude is also taken into account), only one GPS satellite is shown in FIG. 27 for the sake of simplicity.

Figure 28:
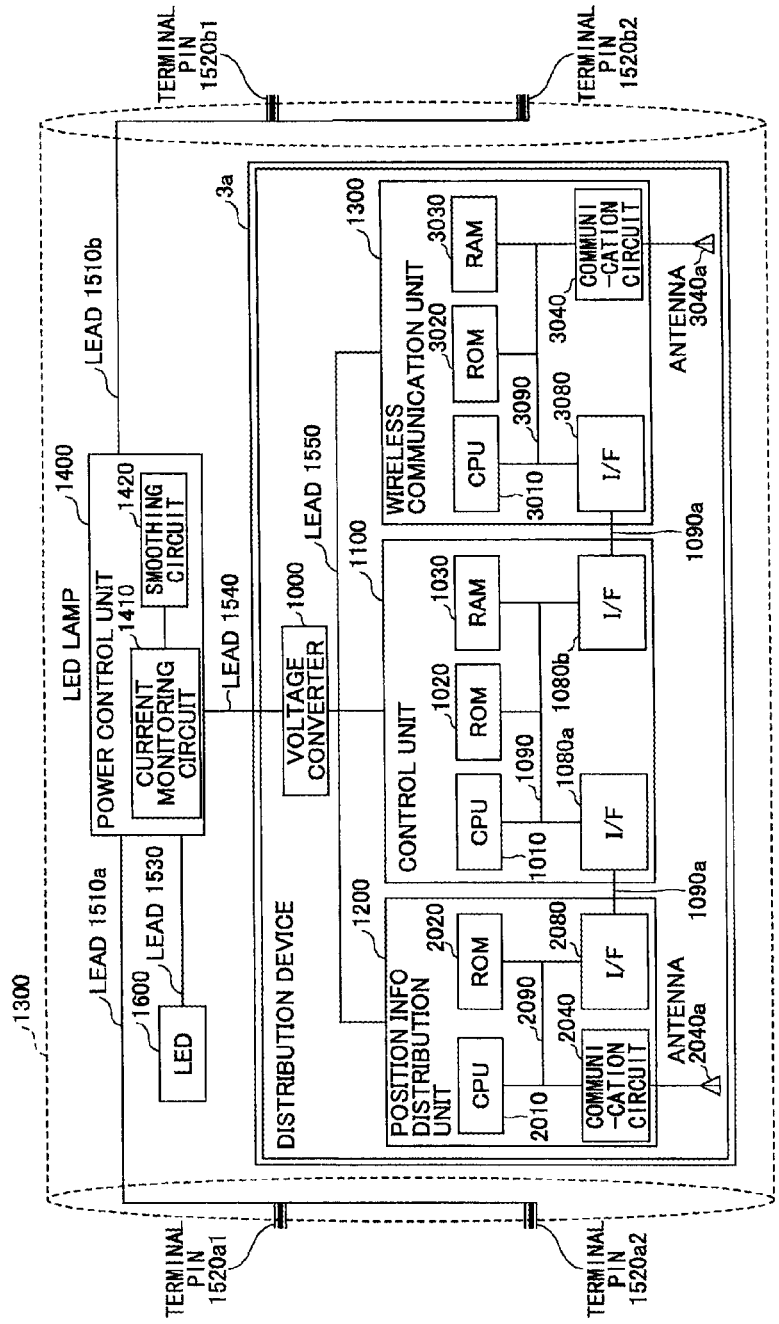
FIG. 28 is a hardware configuration diagram of a fluorescent-type LED lamp including a distribution device according to an embodiment of the invention.

FIG. 28 is a hardware configuration diagram of the electric device 2a, or the fluorescent-type LED lamp 1300 including a distribution device, according to the present embodiment. The LED lamp 1300 is mainly configured with a power control unit 1400, leads 1510a and 1510b, terminal pins 1520a1, 1520a2, 1520b1, and 1520b2, leads 1530, 1540, and 1550, and a distribution device 3a. The power control unit 1400, which is mainly configured with a current monitoring circuit 1410 and a smoothing circuit 1420, controls a current from a power source (not shown). The current monitoring circuit 1410 rectifies the current from the power source. The smoothing circuit 1420 smoothes the current rectified by the current monitoring circuit 1410, and feeds power to the terminal pins 1520a1, 1520a2, 1520b1, and 1520b2 via the leads 1510a and 1510b.

The power control unit 1400 and the terminal pins 1520a1, 1520a2, 1520b1, and 1520b2 are connected by the leads 1510a and 1510b electrically. The power control unit 1400 and the distribution device 3a are connected by the lead 1540 electrically. Although only one LED 1600 is shown in FIG. 28 as space is limited, multiple LEDs 1600 may be installed. The LED lamp 1300 shown in FIG. 28 has the same configuration as a generic LED lamp except for the distribution device 3a.

Next, the distribution device 3a will be described. The distribution device 3a is configured with a voltage converter 1000, a lead 1550, a control unit 1100, a position information distribution unit 1200, and a wireless communication unit 1300. The voltage converter 1000 is connected with the control unit 1100, the position information distribution unit 1200, and the wireless communication unit 1300 via a lead 1550 electrically.

The voltage converter 1000 is an electronic device that converts a voltage of power supplied by the power control unit 1400 into a driving voltage for the distribution device 3a, which is fed to the control unit 1100, the position information distribution unit 1200, and the wireless communication unit 1300.

The control unit 1100 includes a CPU (Central Processing Unit) 1010 for controlling the overall behavior of the control unit 1100, a ROM (Read Only Memory) 1020 for storing a BIOS, a RAM (Random Access Memory) 1030 used for a work area for the CPU 1010, I/Fs (interfaces) 1080a and 1080b for sending/receiving signals with the position information distribution unit 1200 and the wireless communication unit 1300, respectively, and a bus line 1090 including an address bus, a data bus, and the like for connecting the above parts with each other electrically.

The position information distribution unit 1200 includes a CPU 2010 for controlling the overall behavior of the position information distribution unit 1200, a ROM 2020 for storing a BIOS and the position information Xa, a communication circuit 2040 and an antenna 2040a for distributing the position information Xa, an I/F 2080 for sending/receiving signals with the control unit 1100, and a bus line 2090 including an address bus, a data bus, and the like for connecting the above parts with each other electrically.

The communication circuit 2040 distributes the position information Xa with the antenna 2040a using IMES, which is one of indoor positioning technologies called indoor GPS. A reachable area (distributable area) of the position information X is shown in FIG. 1 with dotted lines forming cones. In the present embodiment, IMES is set to have a transmission power in the indoor space α so that the reachable area (distributable area) of the position information X is a circle with 5-meter radius on the floor if the ceiling height is 3 m. By changing the transmission power, the radius can be made smaller or greater.

The position information Xa indicates the position where the electric device 2a, or the fluorescent-type LED lamp 1300, is installed. The position information Xa includes the floor, latitude, longitude, and building as shown in FIG. 11. FIG. 11 is a schematic view illustrating information held by a communication device.

The floor field represents a floor in a building where the electric device 2a is installed. The latitude and longitude fields represent the latitude and longitude, respectively, of a position where the electric device 2a is located. The building represents the building where the electric device 2a is installed. In FIG. 11, the electric device 2a is located on the 16-th floor in a building "C", at the north latitude of 35.459555 deg., and the east longitude of 139.387110 deg. Here, the latitude may be represented by the south latitude, and the longitude may be represented by the west longitude.

Referring to FIG. 28 again, the wireless communication unit 1300 includes a CPU 3010 for controlling the overall behavior of the wireless communication unit 1300, a ROM 3020 for storing a BIOS and the device ID information Ba, a RAM 3030 used for a work area for the CPU 3010, a communication circuit 3040 and an antenna 3040a for receiving the position information Xa and the terminal ID information Aa to send it to the gateway 7, an I/F 3080 for sending/receiving signals with the control unit 1100, and a bus line 3090 including an address bus, a data bus, and the like for connecting the above parts with each other electrically.

The wireless communication unit 1300 sends/receives data using a frequency band of 920 MHz. A radio wave in the frequency band of 920 MHz is highly reachable, hence if there are pillars or walls of a building between the distribution device 3a and the gateway 7, a data signal can be sent from the distribution device 3a to the gateway 7.

In addition, the communication circuit 3040 sends/receives data with the antenna 3040a using at least the physical layer in the architecture model of the IEEE 802.15.4 standard. In this case, as the device ID information B, the MAC address can be used to identify the distribution device 3a (wireless communication unit 1300).

Alternatively, ZigBee (trademark) may be used, which adopts the physical layer and the MAC layer in the architecture model of the IEEE 802.15.4 standard. In this case, depending on a region such as Japan, US, or Europe, the distribution device 3 may use a frequency band of 800 MHz, 900 MHz, or 2.4 GHz, for sending data to the gateway 7 via an adjacent distribution device 3. By using such multi-hop communication which sends data via another distribution device 3, the wireless communication unit 1300 of a distribution device 3 can operate with small power consumption because power is required only for communication between the adjacent distribution devices 3, although it may take time to establish a routing path.

The position information Xa may be set on the distribution device 3a before shipment by a manufacturer, or set on the distribution device 3a when the electric device 2a is installed on the ceiling β after shipment by an installation engineer. Alternatively, the position information Xa may be set by receiving data with wireless communication from an external device, such as the position information management system 9, via the gateway 7, to the communication circuit 3040 of wireless communication unit 1300, then storing the data into the ROM 2020 of the position information distribution unit 1200 via the control unit 1100.

Figure 29:
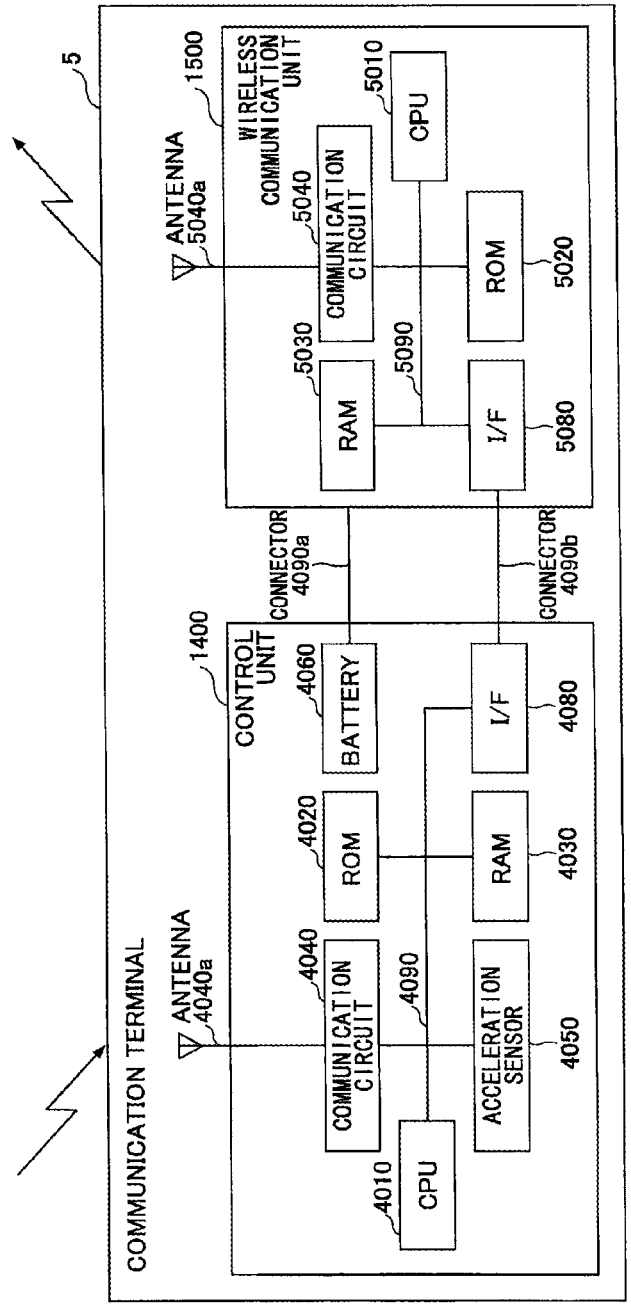
FIG. 29 is a hardware configuration diagram of a communication terminal according to an embodiment of the invention.

Next, with reference to FIG. 29, a hardware configuration of the communication terminal 5 will be described. FIG. 29 is the hardware configuration diagram of the communication terminal 5 according to the present embodiment. The communication terminal 5 corresponds to the wireless terminal 120 described above.

As shown in FIG. 29, the communication terminal 5 is configured with a control unit 1400 and a wireless communication unit 1500.

The control unit 1400 includes a CPU 4010 for controlling the overall behavior of the control unit 1400, a ROM 4020 for storing a BIOS, a RAM 4030 used for a work area for the CPU 4010, a communication circuit 4040 and antenna 4040a for receiving position information X, an acceleration sensor 4050 for detecting acceleration, an I/F 4080 for sending/receiving signals with the wireless communication unit 1500, and a bus line 4090 including an address bus, a data bus, and the like for connecting the above parts with each other electrically. The control unit 1400 also includes a button battery 4060, which drives the control unit 1400. Although the button battery 4060 is used in the present embodiment, any other batteries may be used, for example, a dry cell battery such as a size AA battery or size AAA battery, or a dedicated battery for the communication terminal 5.

The communication circuit 4040 receives with the antenna 4040a position information X distributed using IMES. The control unit 1400 feeds power to the wireless communication unit 1500 via a connector 4090a from the button battery 4060. The control unit 1400 also sends/ receives data (signals) with the wireless communication unit 1500 via the I/F 4080 and the connector 4090*b*.

The acceleration sensor detects an acceleration change of the communication terminal 5. An acceleration change is detected, for example, when the communication terminal 5 starts moving, the communication terminal 5 stops moving, or the communication terminal 5 starts being tilted, or the like. If the acceleration sensor 4050 detects an acceleration change when the operation of the CPU 4010 is suspended, the acceleration sensor 4050 sends a signal to start up the CPU 4010. In response to the signal, the CPU 4010 starts up itself, as well as sending a signal to start up the communication circuit 4040. Therefore, if position information X is distributed by a distribution device 3, the communication circuit 4040 of the communication terminal 5 can start receiving the position information X via the antenna 4040*a*.

On the other hand, the wireless communication unit 1500 has substantially the same configuration as the wireless communication unit 1300, and uses the same frequency band as the wireless communication unit 1300 to send/receive data with the wireless communication unit 1300 of the distribution device 3. The wireless communication unit 1500 includes, as shown in FIG. 29, a CPU 5010 for controlling the overall behavior of the wireless communication unit 1500, a ROM 5020 for storing a BIOS and the terminal ID information A, a RAM 5030 used for a work area for the CPU 5010, a communication circuit 5040 and an antenna 5040*a* for sending the position information X and terminal ID information A, an I/F 5080 for sending/receiving signals with the control unit 1400, and a bus line 5090 including an address bus, a data bus, and the like for connecting the above parts with each other electrically. Here, the wireless communication unit 1500, for example, uses ZigBee for communication. However, a communication method used by the wireless communication unit 1500 is not limited to ZigBee, but NFC (Near Field Communication) such as Bluetooth LE may be used.

The communication circuit 5040 obtains position information X stored in the RAM 4030 in the control unit 1400 via the connector 4090*b* by instructions from the CPU 5010. The communication circuit 5040 also reads the terminal ID information A stored in the ROM 5020 to send it to a distribution device 3 along with the obtained position information X via the antenna 5040*a*.

Figure 30:
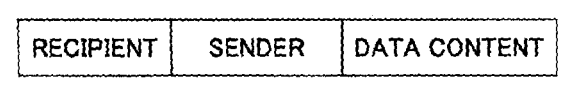

The position information X sent by the communication circuit 5040 has a data format shown in FIG. 13. FIG. 13 is a schematic view illustrating the format of position information. The format in FIG. 13 allocates 9 bits, 21 bits, 21 bits, and 8 bits to the fields of floor, latitude, longitude, and, building, respectively. This format of the fields is compliant with the IMES standard. In an actual transmission, a header or a check sum prescribed by a communication method are added to the format. As shown in FIG. 30, a recipient, a sender, and data content (position information X, etc.) are also included. FIG. 30 is a schematic view illustrating a data structure including position information according to the present embodiment.

Figure 31:
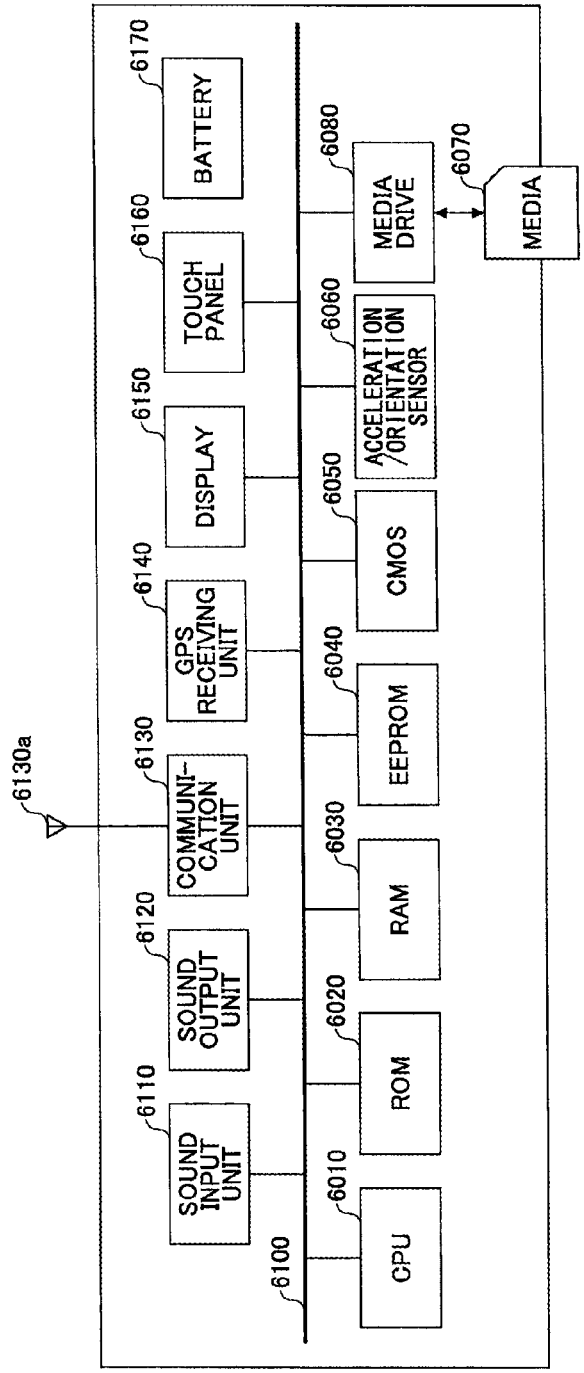
FIG. 31 is a hardware configuration diagram of a cellular phone as a managed object according to an embodiment of the invention.

Next, with reference to FIG. 31, a hardware configuration of the cellular phone, or the managed object 4*h* (communication terminal 5*h*), will be described. FIG. 31 is the hardware configuration diagram of the cellular phone as a managed object according to the present embodiment.

As shown in FIG. 31, the managed object 4*h* (communication terminal 5*h*) includes a CPU 6010 for controlling the overall behavior of the communication terminal 5*h*, a ROM 6020 for storing a BIOS, a RAM 6030 used for a work area for the CPU 6010, an EEPROM (Electrically Erasable and Programmable ROM) 6040 for reading/writing data under control of the CPU 6010, a CMOS (Complementary Metal Oxide Semiconductor) sensor 6050 for taking pictures to obtain image data under control of the CPU 6010, an acceleration/orientation sensor 6060 for detecting geomagnetism such as an electromagnetic compass, a gyrocompass, an acceleration sensor, or the like, and a media drive 6080 for controlling a read/write of data from/to a recording medium 6070 such as a flash memory. Under the control of the media drive 6080, already recorded data is read from the recording medium 6070, and new recording data is written to the recording medium 6070, which is easily attachable to or detachable from the media drive 6080.

The EEPROM 6040 stores an OS executed by the CPU 6010, other programs, and various data. The CMOS sensor 6050 converts light to electric charge to obtain an electronic image of a subject, which may be a CCD (Charge Coupled Device) sensor instead.

In addition, the managed object 4*h* (communication terminal 5*h*) includes: a sound input unit 6110 for converting sound to a sound signal; a sound output unit 6120 for converting a sound signal to sound, an antenna 6130*a*; a communication unit 6130 for communication with an adjacent base station 8*a* via the antenna 6130*a*; a GPS receiving unit 6140 for receiving GPS signals from the GPS satellite 999; a display 6150 such as an LCD or an organic EL display for displaying images of subjects or various icons; a touch panel 6160 installed on the display 6150 for detecting a position touched by a finger or a touch pen with a pressure-sensitive or electrostatic panel; and a bus line 6100 including an address bus, a data bus, and the like for connecting the above parts with each other electrically. The managed object 4*h* (communication terminal 5*h*) also includes a dedicated battery 6170, which drives the managed object 4*h* (communication terminal 5*h*). The sound input unit 6110 includes a microphone to receive sound as input, and the sound output unit 6120 includes a speaker to output sound.

The GPS receiving unit 6140 of the managed object 4*h* (communication terminal 5*h*) is the same as a GPS receiving unit of a generic cellular phone. However, firmware stored in the ROM 6020 is finely tuned to receive data seamlessly from a distribution device 3 in the indoor space α and the GPS satellite outdoors γ. The acceleration/orientation sensor 6060 includes the functions of the acceleration sensor 6050 in FIG. 29.

Figure 33:
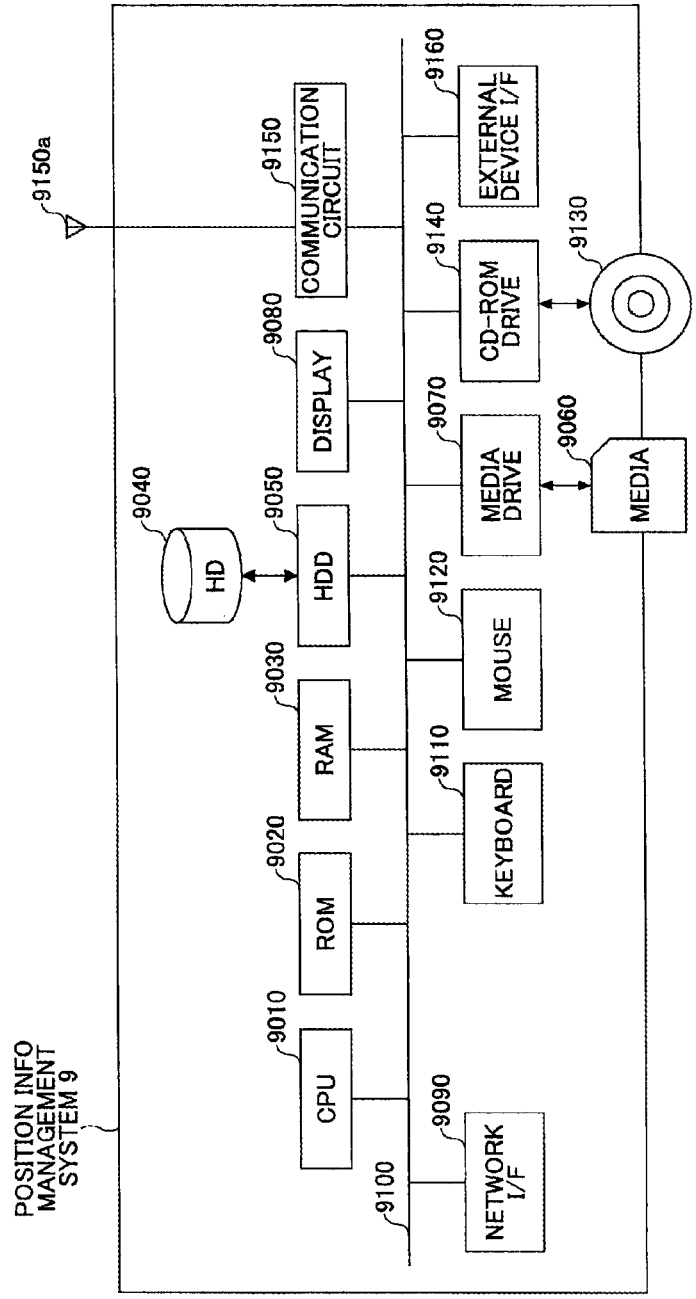
FIG. 33 is a hardware configuration diagram of a position information management system according to an embodiment of the invention.

The hardware configuration of the PC, or the managed object 4*g* (communication terminal 5*g*), is substantially the same as the hardware configuration of the position information management system 9, which will be described later with FIG. 33, hence omitted here. However, it is noted here that the PC, or the managed object 4*g* (communication terminal 5*g*) has a GPS antenna connected to the external device I/F 9160, such as a USB (Universal Serial Bus) connector, as shown in FIG. 33. If the PC has a GPS antenna preinstalled, an extra GPS antenna does not need to be connected with the external device I/F 9160.

Next, with reference to FIG. 32, the hardware configuration of the gateway 7 will be explained.

Figure 32:
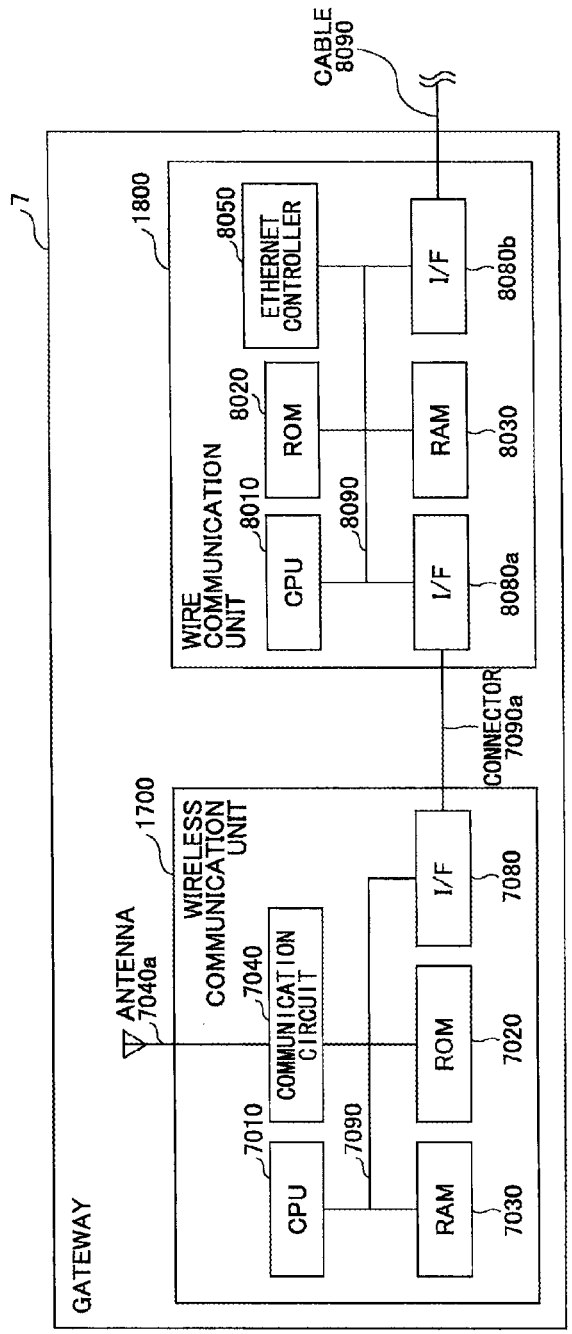
FIG. 32 is a hardware configuration diagram of a gateway according to an embodiment of the invention.

FIG. 32 is the hardware configuration diagram of the gateway 7 according to the present embodiment. The gateway device 7 corresponds to the management device 140 described above.

As shown in FIG. 32, the gateway 7 is configured with a wireless communication unit 1700 and a wire communication unit 1800.

The wireless communication unit 1700 has substantially the same configuration as the wireless communication unit 1300 above, which uses the same frequency band as the wireless communication unit 1300 to send/receive data with the wireless communication unit 1300 of the distribution device 3. The wireless communication unit 1700 includes, as shown in FIG. 32, a CPU 7010 for controlling the overall behavior of the wireless communication unit 1700, a ROM 7020 for storing a BIOS and the device ID information C, a RAM 7030 used for a work area for the CPU 7010, a communication circuit 7040 and an antenna 7040a for sending the position information X, etc., an I/F 7080 for sending/receiving signals with the wire communication unit 1800, and a bus line 7090 including an address bus, a data bus, and the like for connecting the above parts with each other electrically. The wireless communication unit 1700 sends/receives signals with the wire communication unit 1800 via the I/F 7080 and the connector 7090a.

Here, the wireless communication unit 1700 may use ZigBee. Device ID information C is intrinsic information to the gateway 7 (wireless communication unit 1700) for identification. As device ID information C, for example, a MAC (Media Access Control) address may be used.

On the other hand, the wire communication unit 1800 includes, as shown in FIG. 32, a CPU 8010 for controlling the overall behavior of the wireless communication unit 1800, a ROM 8020 for storing a BIOS and the device ID information D, a RAM 8030 used for a work area for the CPU 8010, an Ethernet controller 8050, an I/F 8080a for sending/receiving signals with the wireless communication unit 1700, an I/F 8080b for sending/receiving data (signals) with the LAN 8e via a cable 8090, and a bus line 8090 including an address bus, a data bus, and the like for connecting the above parts with each other electrically.

The CPU 8010 and the Ethernet controller 8050 convert a communication method (communication protocol) compliant with IEEE 802.15.4 into a communication method (communication protocol) compliant with IEEE 802.3 so that data (information) sent from the distribution device 3 can be transferred as packets in Ethernet.

Device ID information D is intrinsic information to the gateway 7 (wire communication unit 1800) for identification. As device ID information D, for example, an IP (Internet Protocol) address may be used. The ROM 8020 also stores a MAC address, although the detail is omitted here for the sake of simplicity.

Next, with reference to FIG. 33, the hardware configuration of the position information management system 9 will be described. FIG. 33 is the hardware configuration diagram of the position information management system 9 according to the present embodiment.

The position information management system 9 is configured with a computer. The position information management system 9 includes:

a CPU 9010 for controlling the overall behavior of the position information management system 9;

a ROM 9020 for storing programs to drive the CPU 9010 such as an IPL (Initial Program Loader);

a RAM 9030 used for a work area for the CPU 9010;

an HD 9040 for storing various data used in the programs for the position information management system 9 and system ID information E;

an HDD (Hard Disk Drive) 9050 for controlling a read/write of data with the HD 9040 under control of the CPU 9010;

a media drive 9070 for controlling a read/write of data with a recording medium 9060 such as a flash memory;

a display 9080 for displaying cursors, menus, windows, characters, images, and the like;

a network I/F 9090 for data communication using the communication network 8;

a keyboard 9110 with multiple keys for inputting characters, figures, and various commands;

a mouse 9120 for moving a cursor to select various commands and objects to be processed;

another media drive for attachable/removable recording media, for example, a CD-ROM drive 9140 for controlling a read/write of data with a CD-ROM (Compact Disc Read Only Memory) 9130;

a communication circuit 9150 and an antenna 9150a for wireless communication;

an I/F 9160 for connecting an external device; and a bus line 9100 including an address bus, a data bus, and the like for connecting the above parts with each other electrically.

System ID information E is intrinsic information to position information management system 9 for identification. As the system ID information E, for example, an IP (Internet Protocol) address may be used. The ROM 9020 also stores a MAC address, although the detail is omitted here for the sake of simplicity.

The HD 9040 stores management information F shown in FIG. 34 and layout information G shown in FIG. 17 that shows a layout of a specific floor. FIG. 34 is a schematic view illustrating management information managed by the position information management system 9 according to the present embodiment.

As shown in FIG. 34, the management information F includes records. In a record, terminal ID information A is associated with a device name, an owner/administrator name, position information X, and received date and time.

The "terminal ID information A" field represents the ID of a communication terminal 5. The "device name" field represents the name of a managed object 4 or a communication terminal 5. The "owner/administrator name" field represents the name of owner/administrator of a communication terminal 5. The "position information X" field represents the position information shown in FIG. 11. The "received date-time" field represents the date and time when the position information management system 9 receives the position information X or the like from the gateway 7.

The terminal ID information A, the device name, and the owner/administrator name are stored beforehand to be managed by the position information management system 9. If receiving position information X and terminal ID information A from the gateway 7, the position information management system sets the position information X and the received date-time into a record that has the corresponding terminal ID information A in the management information F.

If the position information X and received date-time has been set, and the position information management system 9 newly receives position information X and terminal ID information A from the gateway 7, the old position information X and received date-time are overwritten by the newly received ones.

Alternatively, instead of overwriting, the position information management system 9 may add a new record.

Next, with reference to FIGS. 35-37, a function configuration of the position management system 1 will be described according to the present embodiment. The hardware configurations shown in FIGS. 28-33 will be also referred to where necessary.

Figure 35:
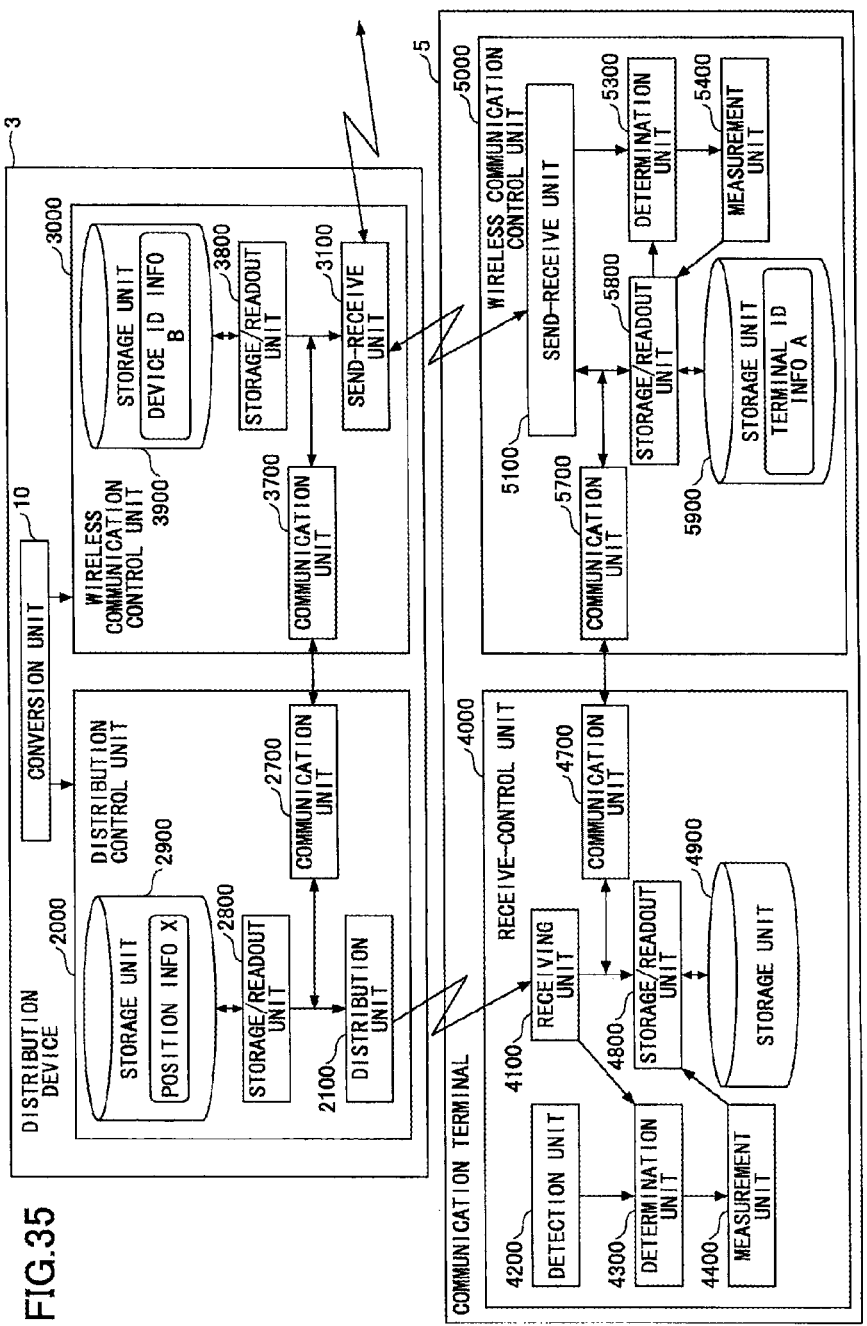
FIG. 35 is a function block diagram of a distribution device and a communication terminal according to an embodiment of the invention.

FIG. 35 is a function block diagram of a distribution device 3 and a communication terminal 5 according to the present embodiment. As shown in FIG. 35, the distribution device 3 includes, as function units, a conversion unit 10, a distribution control unit 2000, and a wireless communication control unit 3000. The conversion unit 10 is a functional unit implemented with operations of the voltage converter 1000 shown in FIG. 28.

The distribution control unit 2000 is a functional unit implemented with operations of the control unit 1100 and the position information distribution unit 1200 shown in FIG. 28. The wireless communication control unit 3000 is a functional unit implemented with operations of the control unit 1100 and the wireless communication unit 1300 shown in FIG. 28.

The distribution control unit 2000 includes a storage unit 2900 implemented with the ROM 2020 shown in FIG. 28. The storage unit 2900 stores position information X described above. The distribution control unit 2000 also includes a distribution unit 2100, a communication unit 2700, and a storage/readout unit 2800.

The distribution unit 2100 is mainly implemented with operations of the CPU 2010 and the communication circuit 2040 shown in FIG. 28, to distribute position information X within a reachable area.

The communication unit 2700 is mainly implemented with operations of the CPUs 1010 and 2010, the I/Fs 1080a and 2080, and the buses 1090 and 2090, to send/receive data (signal) with the wireless communication control unit 3000.

The storage/readout unit 2800 is mainly implemented with operations of the CPUs 1010 and 2010, to store various data into the storage unit 2900, and to read various data from the storage unit 2900. The storage/readout unit 2800 reads/writes data of, for example, position information X.

The wireless communication control unit 3000 includes a storage unit 3900 implemented with the RAM 3030 shown FIG. 28. The storage unit 3900 stores device ID information B described above.

The send-receive unit 3100 is mainly implemented with operations of the CPU 3010 and the communication circuit 3040 shown in FIG. 28 to send/receive various data with the communication terminal 5 or the gateway 7 by wireless communication.

The communication unit 3700 is mainly implemented with operations of the CPUs 1010 and 3010, the I/Fs 1080b and 3080, and the buses 1090 and 3090, to send/receive data (signal) with the distribution control unit 2000.

The storage/readout unit 3800 stores various data into the storage unit 3900, and reads various data from the storage unit 3900.

Next, a function configuration of the communication terminal 5 will be described.

The communication terminal 5 includes, as functional units, a receive control unit 4000 and a wireless communication control unit 5000.

The receive control unit 4000 includes a storage unit 4900 implemented with the RAM 4030 shown in FIG. 29. The storage unit 4900 can store position information X distributed from a distribution device 3. The receive control unit 4000 also includes a receiving unit 4100, a detection unit 4200, a determination unit 4300, a measurement unit 4400, a communication unit 4700, and a storage/readout unit 4800.

The receiving unit 4100 is mainly implemented with operations of the CPU 4010 and the communication circuit 4040 shown in FIG. 29, to receive position information X distributed from a distribution device 3. The receiving unit 4100 takes a state in which position information X can be received, or a state in which position information X cannot be received.

The detection unit 4200 is mainly implemented with operations of the CPU 4010 and the acceleration sensor 4050 shown in FIG. 29, to detect a movement (including a tilt) of the communication terminal 5, and to start up the receiving unit 4100. Here, the detection unit 4200 may be implemented with a motion sensor using inertial force or magnetism, instead of the acceleration sensor 4050.

The determination unit 4300 is mainly implemented with operations of the CPU 4010 shown in FIG. 29, to determine whether at least a record of position information X is received by the receiving unit 4100. The determination unit 4300 also determines whether multiple records of position information X are received by the receiving unit 4100. Here, the same records of position information X distributed from a distribution device 3 is treated as the single record even if received multiple times within a predetermined period.

The measurement unit 4400 is mainly implemented with operations of the CPU 4010 shown in FIG. 29, to measure signal strength of multiple signals if it is determined by the determination unit 4300 that records of position information X are received from multiple distribution devices 3.

The communication unit 4700 is mainly implemented with operations of the CPU 4010, the I/F 4080, and the bus 4090 shown in FIG. 29, to send/receive data (signals) with the wireless communication control unit 5000.

The storage/readout unit 4800 is mainly implemented with operations of the CPU 4010, to store various data into a storage unit 4900, and reads various data from the storage unit 4900. The storage/readout unit 4800 reads/writes data of, for example, position information X.

The wireless communication control unit 5000 includes a storage unit 5900 implemented with the RAM 5030 shown in FIG. 28. The storage unit 5900 stores terminal ID information A described above. The wireless communication control unit 5000 also includes a send-receive unit 5100, a determination unit 5300, a measurement unit 5400, a communication unit 5700, and a storage/readout unit 5800.

The send-receive unit 5100 is mainly implemented with operations of the CPU 5010 and the communication circuit 5040 shown in FIG. 29 to send/receive various data with a distribution device 3 by wireless communication.

The determination unit 5300 is mainly implemented with operations of the CPU 5010 shown in FIG. 29, to determine whether at least a record of device ID information B is received by the receiving unit 5100. The determination unit 5300 also determines whether multiple records of device ID information B are received by the receiving unit 5100. Here, the same records of device ID information B distributed from a distribution device 3 is treated as the single record even if received multiple times within a predetermined period.

The measurement unit 5400 is mainly implemented with operations of the CPU 5010 shown in FIG. 29, to measure signal strength of multiple signals if it is determined by the determination unit 5300 that records of device ID information B are received from multiple distribution devices 3.

The communication unit 5700 is mainly implemented with operations of the CPU 5010, the I/F 5080, and the bus 5090 shown in FIG. 29, to send/receive data (signals) with the wireless communication control unit 4000.

The storage/readout unit 5800 is mainly implemented with operations of the CPU 5010, to store various data into a storage unit 5900, and reads various data from the storage unit 5900. The storage/readout unit 5800 reads/writes data of, for example, device ID information A and B.

Next, with reference to FIG. 36, a function configuration of the managed objects 4g or 4h will be described. FIG. 36 is a function block diagram of a cellular phone or a PC (personal computer) as a managed object according to the present embodiment.

Figure 36:
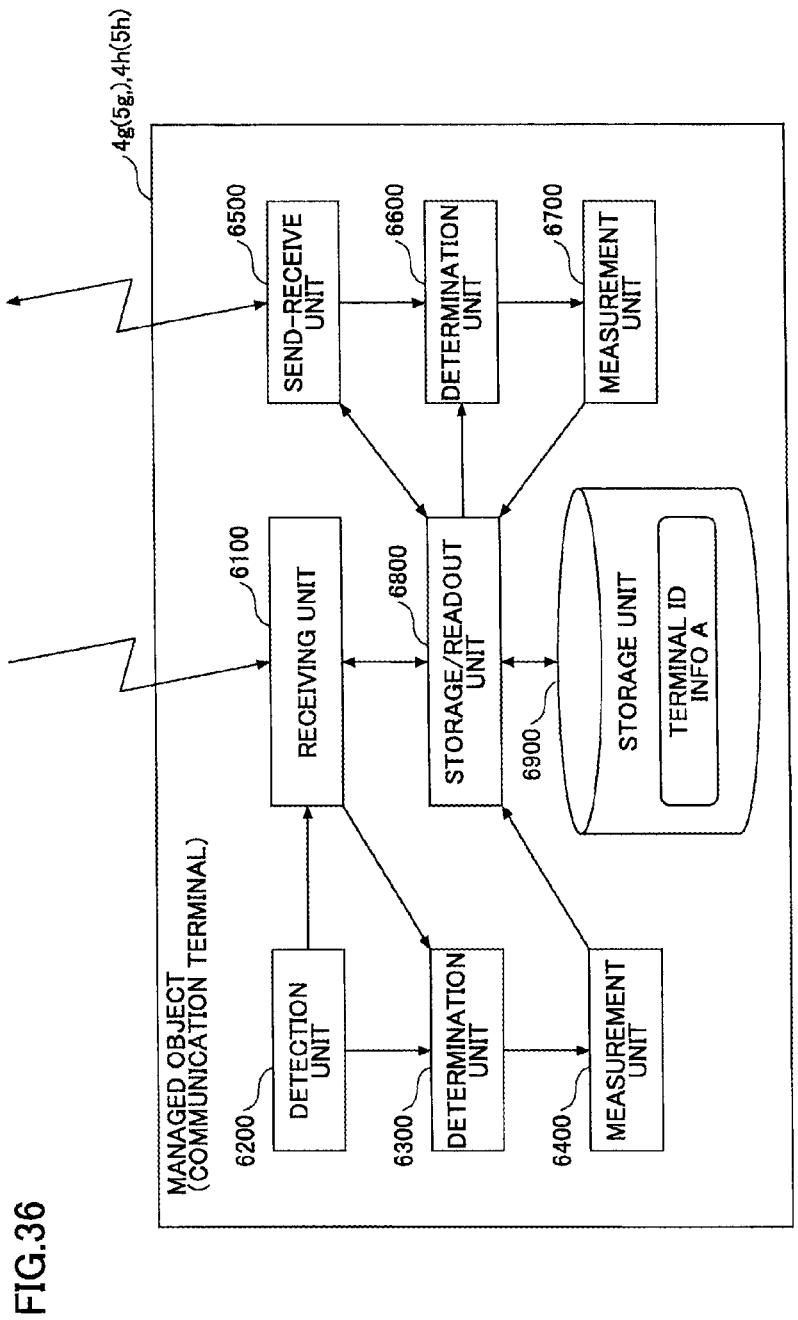
FIG. 36 is a function block diagram for a case where a cellular phone or a PC (personal computer) is a managed object according to an embodiment of the invention.
Figure 37:
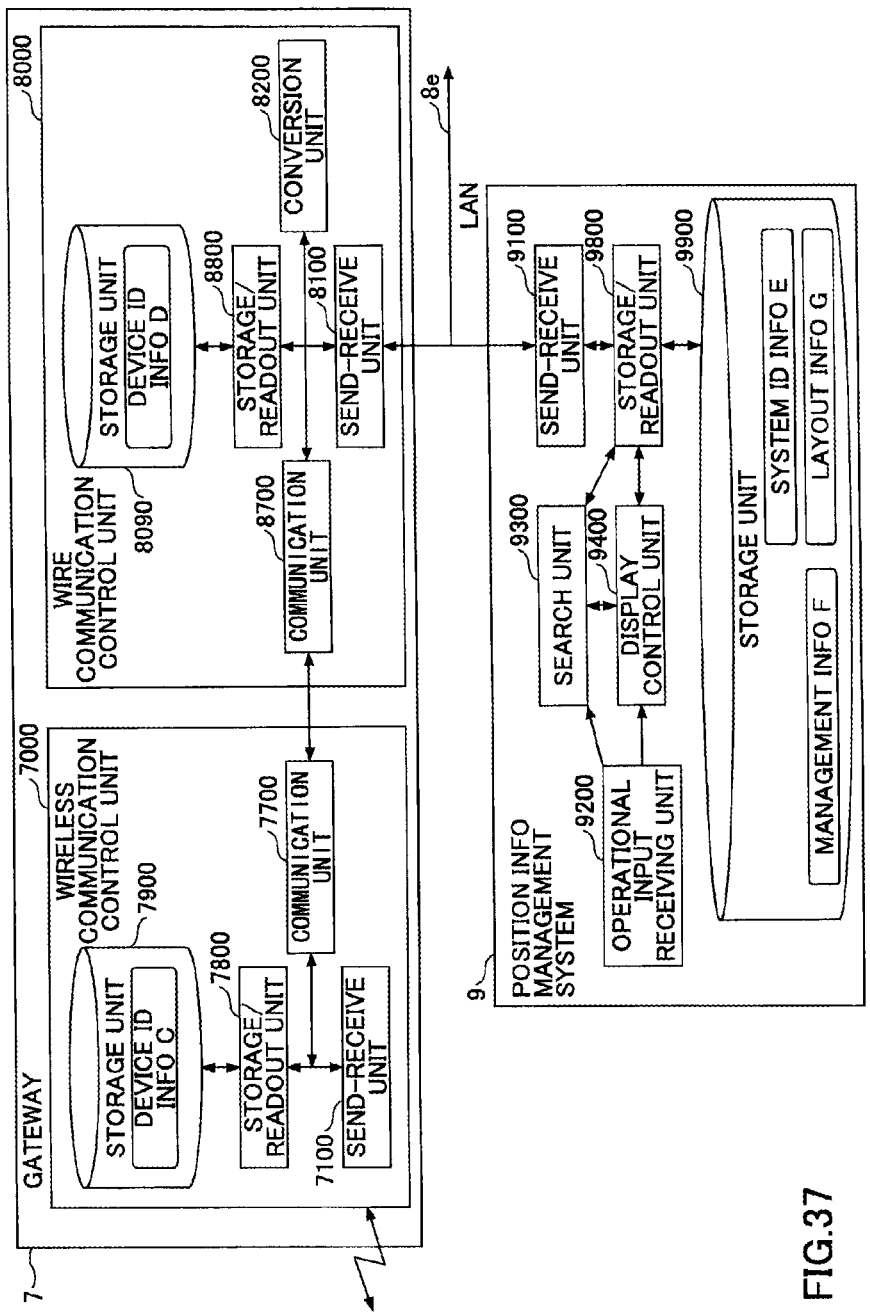
FIG. 37 is a function block diagram of a gateway and a position information management system according to an embodiment of the invention.

As shown in FIG. 36, the managed object 4g or 4h includes an EEPROM 6040 shown in FIG. 31, or a RAM 9030 shown in FIG. 33, and a storage unit 6900 implemented with an HD (Hard Disk) 9040. The managed object 4g or 4h includes a receiving unit 6100, a detection unit 6200, a determination unit 6300, a measurement unit 6400, a send-receive unit 6500, another determination unit 6600, a measurement unit 6700, and a storage/readout unit 6800.

The receiving unit 6100 is mainly implemented with operations of the CPU 6010 and the GPS receiving unit 6140 shown in FIG. 31, or the CPU 9010 and the GPS antenna connected with the external device I/F 9160 shown in FIG. 33, and has substantially the same functions as the receiving unit 4100.

The detection unit 6200 is mainly implemented with operations of the CPU 6010 and the acceleration/orientation sensor 6060 shown in FIG. 31, or the CPU 9010 and the acceleration sensor connected with the external device I/F 9160 shown in FIG. 33, and has substantially the same functions as the detection unit 4200.

The determination unit 6300 is mainly implemented with operations of the CPU 6010 shown in FIG. 31, or the CPU 9010 shown in FIG. 33, and has substantially the same functions as the determination unit 4300.

The measurement unit 6400 is mainly implemented with operations of the CPU 6010 shown in FIG. 31, or the CPU 9010 shown in FIG. 33, and has substantially the same functions as the measurement unit 4400.

The send-receive unit 6500 is mainly implemented with operations of the CPU 6010 and the and communication unit 6130 shown in FIG. 31, or the CPU 9010 and the communication circuit 9150 shown in FIG. 33, and has substantially the same functions as the send-receive unit 5100.

The determination unit 6600 is mainly implemented with operations of the CPU 6010 shown in FIG. 31, or the CPU 9010 shown in FIG. 33, and has substantially the same functions as the determination unit 5300.

The measurement unit 6700 is mainly implemented with operations of the CPU 6010 shown in FIG. 31, or the CPU 9010 shown in FIG. 33, and has substantially the same functions as the measurement unit 5400.

The storage/readout unit 6800 is mainly implemented with operations of the CPU 6010 shown in FIG. 31, or the CPU 9010 shown in FIG. 33, and has substantially the same functions as the storage/readout unit 4800 or the storage/readout unit 5800.

Next, with reference to FIG. 37, a function configuration of the gateway 7 will be described. FIG. 37 is a function block diagram of the gateway 7 and the position information management system 9 according to the present embodiment.

The gateway 7 includes, as functional units, a wireless communication control unit 7000, and a wire communication control unit 8000.

The wireless communication control unit 7000 is implemented with operations of the wireless communication unit 1700 shown in FIG. 32, and has substantially the same functions as the wireless communication control unit 3000 of a distribution device 3.

Specifically, the wireless communication control unit 7000 has a storage unit 7900 implemented with the RAM 7030 shown in FIG. 32. The storage unit 7900 stores the device ID information C described above. The wireless communication control unit 7000 also includes a send-receive unit 7100, a communication unit 7700, and a storage/readout unit 7800.

The send-receive unit 7100 is mainly implemented with operations of the CPU 7010 and the communication circuit 7040 shown in FIG. 32, to send/receive various data with a distribution device 3 by wireless communication.

The communication unit 7700 is mainly implemented with operations of the CPU 7010, the I/F 7080, and the bus 7090, to send/receive data (signals) with the wire communication control unit 8000.

The storage/readout unit 7800 is mainly implemented with operations of the CPU 7010, to store various data into a storage unit 7900, and reads various data from the storage unit 7900.

The wire communication control unit 8000 is mainly implemented with operations of the wire communication unit 1800 shown in FIG. 32. The wireless communication control unit 8000 has a storage unit 8090 implemented with the RAM 8030 shown in FIG. 32. The storage unit 8090 stores the device ID information D described above. The wire communication control unit 8000 also includes a send-receive unit 8100, a conversion unit 8200, a communication unit 8700, and a storage/readout unit 8800.

The send-receive unit 8100 is mainly implemented with operations of the CPU 8010 and the I/F 8080b shown in FIG. 32, to send/receive various data with the position information management system 9 by wire communication.

The conversion unit 8200 is mainly implemented with operations of the CPU 8010 and the Ethernet controller 8050 shown in FIG. 32, to convert the communication method as described above so that data (information) sent from a distribution device 3 can be transferred as packets in Ethernet.

The communication unit 8700 is mainly implemented with operations of the CPU 8010, the I/F 8080a, and the bus 8090, to send/receive data (signals) with the wireless communication control unit 7000.

The storage/readout unit 8800 is mainly implemented with operations of the CPU 8010, to store various data into a storage unit 8090, and reads various data from the storage unit 8090.

Next, with reference to FIG. 37, a function configuration of the position information management system 9 will be described.

The position information management system 9 has a storage unit 9900 implemented with the RAM 9030 and the HD 9040 shown in FIG. 33. The storage unit 9900 stores the device ID information D, E, and G described above. The position information management system 9 also includes a send-receive unit 9100, an operational input receiving unit 9200, a search unit 9300, a display control unit 9400, and a storage/readout unit 9800.

The send-receive unit 9100 is mainly implemented with operations of the CPU 9010, and the network I/F 9090 or the communication circuit 9150 shown in FIG. 33 to send/receive various data with the gateway 7 by wire or wireless communication. The send-receive unit 9100 also sends/receives various data with the communication terminal 5h outdoors γ via the communication network 8.

The operational input receiving unit 9200 is mainly implemented with operations of the CPU 9010, the keyboard 9110, and the mouse 9120, to receive inputs or selections from an administrator.

The search unit 9300 is mainly implemented with operations of the CPU 9010, to search for an item that meets conditions received at the operational input receiving unit 9200 in the management information F stored in the storage unit 9900 via the storage/readout unit 9800.

The display control unit 9400 is mainly implemented with operations of the CPU 9010, to control operations to various images, characters, etc., on the display 9080.

The storage/readout unit 9800 is mainly implemented with operations of the CPU 9010, to store various data into a storage unit 9900, and reads various data from the storage unit 9900.

Next, with reference to FIG. 38, an operational sequence will be described in the present embodiment.

Figure 38:
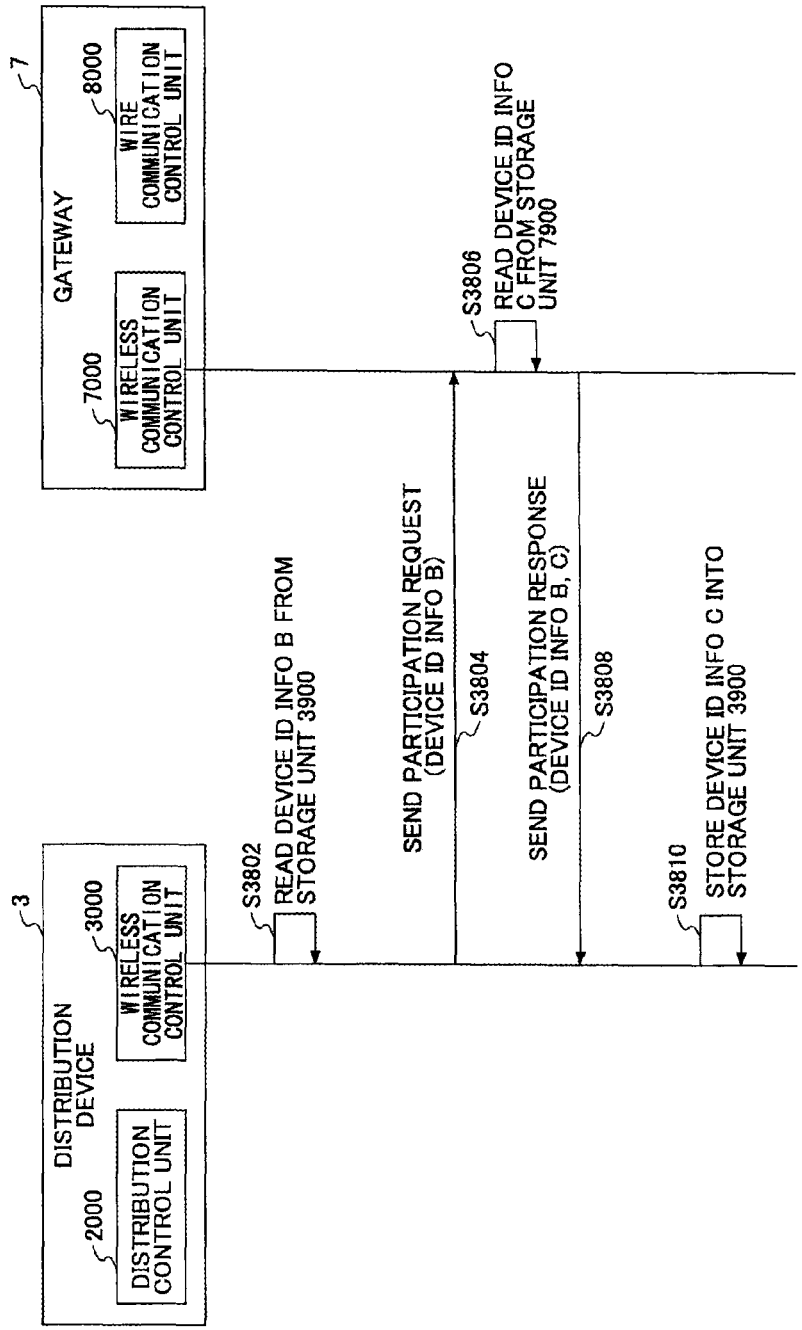
FIG. 38 is a sequence chart for building up a communication network on a ceiling according to an embodiment of the invention.

FIG. 38 is a sequence chart for building up a communication network on the ceiling β in the indoor space α according to the present embodiment.

First, if a user turns on the power to each of the electric devices 2 in the indoor space α, the storage/readout unit 3800 of the wireless communication control unit 3000 in each distribution device 3 (see FIG. 35) reads device ID information B from the storage unit 3900 (Step S3802). Then, the send-receive unit 3100 sends a participation request, including the device ID information B of itself, to the gateway 7 (Step S3804), which is received by the send-receive unit 7100 of the wireless communication control unit 7000 of the gateway 7.

Next, the storage/readout unit 7800 of the wireless communication control unit 7000 reads device ID information C from the storage unit 7900 (Step S3806). Next, the send-receive unit 7100 sends a participation response, including the device ID information B and C, to the distribution device 3 (Step S3808), which is received by the send-receive unit 3100 of the wireless communication control unit 3000 of the distribution device 3. In this case, the participation response includes the device ID information B sent at Step S3804, hence the wireless communication control unit 3000 treats the receiving operation at Step S3808 as an operation associated with Step S3804. Next, the storage/readout unit 3800 stores the device ID information C into the storage unit 3900 (Step S3810). By storing the device ID information C of the gateway 7 at the distribution devices 3 as above, the communication network between the distribution devices 3 and the gateway 7 is established.

Figure 39:
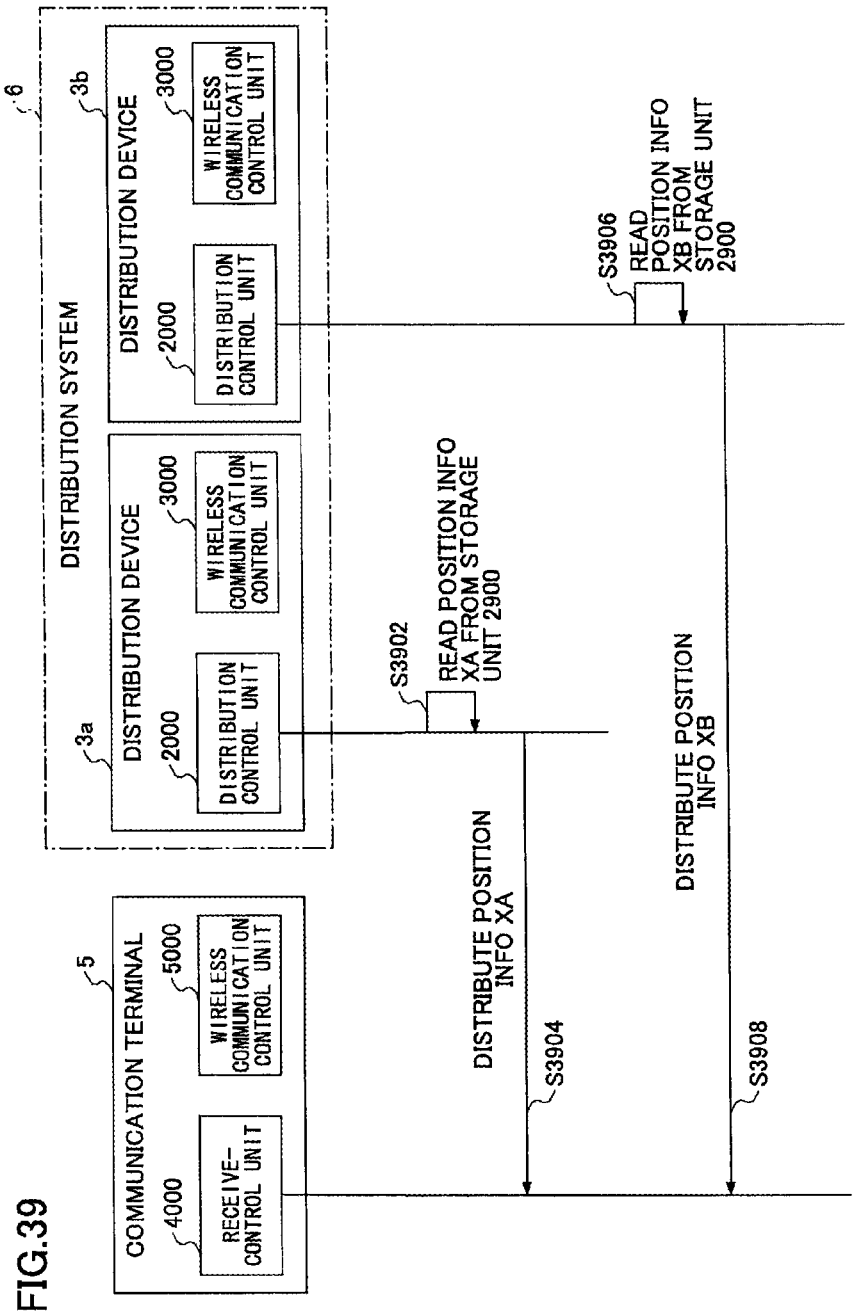
FIG. 39 is a sequence chart for distributing position information according to an embodiment of the invention.

Next, with reference to FIG. 39, an operational sequence will be described in which position information is distributed from a distribution device 3 on the ceiling β to the floors in the indoor space α shown in the FIG. 37. FIG. 39 is a sequence chart for distributing position information according to the present embodiment. In FIG. 39, for the sake of simplicity, it is assumed that two distribution devices 3a and 3b are included in a distribution system 6, in which the distribution device 3a distributes position information Xa, and the distribution device 3b distributes position information Xb. Also assumed in FIG. 39 is that a communication terminal 5 is located at a position that is included in a distribution area of each of the distribution devices 3a and 3b.

First, the storage/readout unit 2800 of the distribution control unit 20 of the distribution device 3a reads the position information Xa of itself from the storage unit 2900 (Step S3902). Next, the distribution unit 2100 of the distribution control unit 2000 of the distribution device 3a distributes the position information Xa to its distribution area (Step S3904). Similarly, the storage/readout unit 2800 of the distribution control unit 20 of the distribution device 3b reads the position information Xb of itself from the storage unit 2900 (Step S3906). Next, the distribution unit 2100 of the distribution control unit 2000 of the distribution device 3b distributes the position information Xa to its distribution area (Step S3908). Here, even if the position information Xa and Xb are distributed, the position information Xa and Xb cannot be received by the communication terminal 5 if the receiving unit 4100 has not been started up.

Figure 40:
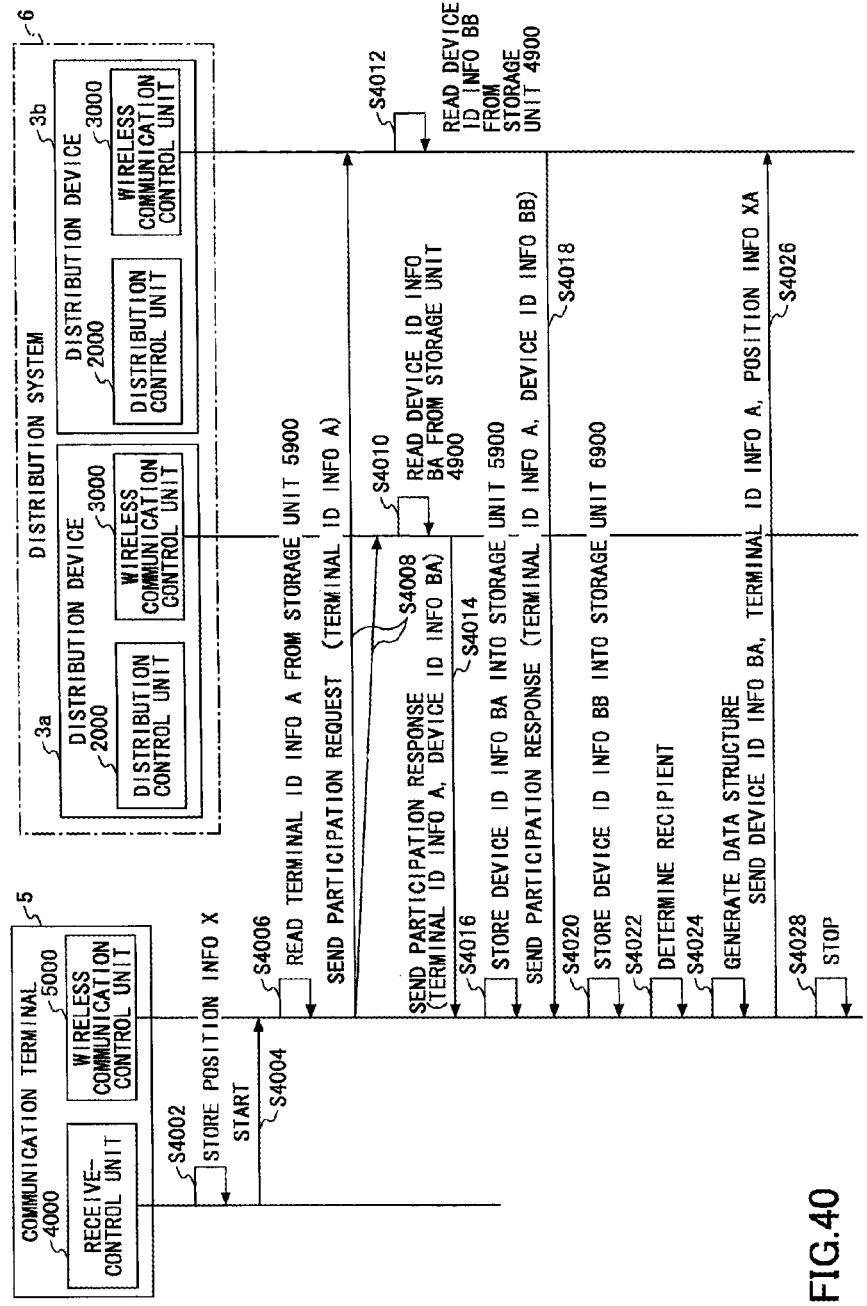
FIG. 40 is a sequence chart for determining position information used by a communication terminal, as well as for determining a distribution device as a recipient of the position information according to an embodiment of the invention.

Next, with reference to FIG. 40, an operational sequence will be described in which the communication terminal 5 determines position information X to be used as well as a distribution device 3 as a recipient of the position information X. FIG. 40 is a sequence chart for determining position information used by the communication terminal 5, as well as for determining a distribution device as a recipient of the position information according to the present embodiment. In FIG. 40, the communication terminal 5 receives the position information Xa from the distribution device 3a, which is sent to the distribution device 3b, not to the distribution device 3a, or the original sender of the position information Xa.

First, as shown in FIG. 40, the storage/readout unit 4800 of the receive control unit 4000 of the communication terminal 5 stores position information X that has the strongest signal strength when received at the communication terminal 5 into the storage unit 4900, which is selected among the position information Xa distributed from the distribution device 3a and the position information Xa distributed from the distribution device 3b (Step S4002). The stored position information X will be managed in the position information management system 9 as the position of the communication terminal 5.

Figure 41:
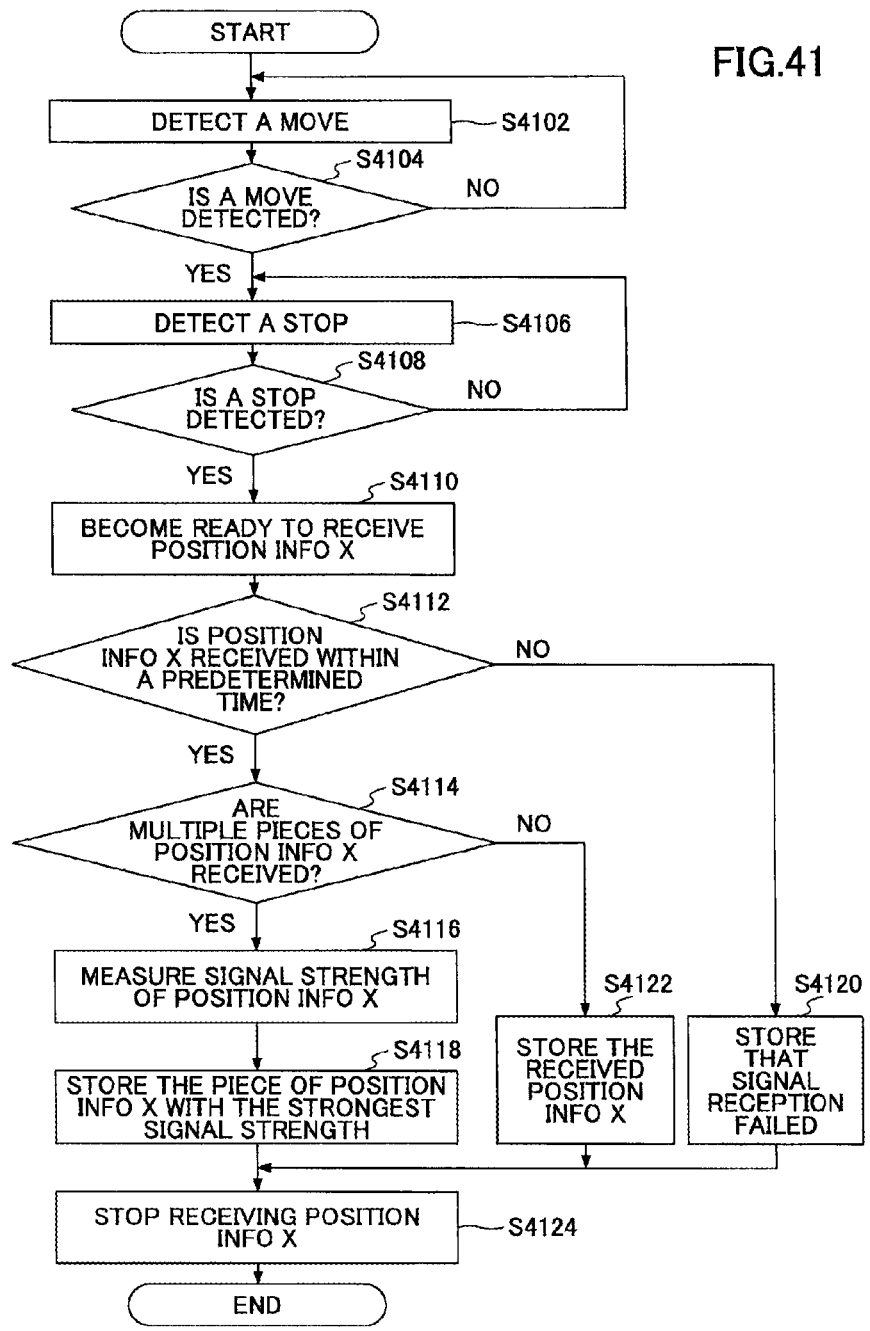
FIG. 41 is a flowchart for a communication terminal to receive position information, then to store the position information according to an embodiment of the invention.

Here, Step S4002 will be described in detail with reference to FIG. 41. FIG. 41 is a flowchart for a communication terminal to receive position information, then to store the position information according to the present embodiment.

First, the detection unit 4200 of the receive control unit 4000 of the communication terminal 5 continues to monitor whether the communication terminal 5 starts moving (Steps S4102 and S4104). Next, if the detection unit 4200 detects that the communication terminal 5 starts moving (YES at Step S4104), the detection unit 4200 continues to monitor whether the communication terminal 5 stops moving (Step S4106, NO at S4108). Specifically, if the CPU 4010 shown in FIG. 29 suspends its operation, and the acceleration sensor 4050 detects an acceleration change, the acceleration sensor 4050 sends a signal which indicates that the communication terminal 5 starts moving to the CPU 4010, to start up the CPU 4010. With this signal, the CPU 4010 starts up its operation. Next, the CPU 4010 continues to be ready to receive a signal which indicates that the communication terminal 5 stops moving from the acceleration sensor 4050. Here, a movement of communication terminal 5 includes a tilt of the communication terminal 5.

Next, at Step S4108, if the detection unit 4200 detects that the communication terminal 5 stops moving (YES at Step S4108), the receiving unit 4100 becomes ready to receive position information X distributed by a distribution device 3 (Step S4110). Specifically, if the CPU 4010 shown in FIG. 29 receives a signal which indicates that the communication terminal 5 stops moving from the acceleration sensor 4050, the CPU 4010 sends a signal for starting up the communication circuit 4040 to the communication circuit 4040. With this signal, the communication circuit 4040 starts up its operation. Here, if the position information Xa and Xb are distributed from the distribution device 3a and 3b, respectively, the communication circuit 4040 of the control unit 1400 of the communication terminal 5 can start receiving the position information Xa and Xb via the antenna 4040a.

Next, the determination unit 4300 determines that the receiving unit 4100 receives at least one record of position information X within a predetermined time (for example, within 5 s), after becoming ready to receive position information (Step S4112). For the moment, assume that two records of the position information Xa and Xb are received within the predetermined time.

If, at Step S4112, the determination unit 4300 determines that the receiving unit 4100 receives at least one record of position information (YES), the determination unit 4300 further determines whether multiple records of position information X are received (Step S4114).

Next, if determined that multiple records of position information X are received at Step S4114 (YES), the measurement unit 4400 measures the strength of the signals when the position information X is received at the receiving unit 4100 (Step S4116). Here, assume that the strength of the signal conveying the position information Xa is stronger than the one conveying the position information Xb.

Next, the storage/readout unit 4800 stores the position information X that has the strongest signal strength measured at Step S4116 into the storage unit 4900 (Step S4118). Here, based on the assumption, the position information Xa is stored.

On the other hand, if, at Step S4112, the determination unit 4300 determines that the receiving unit 4100 does not receive any records of position information X within a predetermined time (NO), the storage/readout unit 48 stores a record of failed receipt into the storage unit 4900 (Step S4120).

Also, if, at Step S4114, the determination unit 4300 determines that the receiving unit 4100 does not receive multiple records of position information X within a predetermined time (NO), the storage/readout unit 4800 stores the only one received position information X (Step S4122).

Next, having finished with Step S4118, S4120, or S4122, the receiving unit 4100 stops its operation, to become unable to receive position information X (Step S4124). Specifically, the CPU 4010 shown in FIG. 29 sends a signal for stopping the communication circuit 4040 to the communication circuit 4040. Thus, position information X is received only when the communication terminal 5 makes a move followed by a stop, which makes power consumption small. For example, if a small-capacity battery such as the button battery 4060 is used, the battery needs to be exchanged with a minimum frequency.

Here, the receiving unit 4100 becomes ready to receive position information X if the communication terminal 5 starts moving (YES at Step S4104), and stops moving (YES at Step S4108) (Step S4110). Namely both start and stop constitute a trigger to make the receiving unit 4100 become ready to receive position information X. However, the trigger is not limited to the above, but other triggers may be used. For example, only a start of the communication terminal 5 (YES at Step S4104) may make the receiving unit 4100 become ready to receive position information X. Namely, by skipping Steps S4106 and 4108 above, the start of a move may be treated as a trigger to make the receiving unit 4100 become ready to receive position information X. Alternatively, for example, by skipping Steps S4102 and S4104 above, the stop of a move may be treated as a trigger to make the receiving unit 4100 become ready to receive position information X.

Next, referring to FIG. 40 again, the communication unit 4700 of the receive control unit 4000 directs the wireless communication control unit 5000 to start its operation (Step S4004). Receiving the direction, the communication unit 5700 of the wireless communication control unit 5000 starts its operation.

First, the storage/readout unit 5800 of the wireless communication control unit 5000 of the communication terminal 5 reads terminal ID information A of itself from the storage unit 5900 (Step S4006). Next, the send-receive unit 5100 sends a participation request, including the terminal ID information A, to the distribution devices 3a and 3b (Step S4008), which is received by the distribution devices 3a and 3b.

Next, the storage/readout unit 3800 of the wireless communication control unit 3000 of the distribution device 3a reads device ID information Ba of itself from the storage unit 4900 (Step S4010). Next, the send-receive unit 3100 of the distribution device 3a sends a participation response including the terminal ID information A and the device ID information Ba to the communication terminal 5 (Step S4014), which is received by the send-receive unit 5100 of the wireless communication control unit 5000 of the communication terminal 5. In this case, the participation response includes the terminal ID information A sent at Step S4008, hence the communication terminal 5 treats the receiving operation at Step S4014 as an operation associated with Step S4008. Next, the storage/readout unit 5800 of the wireless communication control unit 5000 of the communication device 5 stores the device ID information Ba into the storage unit 5900 (Step S4016).

Likewise at the distribution device 3b, the storage/readout unit 3800 of the wireless communication control unit 3000 of the distribution device 3b reads device ID information Bb of itself from the storage unit 4900 (Step S4012). Also, the send-receive unit 3100 of the distribution device 3b sends a participation response the including terminal ID information A and the device ID information Bb to the communication terminal 5 (Step S4018), which is received by the send-receive unit 5100 of the wireless communication control unit 5000 of the communication terminal 5. Next, the storage/readout unit 5800 of the wireless communication control unit 5000 of the communication device 5 stores the device ID information Bb into the storage unit 5900 (Step S4020).

Figure 42:
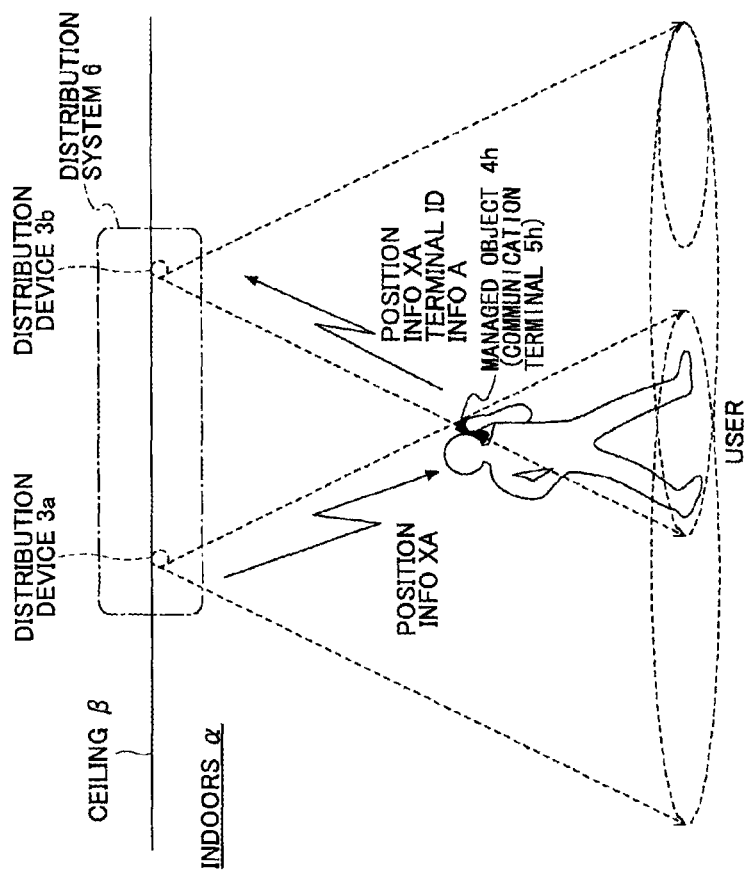
FIG. 42 is a schematic view illustrating a communication state between a distribution device and a communication terminal according to an embodiment of the invention.

Next, the wireless communication control unit 5000 determines a distribution device 3 as a recipient of the position information X received from one of the distribution devices and the terminal ID information A of itself (Step S4022). Before describing a detailed operational sequence of Step S4022 with reference to FIG. 43, a preliminary explanation about Step S4022 will be given with reference to FIGS. 28, 35, and 42. FIG. 42 is a schematic view illustrating a communication state between a distribution device 3 and a communication terminal 5 according to the present embodiment.

As shown in FIG. 35, communication between the distribution control unit 2000 of a distribution device 3 and the receive control unit 4000 of a communication terminal 5 is independent of communication between the wireless communication control unit 3000 of the distribution device 3 and the wireless communication control unit 5000 of the communication terminal 5. The receive control unit 4000 receives position information X from the distribution device 3, whereas the wireless communication control unit 5000 sends back the position information X along with terminal ID information A of itself to the distribution device 3.

If every distribution device 3 is equipped with the distribution control unit 2000 and the wireless communication control unit 3000, and the indoor space α has a large floor area, a number of distribution devices 3 need to be installed, which may raise the installation cost (Pattern 1).

Although the distribution device 3a can distribute position information Xa, if the wireless communication control unit 3000 of the distribution device 3a is out of order, it may be impossible to receive the terminal ID information A and the position information Xa sent by a communication terminal 5 (Pattern 2).

In addition, the signal strength from a distribution device 3 to a communication terminal 5 changes depending on the position of the communication terminal 5 in the indoor space α. Therefore, if multiple distribution devices 3 are installed on the ceiling β, and if the signal strength of position information X distributed by the distribution control unit 2000 of the distribution device 3a (see Step S3906) is stronger than the one distributed by the distribution control unit 2000 of the distribution device 3b (see Step S3908), a participation response sent by the wireless communication control unit 3000 of the distribution device 3a (Step S4014) is weaker than a participation response sent by the wireless communication control unit 3000 of the distribution device 3b (Step S4018) (Pattern 3).

Figure 43:
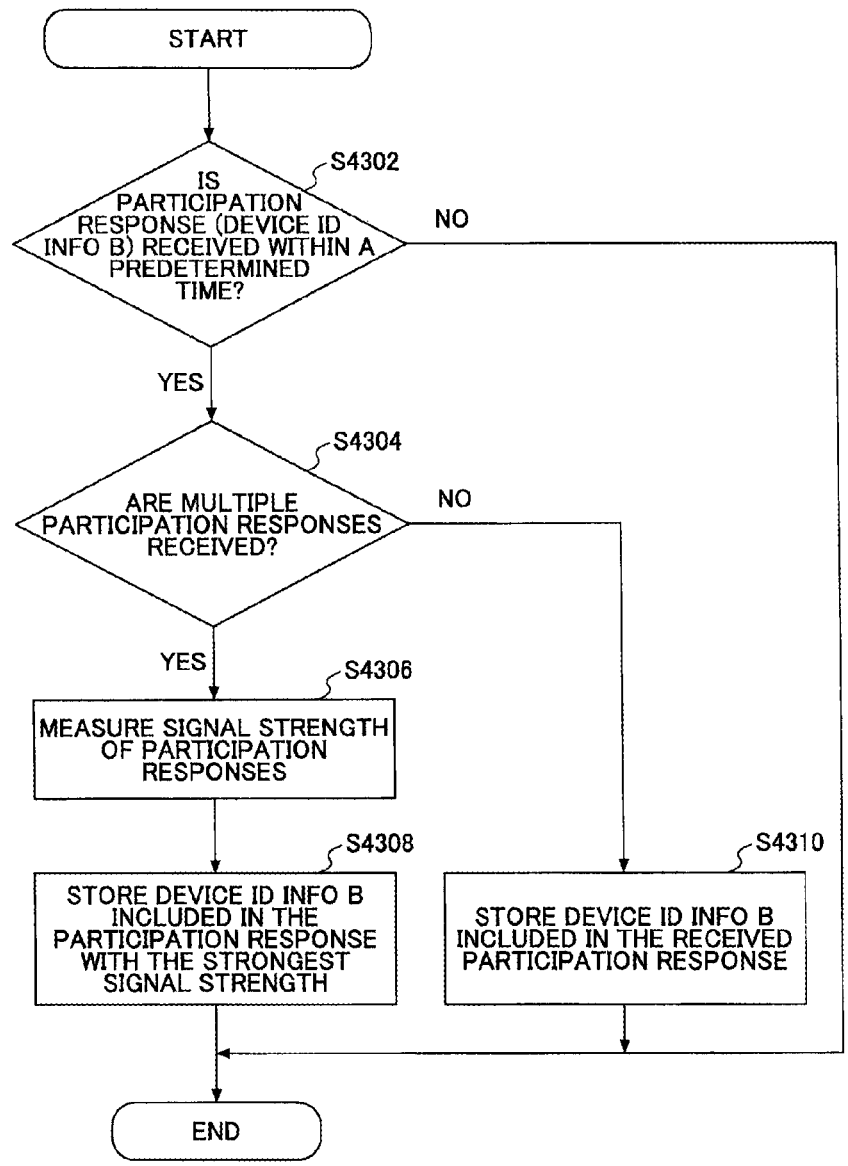
FIG. 43 is a flowchart for determining a recipient according to an embodiment of the invention.

In case of Patterns 1 to 3 above, as shown in FIG. 42, the communication terminal 5h receives the position information Xa from the distribution device 3a, which is not sent back to the distribution device 3a, but sent to the distribution device 3b that is different from the sender of the position information Xa, along with terminal ID information A of itself. In the following, with reference to FIGS. 35 and 41, a case will be described in which a recipient device is not the same as a sender device. FIG. 43 is a flowchart for determining a recipient device according to the present embodiment.

The determination unit 5300 of the wireless communication control unit 5000 of the communication terminal 5 shown in FIG. 35 determines whether the send-receive unit 5100 receives at least one participation response within a predetermined time (for example, 5 s) after sending a participation request to the distribution devices 3a and 3b at Step S4008 (Step S4302). Namely, the determination unit 5300 determines whether the send-receive unit 5100 receives at least one record of device ID information B within the predetermined time after sending the terminal ID information A.

If, at Step S4302, the determination unit 5300 determines that the send-receive unit 5100 receives at least one participation response (YES), the determination unit 5300 further determines whether multiple participation responses are received (Step S4304). Namely, the determination unit 5300 determines whether the send-receive unit 5100 receives multiple records of device ID information B within the predetermined time after sending the terminal ID information A.

Next, if determined that multiple participation responses are received at Step S4304 (YES), the measurement unit 5400 measures the strength of the signals when the participation responses are received at the send-receive unit 5100 (Step S4306).

Here, Step S4306 is executed because the wireless communication control unit 5000 of the communication terminal 5 receives participation responses from the distribution devices 3a and 3b at Steps S4014 and S4018.

Next, a case will be explained in which the signal strength of the participation response from the distribution device 3b is stronger than the participation response from the distribution device 3a, as the result of the measurement at Step S4306. As shown in FIG. 43, the storage/readout unit 5800 stores the device ID information B in the participation response that has the strongest signal strength among the signals measured at Step S4306 (here, the device ID information Bb), into the storage unit 5900 (Step S4308).

If, at Step S4302, the determination unit 5300 determines that the send-receive unit 5100 does not receive any participation responses within a predetermined time (NO), the procedure to determine a recipient ends. Also, if, at Step S4304, the determination unit 5300 determines that the send-receive unit 5100 does not receive multiple participation responses (NO), the storage/readout unit 5800 stores the device ID information B included in the only one participation response into the storage unit 5900 (Step S4310).

Thus, a distribution device 3 corresponding to the device ID information B stored in the storage/readout unit 5800 is determined as the recipient of the communication terminal 5.

Next, having finished with Steps S4308 or 4310, the send-receive unit 5100 generates a data structure as shown in FIG. 30 (Step S4024), which is to be sent to the recipient determined at Step S4022. The data structure includes the device ID information Bb of the distribution device 3b as a recipient, the terminal ID information Ah of the communication terminal 5h as a sender, and data content (here, the position information Xa of the distribution device 3a as a distributor), in this order.

Next, the send-receive unit 5100 sends the data structure generated at Step S4024 to the distribution device 3b (Step S4026), which is received by the wireless communication control unit 3000 of the distribution device 3b.

Next, the communication terminal 5h stops its operation at the send-receive unit 5100 of the wireless communication control unit 5000, the determination unit 5300, the measurement unit 5400, the communication unit 5700, and the storage/readout unit 5800 (Step S4028). By stopping the operation of the relevant sections of the wireless communication control unit 5000 after the send-receive unit 5100 sends the position information X and the like to the distribution device 3, power consumption can be reduced. The operation of the relevant sections of the wireless communication control unit 5000 can be resumed when receiving a new start command from the receive control unit 4000 at Step S4004 above.

Figure 44:
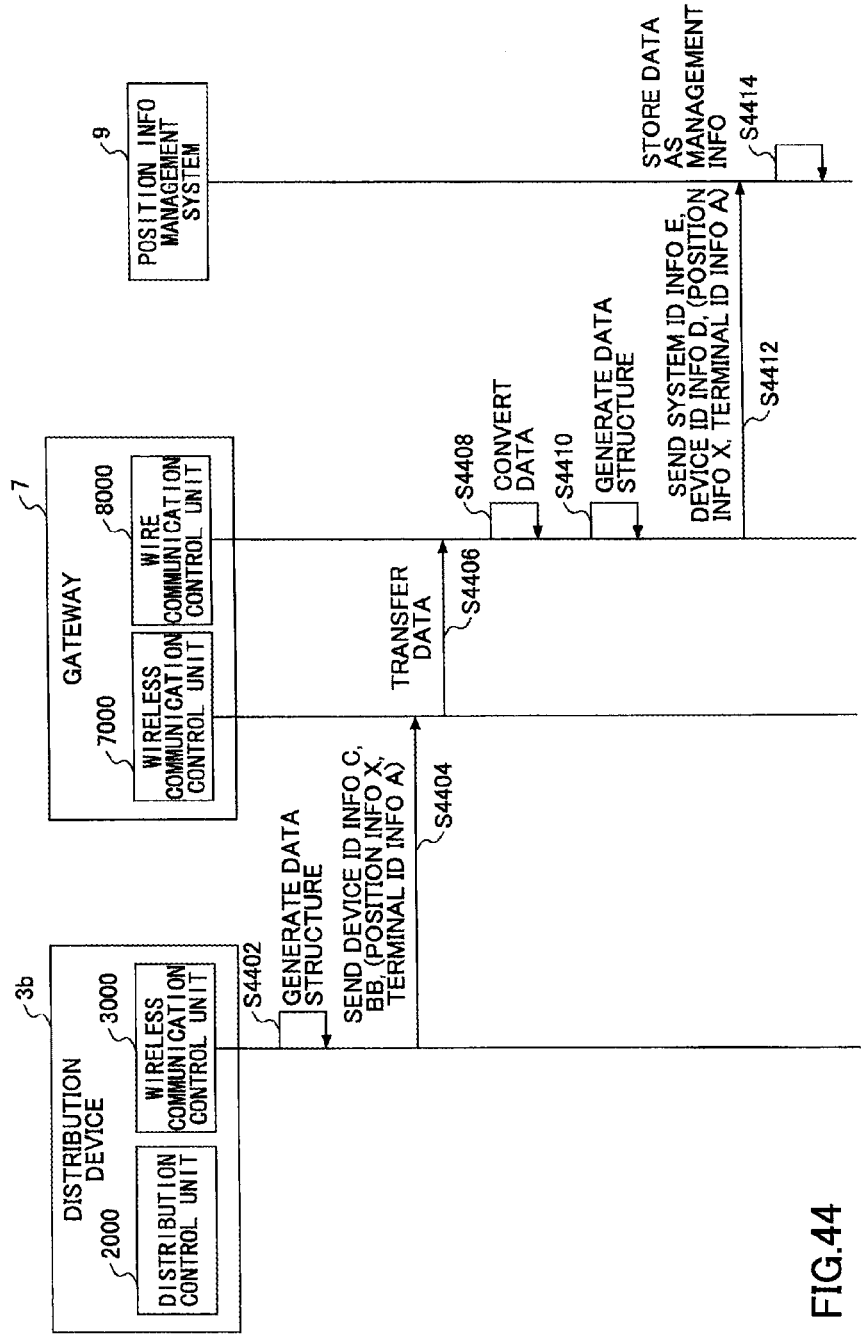
FIG. 44 is a sequence chart for managing position information according to an embodiment of the invention.

Next, with reference to FIG. 44, an operational sequence will be described in which information including position information X is received at a distribution device 3, then managed as management information F in the position information management system 9. FIG. 44 is a sequence chart for managing position information according to the present embodiment.

As shown in FIG. 44, first, the wireless communication control unit 3000 of the distribution device 3b generates the data structure as done at Step S4024 above (Step S4402), to be sent to the gateway 7. The data structure includes the device ID information C of the gateway 7 as a recipient, the device ID information Bb of the distribution device 3b as a sender, and data content (the position information Xa as a distributor, and the terminal ID information A of the communication terminal 5 as a sender of position information Xa of the distribution device 3a), in this order.

Next, the send-receive unit 3100 of the wireless communication control unit 3000 of the distribution device 3b sends the data structure generated at Step S4402 above to the gateway 7 (Step S4404), which is received by the send-receive unit 7100 of the wireless communication control unit 7000 of the gateway 7.

Next, the communication unit 7700 of the wireless communication control unit 7000 transfers the data structure received at Step S4404 to the communication unit 8700 of the gateway 7 (Step S4406), which is received by the wire communication control unit 8000.

Next, the conversion unit 8200 of the wire communication control unit 8000 converts a communication method compliant with IEEE 802.15.4 into a communication method compliant with IEEE 802.3 so that the data sent from the distribution device 3 can be transferred as packets in Ethernet. Next, the send-receive unit 8100 of the wire communication control unit 8000 generates the data structure as done at Step S4402 above (Step S4410), to be sent to the position information management system 9. The data structure includes the system ID information E of the position information management system 9 as a recipient, the device ID information D of the gateway as a sender, and data content (the position information Xa of the distribution device 3a as a distributor, and the terminal ID information A of the communication terminal 5 as a sender of the position information Xa), in this order.

Next, the send-receive unit 8100 of the wire communication control unit 8000 of the gateway 7 sends the data structure generated at Step S4410 above to the position information management system 9 (Step S4412), which is received by the send-receive unit 9100 of the position information management system 9.

Next, the storage/readout unit 9800 of the position information management system 9 manages position information by associating the position information Xa and its received date and time with the terminal ID information A stored in the storage unit 9900 in advance, as shown in FIG. 34 as management information F (Step S4414).

Thus, by having the position information management system 9 manage management information F, an administrator of the position information management system 9 can make a search shown in FIGS. 16-17. FIGS. 16-17 show screen examples of the position information management system 9.

For example, if an administrator operates the keyboard 9110, the mouse 9120 and the like shown in FIG. 33, the operational input receiving unit 9200 receives the operation, then the display control unit 9400 reads the management information F via the storage/readout unit 9800, and displays a search screen on the display 9080 as shown in FIG. 16. On the search screen, a list of owners/administrators and device names is displayed, with check boxes on the right of the device names. An "Execute search" button is also displayed at the lower right corner to start executing a search. On the search screen shown in FIG. 16, for example, a device "UCS P3000" owned by "Sales Division 1" is selected as an item to be searched.

Next, the administrator operates the keyboard 9110, the mouse 9120 and the like to put a check mark in a check box for a device name whose position is needed (a managed object 4), which is received by the operational input receiving unit 9200. Next, if the administrator pushes the "Execute search" button after putting check marks in check boxes for all device names whose positions are needed, the operational input receiving unit 9200 receives "Execute search", then the search unit 9300 searches for the check-marked device names in the management information F stored in the storage unit 9900, to extract a relevant part of the management information F including the position information X of the devices, and layout information G including the position information X, which includes floor layouts.

Next, the display control unit 9400 displays a search result screen on the display 9080 as shown in FIG. 17, based on the management information F and the layout information G. The search result screen shows a floor layout of the fourth floor of the building A where the "UCS P3000" is located, and the device name and the received date and time extracted from the management information F. Thus, the administrator can grasp visually where a managed object 4 (communication terminal 5) is located.

As described above, a distribution device 3 includes not only the distribution unit 2100, but also the send-receive unit 3100 according to the present embodiment. This implies that, for a communication terminal 5 within an area where position information X from a distribution device 3 is distributed, it is possible to minimize power consumption because the communication terminal only needs to send the position information X and terminal ID information A back to the distribution device 3 within the area. Therefore, the distribution device contributes to minimize power consumption of the communication terminal 5.

Also, the position information X is received only when the communication terminal 5 makes a move and a stop, which makes power consumption of the battery small. Moreover, by stopping the operation of the relevant sections of the wireless communication control unit 5000 after the send-receive unit 5100 sends the position information X and the like to the distribution device 3, power consumption can be reduced. With low power consumption, if a small-capacity battery such as the button battery 4060 is used, the battery needs to be exchanged with a minimum frequency, which saves time and effort of a user.

Also, as shown in FIG. 42, the distribution device 3b, instead of the distribution device 3a, can receive the position information Xa and terminal ID information A from the communication terminal 5, so that an installation cost of distribution devices 3 can be reduced (see Pattern 1 described above). Also, even if the wireless communication control unit 3000 becomes out of order, the distribution system 6 can continue its operation by receiving the position information Xa and terminal ID information A from a communication terminal 5. (see Pattern 2 described above). Moreover, the communication terminal 5 can send the position information X and terminal ID information A to a distribution device 3 capable of communicating with greater signal strength. Therefore, it is possible for the distribution system 6 as a whole to receive the position information X and terminal ID information A from the communication terminal 5 more securely (see Pattern 3 described above).

Here, the position information management system 9 may be installed on a single computer, or may be divided into parts (functional units/sections or storage units) to be installed on multiple computers.

A recording medium, such as a CD-ROM, or a hard disk that stores the programs according to an embodiment can be offered as a program product domestically or overseas.

Moreover, the determination unit 6300 may include the determination unit 6600. Namely, the two determination units 6300 and 6600 may be the same unit or different units. Similarly, the measurement unit 6400 may include the measurement unit 6700. Namely, the two measurement units can be the same unit or different units.

Third Embodiment

Usage of the position management system 1 is not limited to the above embodiments.

Figure 45:
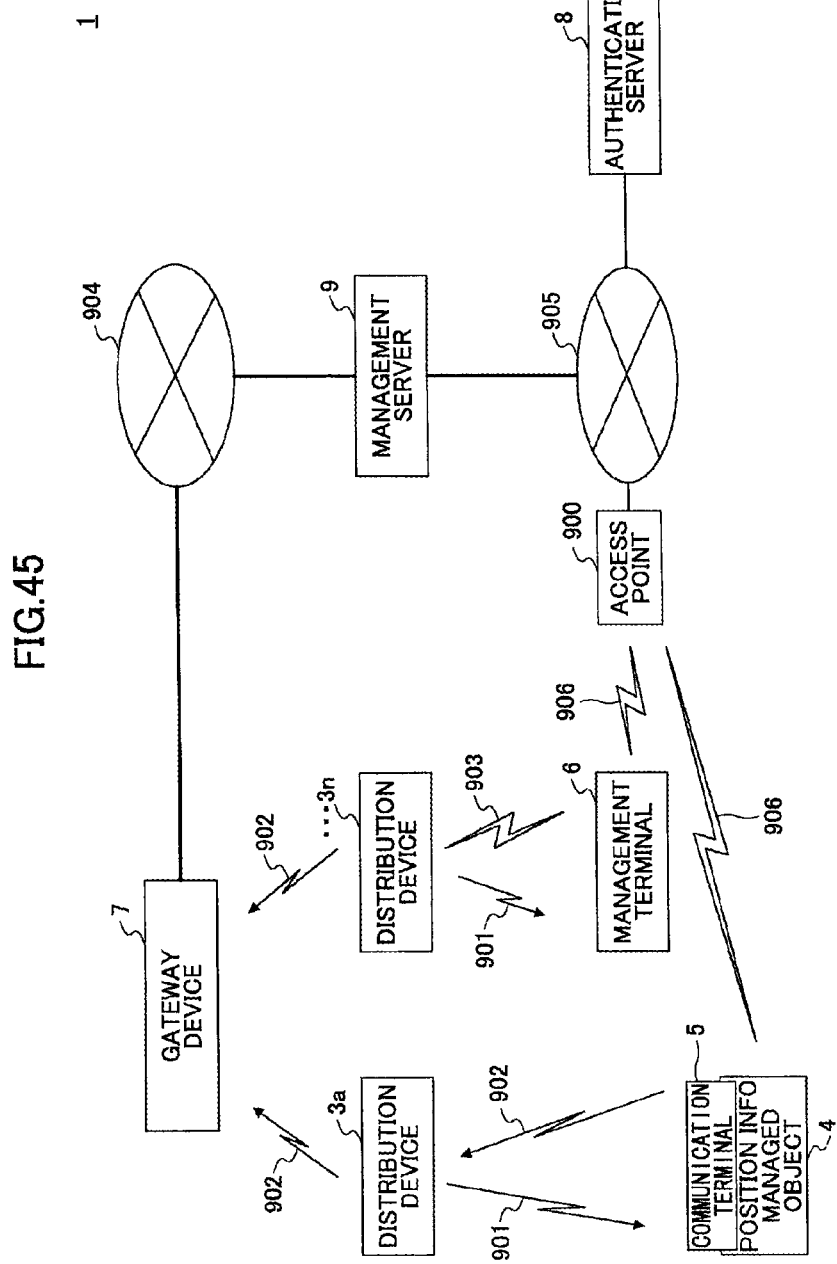
FIG. 45 is a system configuration diagram of a position information setting system according to an embodiment of the invention.

FIG. 45 is a system configuration diagram of a position information setting system 1 according to the present embodiment. As shown in FIG. 45, the position information setting system 1 includes distribution devices 3a-3n (referred to as a distribution device 3 where explicit distinction is not required), a communication terminal 5, a management terminal 6, a gateway device 7, an authentication server 8, and a management server 9. A position information managed object 4 has the communication terminal 5 attached. Here, there may be multiple communication terminals 5, management terminals 6, and gateway devices 7. The gateway device 7 corresponds to the management device 140 described above. The management terminal 6 corresponds to the management terminal 500 described above. The management server 9 corresponds to the management server 160 described above. The authentication server 8 corresponds to the certificate authority server described above.

The distribution device 3 distributes an IMES message using, for example, a network 901 where IMES is adopted. As shown in FIG. 45, the communication terminal 5 and the management terminal 6 positioned in a predetermined area receive the IMES message distributed by the distribution device 3. The IMES message includes, for example, position information set on the distribution device 3.

The communication terminal 5, the distribution device 3, and the gateway device 7 are connected to communicate with each other via a network 902 that uses, for example, ZigBee (trademark) which adopts the physical layer and the MAC layer in the architecture model of the IEEE 802.15.4 standard. In this case, depending on a region such as Japan, US, or Europe, the distribution device 3 may use a frequency band of 800 MHz, 900 MHz, or 2.4 GHz, for sending data to the gateway 7 via an adjacent distribution device 3.

The management terminal 6 and the distribution device 3 are connected to communicate with each other via a network 903, which uses, for example, IEEE 802.15.1 of NFC (Near Field Communication) standard, or Bluetooth (trademark).

The gateway device 7 and the management server 9 are connected to communicate with each other via a network 904, which is, for example, a LAN (Local Area Network).

The management server 9, the authentication server 8, and the access point 900 are connected to communicate with each other via a network such as the Internet. The communication terminal 5, the management terminal 6, and the access point 900 are connected to communicate with each other via a network 906, which is, for example, a wireless LAN compliant with the IEEE 802.11 standard. Therefore, the communication terminal 5, the management terminal 6, the management server 9, and the authentication server can communicate with each other via the networks 906 and 905.

Here, communication methods of the networks 901-906 are not limited to the ones described above, but may be any mobile communication network as long as communication between the devices is possible.

An overview of the position information setting system 1 will be described below. The management server 9 manages the position information of the communication terminal 5 that receives position information from the distribution device 3. This makes it possible to identify the position of the position information managed object 4 based on the position information of the communication terminal 5 attached to it. However, position information of the distribution device 3 may not be set, for example, during the installation period of a position information management system. In this case, the management server 9 cannot manage the position information of the communication terminal 5. According to the present embodiment, if position information is not set on the distribution device 3, the position information setting system 1 sets position information to the distribution device 3 based on the current position information of the management terminal 6. Also, the management terminal estimates the position information of the management terminal 6 by positioning with autonomous navigation. Also, the management terminal 6 makes a request for authentication of a right for setting position information on the distribution device 3 by the management terminal 6 to the authentication server 8 via the management server 9. Here, the authentication server 8 determines whether authentication is executed via the management server 9 that has been given a setting right. This prevents a third party without a setting right from setting position information unintentionally. The authentication server 8 also determines genuineness of position information that is to be set on the distribution device 3 by the management terminal 6. This prevents a wrong position from being set if the position information that management terminal 6 is setting is different from the actual position.

Next, an overview of the devices will be described.

Figure 46:
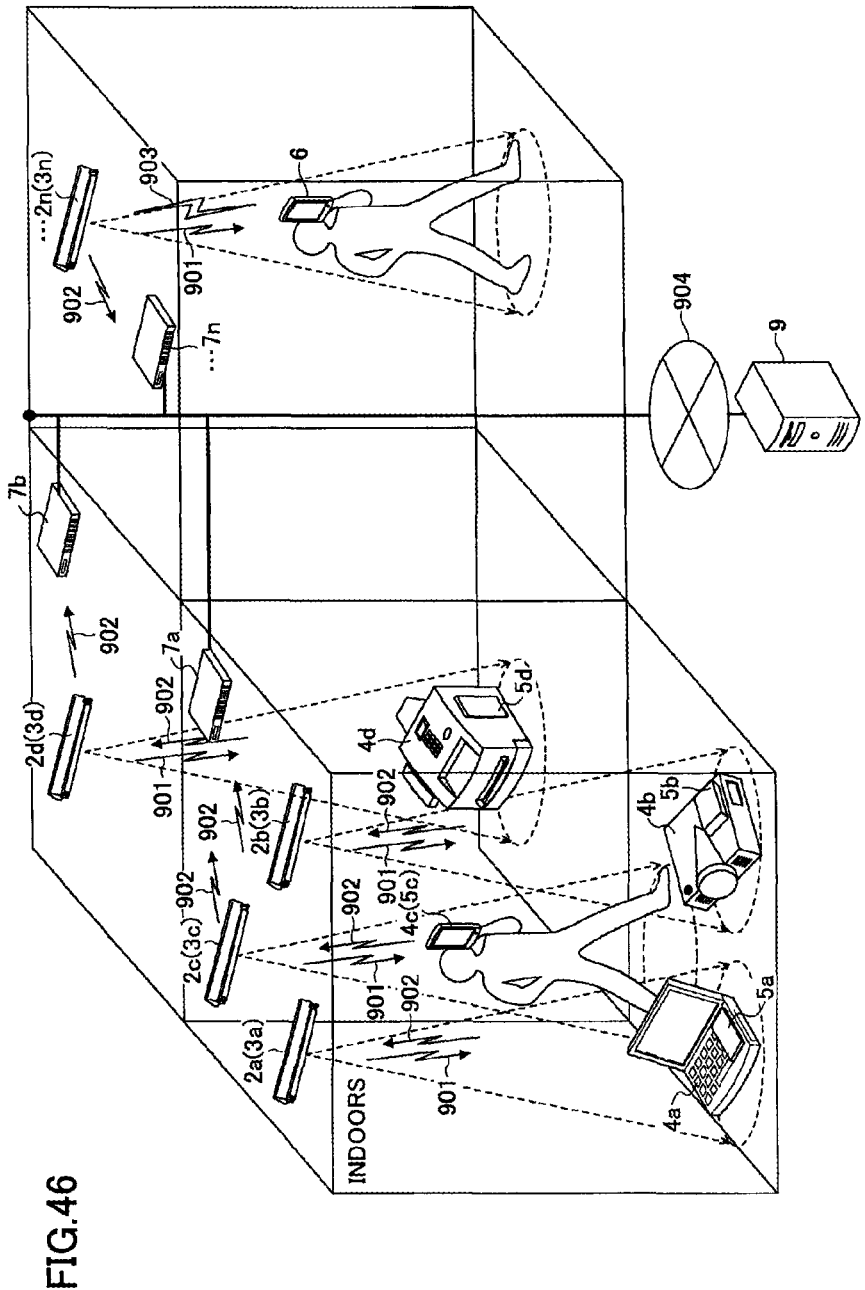
FIG. 46 is a schematic view illustrating installation of distribution devices according to an embodiment of the invention.

FIG. 46 is a schematic view illustrating installation of distribution devices according to the present embodiment. Here, the authentication server 8, the access point 900, the network 905 and the network 906 are omitted in FIG. 46. The distribution devices 3a-3n are installed in or on electric devices 2a-2n (referred to as an electric device 2 where explicit distinction is not required) disposed on a ceiling β in an indoor space, respectively. An electric device 2 feeds power to a distribution device 3. The electric device 2 is, for example, a fluorescent-type LED (Light Emitting Diode) illuminator, a generic fluorescent light, a fan, a speaker, a surveillance camera, an air conditioner, etc. The distribution device 3 continuously or intermittently sends a message compliant with the IMES standard to the predetermined area via the network 901. If position information is set on a distribution device 3 which corresponds to the position where the distribution device 3 is installed, an IMES message includes the position information. On the other hand, if position information is not set on the distribution device 3, an IMES message includes ID information (for example, a MAC address) that uniquely identifies the distribution device 3. Here, the ID information is not limited to a MAC address, but, for example, a device ID or the like, as long as that uniquely identifies the distribution device. The predetermined area is defined by taking the signal strength of an IMES signal, the directivity of a transmission antenna, and the like, into account. The distribution devices 3 are disposed so that areas including positions to be managed are covered, and the areas are not overlapped. Alternatively, overlaps may be allowed as long as one of the distribution devices 3 can be identified by the signal strength of a wireless signal when received. In the example shown in FIG. 46, the predetermined areas are designated by dotted lines forming cones.

As shown in FIGS. 45-46, a communication terminal 5 is, for example, a RFID (Radio Frequency Identification) tag, built in or attached externally on a position information managed object 4. If position information is set on a distribution device 3, the communication terminal 5 receives an IMES message from a distribution device 3 via the network 901 to obtain the position information included in the received IMES message. Next, the communication terminal 5 sends the received position information to the management server 9. Here, the position information sent by the communication terminal 5 includes ID information (for example, a MAC address) that uniquely identifies the communication terminal 5. Here, the ID information is not limited to a MAC address, but, for example, a device ID or the like, as long as that can uniquely identify the device.

A position information managed object 4 is an object whose position is managed by the management server 9, which is not limited to an electronic device, but a bag, a wallet, clothes, or the like that is carried with a user. In FIG.

46, examples of the position information managed objects 4 are shown, which include a PC (Personal Computer) (position information managed object 4a), a projector (position information managed object 4b), a smart phone (position information managed object 4c), and a digital MFP (position information managed object 4d).

The management terminal 6 is a mobile terminal that has an information communication function and information input/output functions, such as a smart phone, a tablet terminal, a PC, etc. The management terminal 6 receives an IMES message sent by the distribution device 3 via the network 901. The management terminal 6 sends a request for setting position information on the distribution device 3 via the network 903.

The gateway device 7 is a bridge, for example, between the network 902 and the network 904 to transfer data sent from one network to the other. The gateway device 7 is installed, for example, in each floor in a building, or in each room partitioned by walls on a floor. If the network 902 is a network based on IEEE 802.15.4 and ZigBee (trademark), and the network 904 is a LAN based on the IEEE 802.3 standard, the management device 140 converts the communication methods between the networks 902 and 904.

The management server 9 is a computer that has a position information management function to manage the position information of the communication terminal 5, and an information communication function, and the like. The management server 9 transfers data sent by the management terminal 6 to the authentication server 8, or transfers data sent by the authentication server 8 to the management terminal 6.

The authentication server 8 is a computer that authenticates a right to set position information on the distribution device 3 by the management terminal 6. The authentication server 8 determines whether authentication is executed via the management server 9 that has been given a setting right. The authentication server 8 also determines genuineness of position information that is to be set on the distribution device 3 by the management terminal 6.

<Overview of System Operation>

Figure 47A:
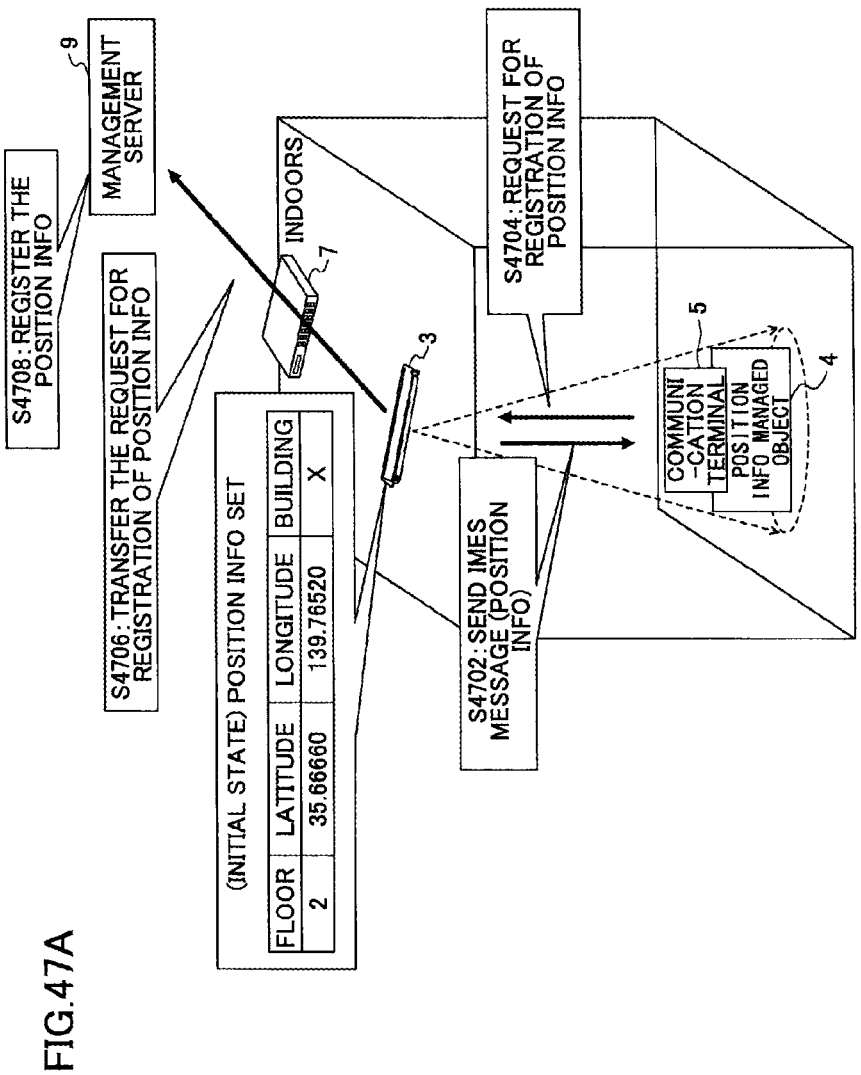
FIGS. 47A-47B are schematic views illustrating operations of a position information setting system when a communication terminal receives an IMES message from a distribution device according to an embodiment of the invention.
Figure 47B:
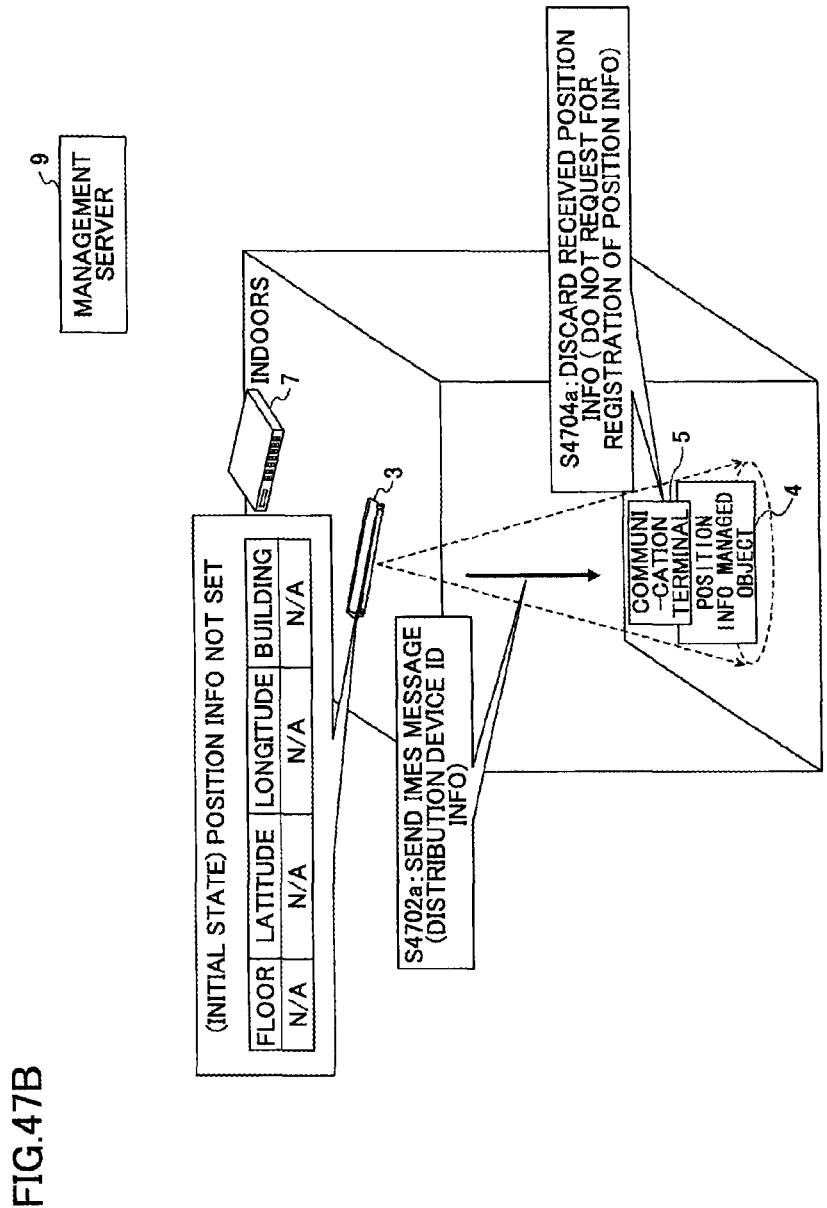

Next, operational sequences of the position information setting system 1 will be described, when a communication terminal 5 receives an IMES message sent by a distribution device 3, for a case in which position information is set on the distribution device 3, and a case in which position information is not set on the distribution device 3. FIGS. 47A-47B are schematic views illustrating operations of the position information setting system 1 when the communication terminal 5 receives an IMES message from the distribution device 3 according to the present embodiment. FIG. 47A shows a case in which position information is set on the distribution device 3, whereas FIG. 47B shows a case in which position information is not set on the distribution device 3.

In FIG. 47A, the distribution device 3 is set with position information at an initial state. Here, the position information includes a floor, latitude, longitude, and a building that specifies the place where the distribution device 3 is installed.

At Step S4702, the distribution device 3 sends an IMES message including position information set on the distribution device 3 to a predetermined area, with a predetermined cycle (for example, one-second cycle).

At Step S4704, if a communication terminal attached to or built in a position information managed object 4 positioned in the predetermined area receives the IMES message, the communication terminal sends a request for registration of the position information included in the IMES on the management server 9 to the distribution device 3. The request for registration of the position information includes the position information and the ID information of the communication terminal 5.

At Step S4706, the distribution device 3 transfers the received request for registration of the position information to the management server 9 via the gateway device 7.

At Step S4708, the management server 9 registers (stores) the position information associating with the ID information of the communication terminal 5.

With Steps S4702-S4708 above, the management server 9 can register and manage the position of the communication terminal 5 that has received the position information sent by the distribution device 3.

Next, a case in which position information is not set on the distribution device 3 will be described with reference to FIG. 47B. As shown in FIG. 47B, since the distribution device 3 is not set with position information, fields of the position information are set with a value designating "N/A" (Not available). Here, when the distribution device 3 is not set with position information, the value set to the field is not limited to "N/A", but any other predetermined default value, such as "0".

At Step S4702a, the distribution device 3 sends an IMES message including ID information of the distribution device 3 to a predetermined area, with a predetermined cycle (for example, one-second cycle).

At Step S4704a, the communication terminal 5 discards the received IMES message because position information is not included in the received IMES message. Consequently, the communication terminal 5 does not send a request for registration of the position information. Alternatively, the communication terminal 5 may send a request for registration of the position information without the position information, then the management server 9 discards the request for registration, when the communication terminal 5 receives an IMES message not including position information.

Figure 48:
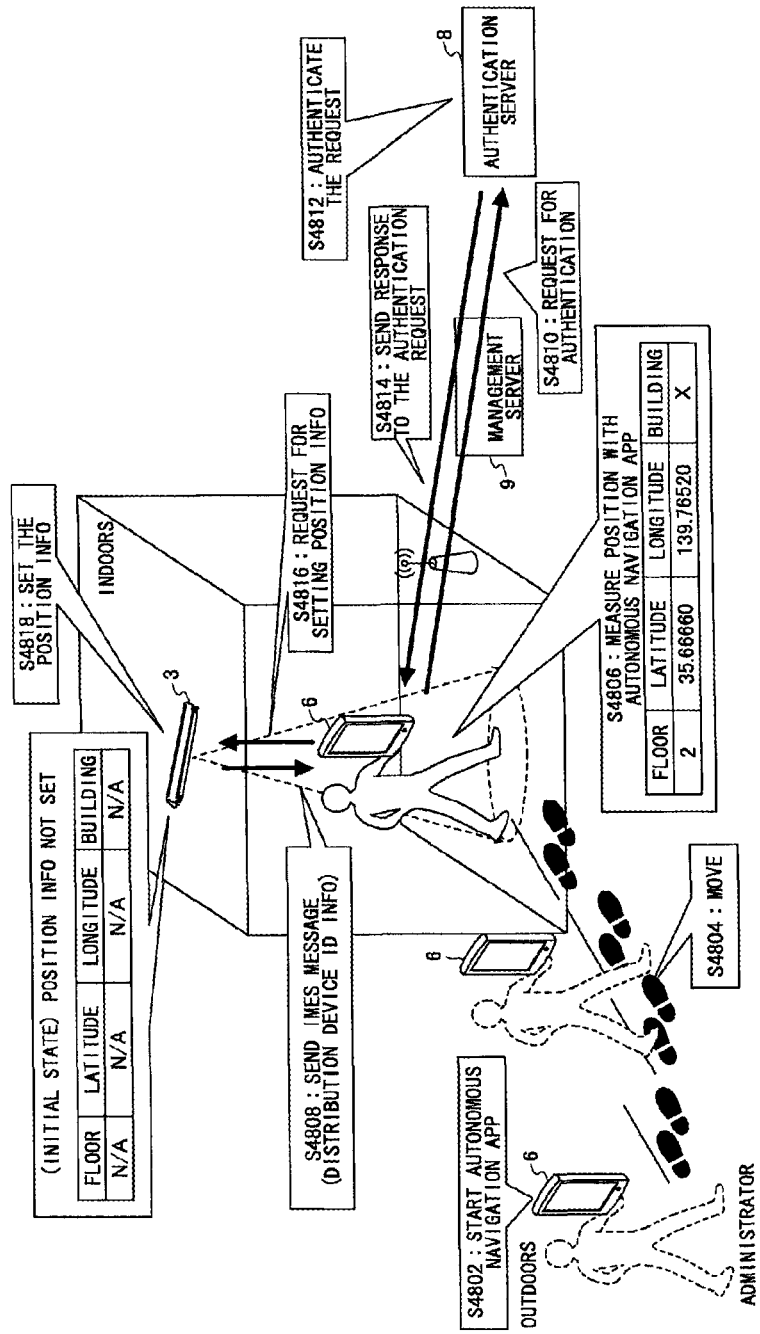
FIG. 48 is a schematic view illustrating operations of a position information setting system when setting position information on a distribution device according to an embodiment of the invention.

Next, an overview of an operation sequence will be described, in which the position information setting system 1 sets position information on the distribution device 3 whose position information is not set initially. FIG. 48 is a schematic view illustrating operations of the position information setting system 1 when setting position information on the distribution device 3 according to the present embodiment. In FIG. 48, the distribution device 3 is not set with position information initially. The management terminal 6 is held by an administrator of the position information setting system 1. The management terminal 6 is preinstalled with an autonomous navigation application. The autonomous navigation application is an application for continuous positioning of a moving object, which utilizes GPS (Global Positioning System) outdoors, and calculates the position of the management terminal 6 when the management terminal 6 moves indoors, by obtaining direction and acceleration information from an inertia sensor attached to the management terminal 6. Using the autonomous navigation application, the administrator can, for example, obtain position information outdoors by GPS, then moves indoors and estimates position information indoors where a GPS signal cannot be received.

At Step S4802, first, the administrator outdoors, operates the management terminal 6 to start up the autonomous navigation application preinstalled on the management terminal 6, which triggers the management terminal 6 to start GPS positioning based on autonomous navigation.

At Step S4804, the administrator moves into the predetermined area where an IMES message from a distribution device 3, on which position information is to be set, can be received while the autonomous navigation application is running on the management terminal 6.

At Step S4806, the management terminal 6 executes positioning with the autonomous navigation application at the place where the administrator has moved at Step S4804. In the present embodiment, position information obtained by the autonomous navigation application will be referred to as "estimated position information", hereafter. The floor and building shown in FIG. 4 are set with the autonomous navigation application by the administrator manually. Estimated position information includes the latitude and longitude obtained from the positioning with the autonomous navigation application and the floor and building manually set by the administrator.

At Step S4808, the distribution device 3 sends an IMES message including ID information of the distribution device 3 to a predetermined area, with a predetermined cycle (for example, one-second cycle), because position information is not set on the distribution device 3. The management terminal 6 receives the IMES message sent by the distribution device 3.

At Step S4810, having received the IMES message sent by the distribution device 3 that includes the ID information of the distribution device 3, the management terminal 6 sends a request for authentication of a right to set the estimated position information on the distribution device 3 to the authentication server 8 via the management server 9. The request for authentication includes the estimated position information. After receiving the request for authentication, the management server 9 adds ID information of the management server 9 to the request for authentication, then transfers the request to the authentication server 8.

At Step S4812, in response to the request, the authentication server 8 authenticates the right to set the estimated position information on the distribution device 3 by the requesting management terminal 6. To obtain the authentication, two conditions need to be satisfied. First, the request for authentication should be sent via a predetermined management server 9. This condition prevents a third party from setting position information on the distribution device 3. Next, the estimated position information included in the request should be genuine. The estimated position information may be determined as genuine, for example, if the estimated position is included in the area of a building where the distribution device 3 is installed. The building where the distribution device 3 is installed may be identified, for example, by identifying a management server 9 that manages the distribution device 3 if the ID information of the management server 9 is associated with the building. This condition prevents a wrong position, such as a position outside of the building, from being set.

At Step S4814, the authentication server 8 sends a response to the request that indicates whether the right to set has been authenticated, to the management terminal 6 via the management server 9.

At Step S4816, if receiving a response that authenticates the right to set, the management terminal 6 sends a request for setting the estimated position information on the distribution device 3 to the distribution device 3. Otherwise, the management terminal 6 terminates without sending a request for setting the position information.

At Step S4818, the distribution device 3 sets the estimated position information included in the request for setting.

With Steps S4802-S4818 above, the position information setting system 1 can set the position information estimated with the autonomous navigation application on the management terminal 6 if the management terminal 6 has a right to set position information on the distribution device 3. Even if absolute position information has not been obtained indoors, the administrator can set the estimated position information on the distribution device 3 based on an estimation with the autonomous navigation application. Also, by determining the right to set position information on the distribution device 3 by the management terminal 6, it is possible to prevent an unauthorized third party from illegally setting position information. Also, by determining genuineness of the position information to be set on the distribution device 3, it is possible to prevent a wrong position from being set.

<Hardware Configuration>
<Communication Terminal>

The hardware configuration of a communication terminal 5 according to the present embodiment is the same as the one shown in FIG. 29, hence the explanation is omitted here.

<Distribution Device>

The hardware configuration of a distribution device 3 according to the present embodiment is the same as the one shown in FIG. 28, hence the explanation is omitted here.

The position information distribution unit 1200 corresponds to the IMES signal distribution unit 1250. The hardware configuration of the IMES signal distribution unit 1250 is substantially the same as the position information distribution unit 1200.

Figure 49:
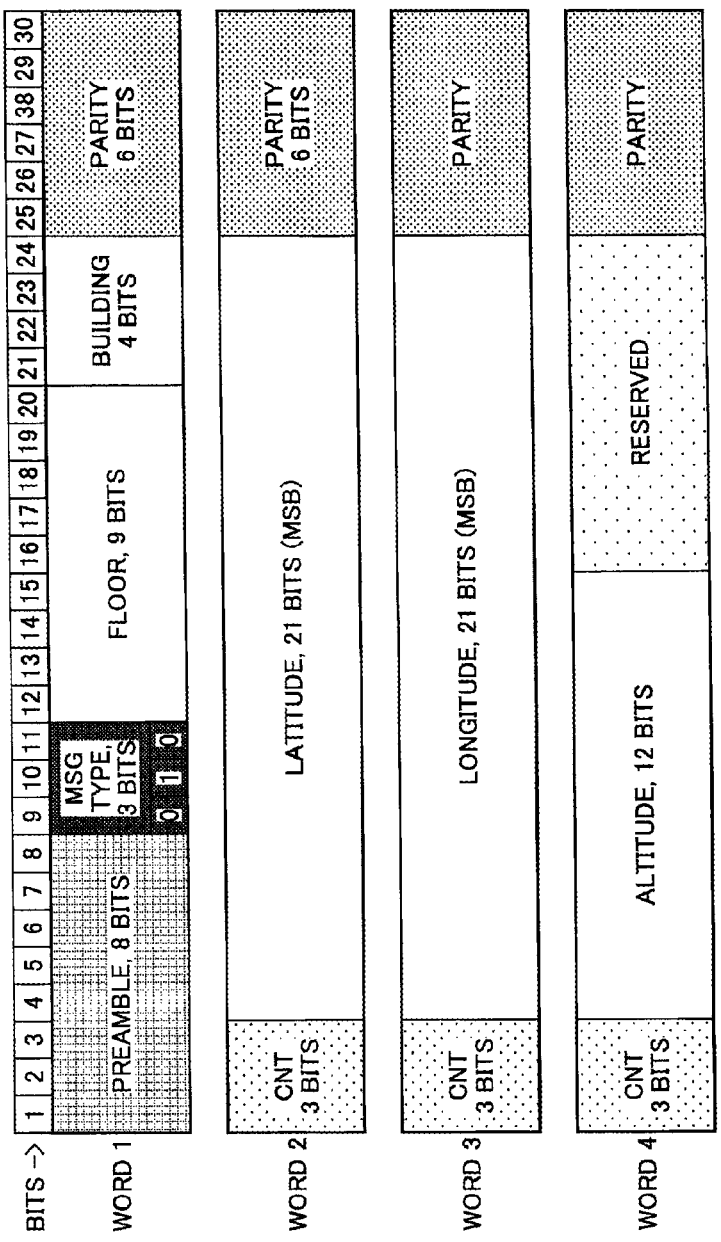
FIG. 49 is a schematic view illustrating a frame structure of an IMES message distributed by a distribution device if position information is set on the distribution device according to an embodiment of the invention.
Figure 50:
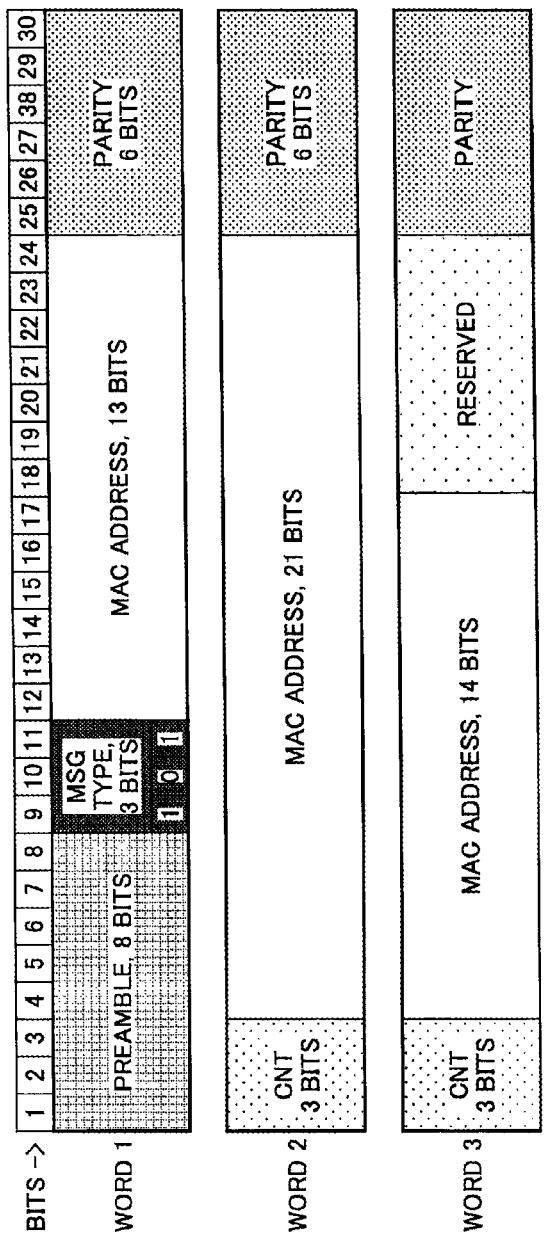
FIG. 50 is a schematic view illustrating a frame structure of an IMES message distributed by a distribution device if position information is not set on the distribution device according to an embodiment of the invention.

The frame structure and content of an IMES message depends on whether position information is set on the distribution device 3. The respective frame structures are shown in FIGS. 49-50. In either case, the frame structure of an IMES message is compliant with the IMES standard. A frame structure includes a 3-bit message (MSG) type field that defines the format of the frame structure.

<Frame Structure when Position Information is Set>

FIG. 49 is a schematic view illustrating the frame structure of an IMES message distributed by the distribution device 3 if position information is set on the distribution device 3 according to the present embodiment. If the distribution device 3 is set with position information, as shown in FIG. 49, the MSG Type is set to 010. The frame structure includes, as position information for the distribution device 3, fields for floor, building, latitude, longitude, altitude, and the like. The floor field is assigned to the bits 12-20 (bit length 9) in the first word, to represent the floor number on which the distribution device 3 is installed. The building field is assigned to the bits 21-24 (bit length 4) in the first word, to represent the number of a building in which the distribution device 3 is installed. The latitude field is assigned to the bits bit 4-24 (bit length 21) in the second word, to represent the latitude where the distribution device 3 is installed, with units of degrees. The longitude field is assigned to the bits bit 4-24 (bit length 21) in the third word, to represent the longitude where the distribution device 3 is installed, with units of degrees. The altitude field is assigned to the bits bit 4-15 (bit length 12) in the third word, to represent the altitude where the distribution device 3 is installed, with units of meters. The altitude field is used optionally.

<Frame Structure when Position Information is not Set>

FIG. 50 is a schematic view illustrating the frame structure of an IMES message distributed by the distribution device 3 if position information is not set on the distribution device 3 according to the present embodiment. If the distribution device 3 is not set with position information, as shown in FIG. 50, the MSG Type is set to 101. In this example, a MAC address (bit length 48) of the distribution device 3 is set in the first to third words in the frame structure. The MAC address is stored in the ROM 2020. Here, it is not limited to a MAC address, but other uniquely identifiable information of the distribution device 3 can be used, for example, a device ID.

Moreover, the frame structure and content of an IMES message is not limited to the ones shown in FIGS. 49-50. MSG Type used in FIGS. 49-50 are reserved setting values in the IMES standard.

The position information of the distribution device 3 is stored into the ROM 2020 of the IMES signal distribution unit 1250 in response to a setting request of position information by the management terminal 6. Here, the position information of the distribution device 3 may be stored into the storage unit 2900 before shipment of the distribution device 3 by a manufacturer, or after shipment when the electric device 2 is installed on the ceiling β by an installation engineer. Alternatively, the position information Xa may be set by receiving data with wireless communication from an external device, such as the management server 9, via the gateway 7, to the communication circuit 3040 of the wireless communication unit 1300, then storing the data into the ROM 2020 of the IMES signal distribution unit 1250 via the control unit 1100.

<Gateway Device>

The hardware configuration of the gateway device 7 according to the present embodiment is substantially the same as the one shown in FIG. 32; hence the explanation is omitted here.

<Management Server>

The hardware configuration of the management server 9 according to the present embodiment is the same as the one shown in FIG. 33; hence the explanation is omitted here.

<Authentication Server>

Figure 51:
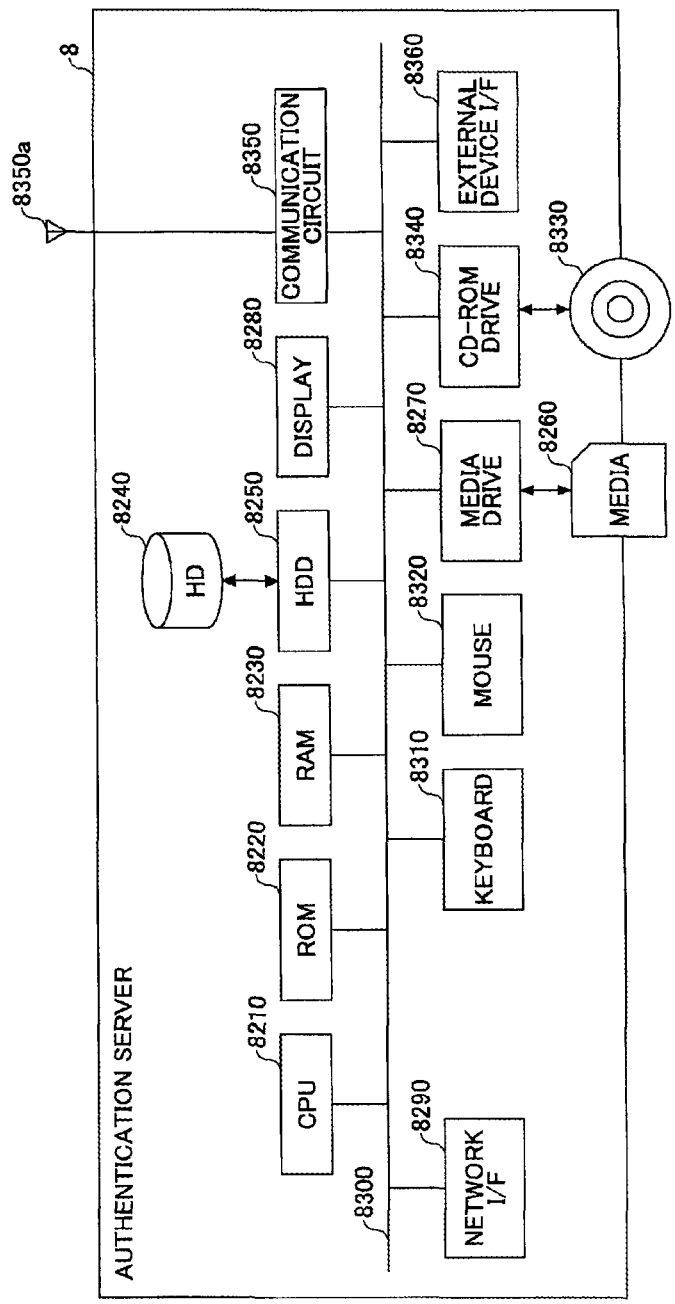
FIG. 51 is a hardware configuration diagram of an authentication server according to an embodiment of the invention.

FIG. 51 is a hardware configuration diagram of the authentication server 8 according to the present embodiment.

The authentication server 8 is configured with a computer. The authentication server 8 includes:

a CPU 8210 for controlling the overall behavior of the authentication server 8;

a ROM 8220 for storing programs to drive the CPU 8210 such as an IPL;

a RAM 8230 used for a work area for the CPU 8210;

an HD 8240 for storing various data used in the programs for the authentication server 8 and address information;

an HDD (Hard Disk Drive) 8250 for controlling read/write of data with the HD 8240 under control of the CPU 8210;

a media drive 8270 for controlling read/write of data with a recording medium 8260 such as a flash memory;

a display 8280 for displaying cursors, menus, windows, characters, images, and the like;

a network I/F 8290 for data communication using the communication network 905;

a keyboard 8310 with multiple keys for inputting characters, figures, and various commands;

a mouse 8320 for moving a cursor to select and/or execute various commands and objects to be processed;

another media drive for attachable/removable recording media, for example, a CD-ROM drive 8340 for controlling a read/write of data with a CD-ROM 8330;

a communication circuit 8350 and an antenna 8350a for wireless communication;

an I/F 8360 for connecting an external device; and a bus line 8300 including an address bus, a data bus, and the like for connecting the above parts with each other electrically.

Address information is intrinsic information to identify the authentication server 8. As the address information, for example, an IP address may be used. The ROM 8220 also stores the MAC address.

<Management Terminal>

Figure 52:
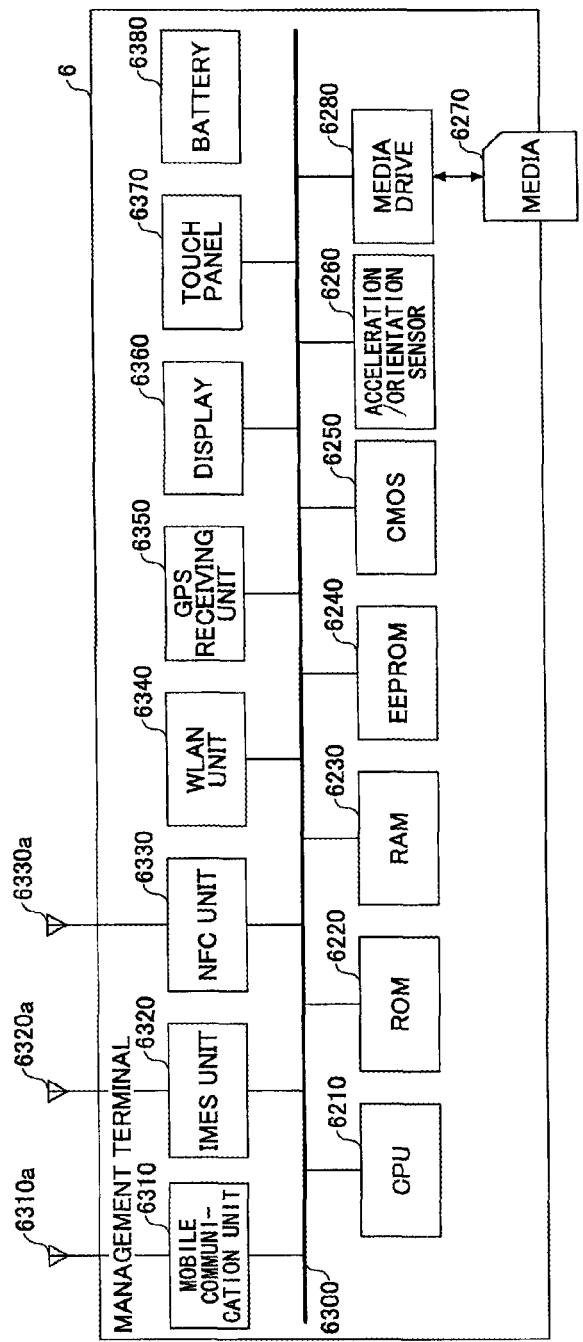
FIG. 52 is a hardware configuration diagram of a management terminal according to an embodiment of the invention.

FIG. 52 is a hardware configuration diagram of the management terminal 6 according to the present embodiment.

The management terminal 6 includes a CPU 6210 for controlling the overall behavior of the communication terminal 5h, a ROM 6220 for storing a BIOS, a RAM 6230 used for a work area for the CPU 6210, an EEPROM (Electrically Erasable and Programmable ROM) 6240 for reading/writing data under control of the CPU 6210, a CMOS (Complementary Metal Oxide Semiconductor) sensor 6250 for taking pictures to obtain image data under control of the CPU 6210, various acceleration/orientation sensors 6260 for detecting geomagnetism such as an electromagnetic compass, a gyrocompass, an acceleration sensor, or the like, and a media drive 6280 for controlling a read/write of data from/to a recording medium 6270 such as a flash memory. Under control of the media drive 6280, recorded data are read from the recording medium 6270, and new recording data are written to the recording media 6270, which is easily attachable to or detachable from the media drive 6280.

The EEPROM 6240 stores an OS executed by the CPU 6210, other programs, and various data. The CMOS sensor 6250 converts light to electric charges to obtain an electronic image of a subject, which may be a CCD (Charge Coupled Device) sensor instead.

In addition, the management terminal 6 includes:

a mobile communication unit 6310 for communicating with a nearby base station based on 3G or LTE (Long Term Evolution) mobile communication via an antenna 6310a;

an IMES unit 6320 for communicating with IMES signal via an antenna 6320a;

a NFC unit 6330 for NFC (Near Field Communication), such as Bluetooth, via an antenna 6330a;

a WLAN unit 6340 for communicating with a nearby access point 900 with wireless LAN communication based on the IEEE 802.11 standard;

a GPS receiving unit 6350 for receiving GPS signals from the GPS satellite 999;

a display 6360 such as an LCD or an organic EL display for displaying images of subjects or various icons;

a touch panel 6370 installed on the display 6360 for detecting a position touched by a finger or a touch pen with a pressure-sensitive or electrostatic panel; and a bus line 6300 including an address bus, a data bus, and the like for connecting the above parts with each other electrically.

The management terminal 6 also includes a dedicated battery 6380, which drives the management terminal 6. In addition to the above parts, the management terminal 6 may also include a microphone, a speaker, and the like to input/output sound.

<Function Configuration>

Figure 53:
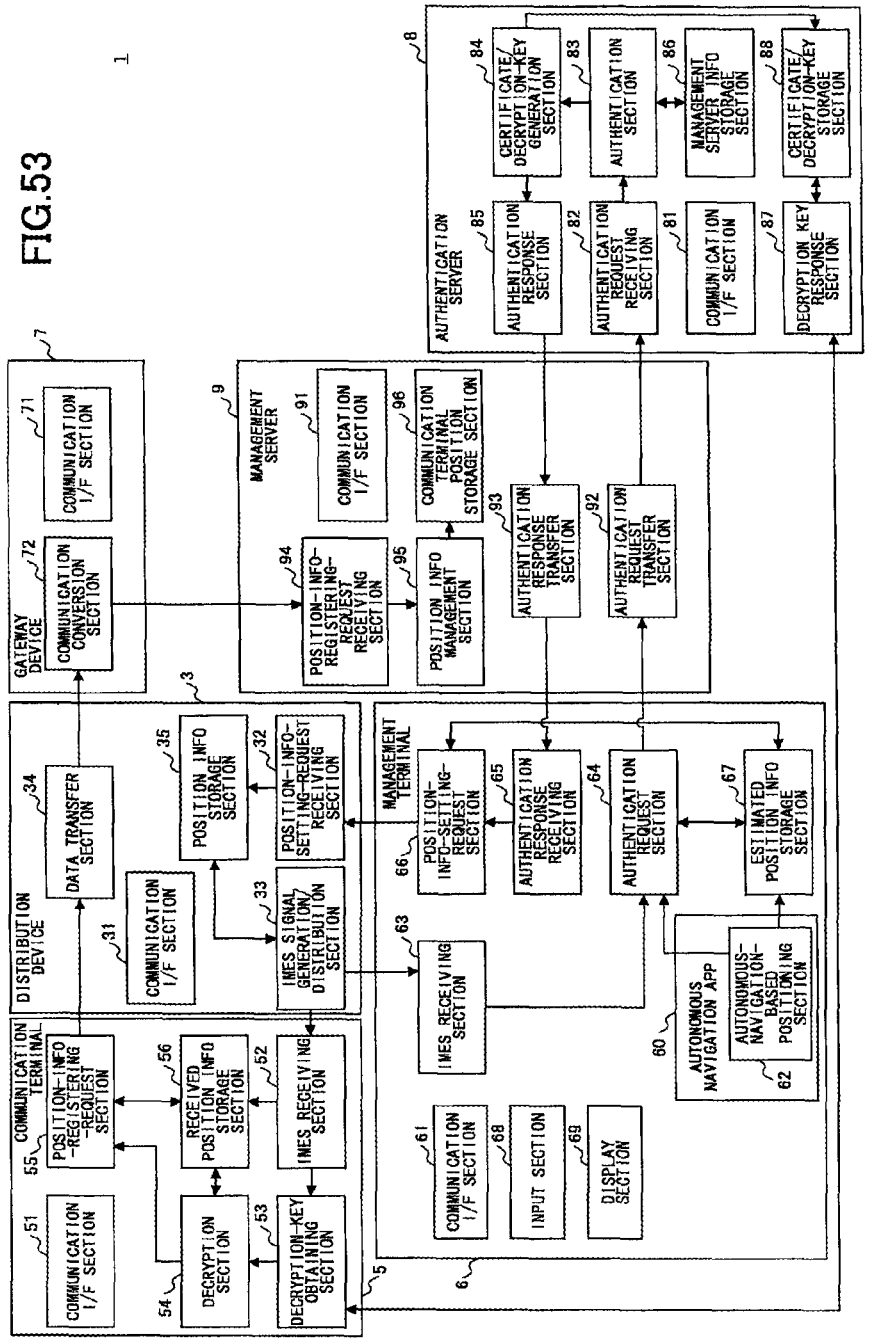
FIG. 53 is a functional configuration diagram of a position information setting system according to an embodiment of the invention.

FIG. 53 is a functional configuration diagram of the position information setting system 1 according to the present embodiment.

<Distribution Device>

The distribution device 3 includes a communication I/F section 31, a position-information-setting-request receiving section 32, an IMES signal generation/distribution section 33, a data transfer section 34, and a position information storage section 35.

The communication I/F section 31 is implemented with operations of the CPU 3010 and the communication circuit 3040, for communication based on the ZigBee standard.

The position information-setting-request receiving section 32 is implemented with operations of the CPU 3010 and the communication circuit 3040, to receive a setting request of position information sent by the management terminal 6, which is stored into the position information storage section 3500.

The IMES signal generation/distribution section 33 is implemented with operations of the CPU 2010 and the communication circuit 2040, to generate an IMES message, then to distribute the IMES message to a distributable area. Specifically, if a distribution device 3 is set with position information, the IMES signal generation/distribution section 33 generates an IMES message with the frame structure shown in FIG. 49, by reading position information stored into the ROM 2020 by the position information storage section 35. If a distribution device 3 is not set with position information, the IMES signal generation/distribution section 33 generates an IMES message with the frame structure shown in FIG. 50, by reading the MAC address of the distribution device 3 stored in the ROM 2020. Having generated the IMES message, the IMES signal generation/distribution section 33 distributes the generated IMES message to a predetermined area, with a predetermined cycle (for example, one-second cycle). Having distributed the IMES message including position information (FIG. 49), the IMES signal generation/distribution section 33 sends the certificate issued by the authentication server 8 and stored in the position information storage section 35, to a predetermined area.

The data transfer section 34 is implemented with operations of the CPU 3010 and the communication circuit 3040, to transfer a request for position information registration sent by the communication terminal 5 to the gateway device 7.

The position information storage section 35 is implemented with the ROM 2020, to store a certificate that guarantees genuineness of the position information with a right to set the position information.

<Management Terminal>

The management terminal 6 includes a communication I/F section 61, an autonomous-navigation-based positioning section 62, an IMES signal receiving section 63, an authentication request section 64, an authentication response receiving section 65, a position-information-setting-request section 66, an estimated position information storage section 67, an input section 68 and display section 69, and the like. The autonomous-navigation-based positioning section 62 is implemented with an autonomous navigation application 60.

The communication I/F section 61 is implemented with operations of the CPU 6210, the mobile communication unit 6310, the NFC unit 6330, and the WLAN unit 6340, to send/receive data with the distribution device 3, for example, with NFC (Near Field Communication) such as Bluetooth, and to send/receive data with the management server 9 with wireless LAN communication.

The autonomous-navigation-based positioning section 62 is implemented with operations of the CPU 6210 executing functions in the autonomous navigation application 60.

Figure 54:
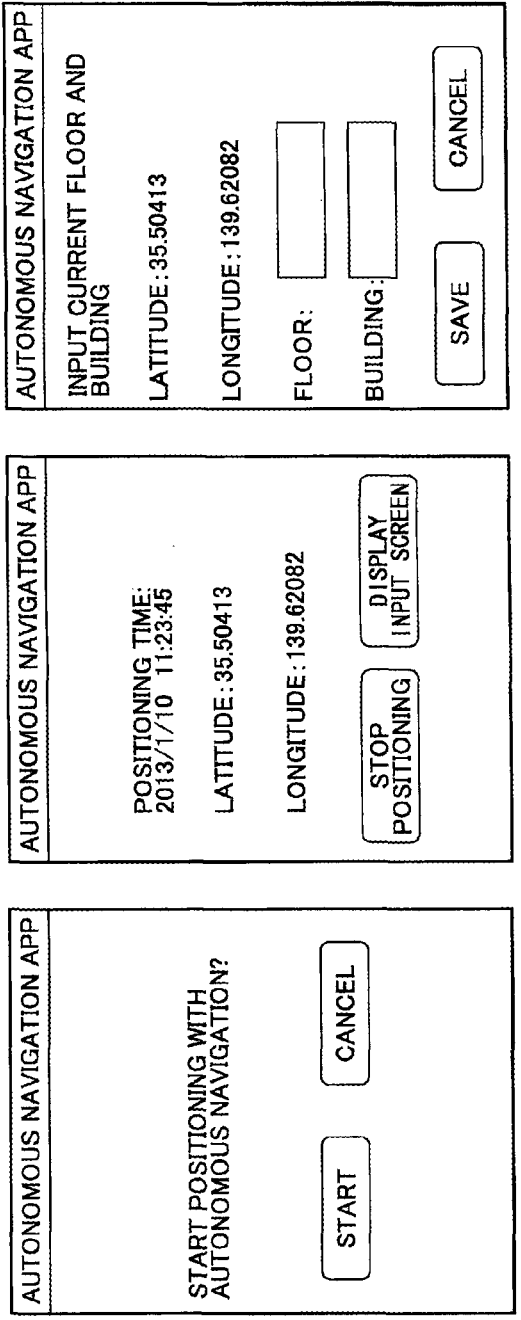
FIGS. 54A-54C are schematic views illustrating screens displayed by an autonomous navigation application according to an embodiment of the invention.

First, the autonomous-navigation-based positioning section 62 executes GPS positioning outdoors with the GPS receiving unit 6350, to obtain reference position information. Here, the reference position information is not limited to the one obtained by GPS positioning outdoors, but one obtained indoors may be used, for example, position information included in an IMES message distributed by a distribution device 3 that has been set with position information, position information obtained with positioning using wireless LAN access points or base stations in a mobile communication network. Having obtained the reference position information, the autonomous-navigation-based positioning section 62 calculates the position of the management terminal 6 when the management terminal 6 moves, by obtaining direction and acceleration information by an acceleration/orientation sensor 6260. Here, position information obtained with the autonomous-navigation-based positioning section 62 includes the latitude and longitude. The floor and building are manually set by an administrator. Functions executed by the autonomous navigation application 60, and screens to be displayed with the functions will be described below. FIGS. 54A-54C are schematic views illustrating screens displayed by the autonomous navigation application 60 according to the present embodiment. FIG. 54A shows a screen when the autonomous navigation application 60 starts up. If a "START" button shown in FIG. 54A is pushed, positioning with GPS and positioning with autonomous navigation start. FIG. 54B shows a screen displaying a positioning result by the autonomous navigation application 60. If a "STOP POSITIONING" button shown in FIG. 54B is pushed, the positioning based on autonomous navigation stops and the autonomous navigation application 60 ends. If a "DISPLAY INPUT SCREEN" button is pushed, a screen shown in FIG. 54C is displayed to receive "floor" and "building" corresponding to a current location of the management terminal 6 from an administrator as inputs. If a "SAVE" button is pushed after receiving the inputs, "floor" and "building" are stored into the position information storage section 67 along with the latitude and longitude obtained with positioning with autonomous navigation, which is indicated to the authentication request section 64.

Referring to FIG. 53 again, the IMES signal receiving section 63 is implemented with operations of the CPU 6210 and the IMES unit 6320, to receive a distributed IMES message. Upon receiving the IMES message, the IMES signal receiving section 63 indicates the ID information of the distribution device 3 to the authentication request section 64 if the received IMES message has the frame structure including the ID information of the distribution device 3 (MAC address) (FIG. 50), namely the distribution device 3 is not set with position information. If the received IMES message has the frame structure including the position information of the distribution device 3 (FIG. 49), the IMES signal receiving section 63, for example, discards the received IMES message.

The authentication request section 64 is implemented with operations of the CPU 6210, to generate a request for authentication to set position information on the distribution device 3, then to send the request to the authentication server 8 via the management server 9. The authentication request section 64 generates a request for authentication when receiving the ID information of the distribution device 3 from the IMES signal receiving section 63 after having indicated by the autonomous-navigation-based positioning section 62 that the estimated position information has been stored into the estimated position information storage section 67. The request for authentication includes the latitude, the longitude, and the ID information of the distribution device 3 in the position information stored in the estimated position information storage section 67. The authentication request section 64 sends the generated request for authentication to the management server 9 via the communication I/F section 61.

The authentication response receiving section 65 is implemented with operations of the CPU 6210, to receive a response to the request for authentication sent by the management server 9 via the communication I/F section 61. The response to the request for authentication includes an authentication result of the request, and a certificate issued by the authentication server 8 if the request is granted. A certificate is uniquely issued for each distribution device 3. Having received the authentication, the authentication response receiving section 65 directs the position-information-setting-request section 66 to set the position information on the distribution device 3.

The position-information-setting-request section 66 is implemented with operations of the CPU 6210, to generate a request for setting the position information on the distribution device 3 to the distribution device 3 along with the certificate included in the response.

The estimated position information storage section 67 stores the latitude and longitude obtained with positioning by the autonomous-navigation-based positioning section 62, and the floor and building received from the administrator via the screen shown in FIG. 54C into the RAM 6230.

The input section 68 receives inputs from a user (administrator) via the touch panel 6370.

The display section 69 displays information to a user (administrator) via the display 6360.

<Management Server>

The management server 9 includes a communication I/F section 91, an authentication request transfer section 92, an authentication response transfer section 93, a position-information-registering-request receiving section 94, a position information management section 95, a communication-terminal-position storage section 96, and the like.

The communication I/F section 91 is implemented with operations of the CPU 9010 and the communication circuit 9150, to send/receive data among the management terminal 6, the gateway device 7, and the authentication server 8.

The authentication request transfer section 92 is implemented with operations of the CPU 9010, to receive a request for authentication sent by the management terminal 6, to add ID information (for example, a MAC address) of itself, or the management server 9, to the received request for authentication, then to send it to the authentication server 8.

The authentication response transfer section 93 is implemented with operations of the CPU 9010, to send the request for authentication sent by the authentication server 8 to the management terminal 6.

The position-information-registering-request receiving section 94 is implemented with operations of the CPU 9010, to receive a request for registering position information including the ID information and the position information of the communication terminal 5, via the gateway device 7. The position-information-registering-request receiving section 94 indicates the received ID information and the position information of the communication terminal 5 to the position information management section 95.

The position information management section stores the ID information of the communication terminal 5 associating with the position information into the communication-terminal-position storage section 96 implemented with the HD 9040.

The communication-terminal-position storage section 96 stores the ID information of the communication terminal 5 associating with the position information into the HD 9040. FIG. 55 is a schematic view illustrating information stored in the communication-terminal-position storage section 96 of the management server 9 according to the present embodiment. As shown in FIG. 55, the communication-terminal-position storage section 96 includes fields for management ID, ID information, latitude, longitude, floor, building, received date-time, and the like. The management ID field represents a management ID to uniquely identify the position information of the communication terminal 5 in the communication-terminal-position storage section 96. The ID information field represents an ID to identify the communication terminal 5, for example, the MAC address of the communication terminal 5. The latitude, longitude, floor and building fields represent position information in the present embodiment, included in a request for registering position information sent from the communication terminal 5. The received date-time field represents received date and time when the management server 9 receives request for setting position information sent by the gateway device 7. As above, if a distribution device 3 is set with position information, the position information of the communication terminal 5 is managed that receives position information (IMES message) distributed by the distribution device 3.

<Authentication Server>

The authentication server 8 includes a communication I/F section 81, an authentication request receiving section 82, an authentication section 83, a certificate/decryption key generating section 84, an authentication response section 85, a management-server-information storage section 86, a decryption key response section 87, a certificate/decryption-key storage section 88, and the like.

The communication I/F section 81 is implemented with operations of the CPU 8210 and the communication circuit 8350, to send/receive data via a LAN.

The authentication request receiving section 82 is implemented with operations of the CPU 8210, to receive a request for authentication sent by the management server 9. The request for authentication includes the ID information of the distribution device 3, the estimated position information to be set on the distribution device 3 including the latitude and longitude, and the ID information of the management server 9.

The management-server-information storage section 86 stores in advance information about the management server 9 that has a right to set position information on the distribution device 3 into, for example, the HD 8240. FIG. 56 is a schematic view illustrating information stored in a management-server-information storage section 86 of the authentication server 8 according to the present embodiment. As shown in FIG. 56, the management-server-information storage section 86 includes fields for management server ID, management server ID information, managed building name, managed building address, and latitude and longitude information of east end, west end, south end, north end, and the like. The "management server ID" information field represents ID information (for example, a MAC address) to uniquely identify the management server 9. The "managed building name" field represents the name of the building where a distribution device 3 managed by the management server 9 is installed. The "managed building address" field represents the address of the building where a distribution device 3 managed by the management server 9 is installed. The "east end" and "west end" fields represent the (east) latitudes of the east end and west end, respectively, of the building where a distribution device 3 managed by the management server 9 is installed. The "south end" and "north end" field represents the (north) latitudes of the south end and north end, respectively, of the building where a distribution device 3 managed by the management server 9 is installed. In the example shown in FIG. 56, a distribution device 3 managed by a management server whose management server ID information is "00123456789a" is installed in a building called "FACILITY A" which is built on a rectangular area surrounded by the east end of 139.62101 deg.,
the west end of 139.62003 deg.,
the south end of 35.50540 deg., and
the north end of 35.50450 deg.

Here, these fields of "east end", "west end", "south end", and "north end" may be extracted from a reliable map whose genuineness is guaranteed, for example, a map issued by the Geographical Survey Institute in Japan, by referring to the name and address of the building in the map. Although the area of a building is assumed to be rectangular in the example above, it could be other shapes, for example, a polygon specified with multiple latitudes and longitudes.

Figure 57:
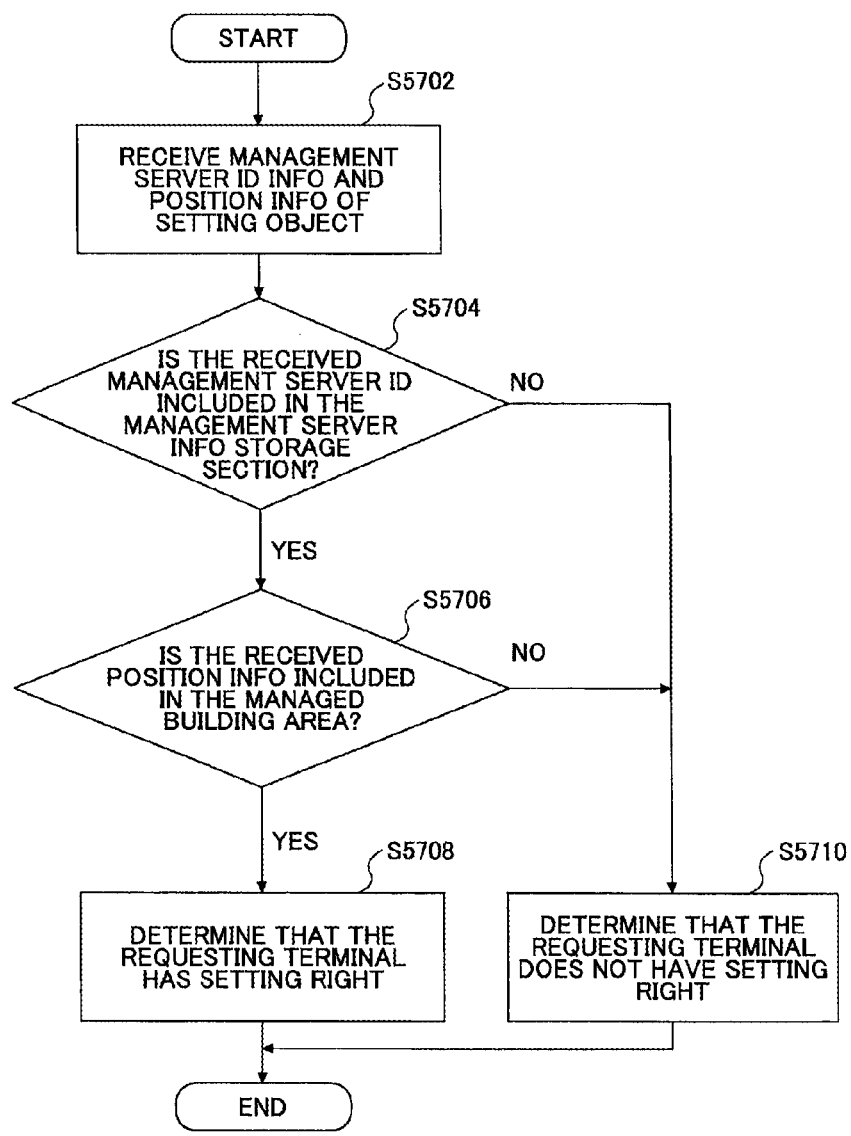
FIG. 57 is a flowchart of an authentication procedure on an authentication server according to an embodiment of the invention.

Referring to FIG. 53 again, the authentication section 83 is implemented with operations of the CPU 8210, to authenticate a right to set position information on a distribution device the authentication section 83 indicates the authentication result to the certificate/decryption key generating section 84. FIG. 57 is a flowchart of an authentication procedure executed by the authentication section 83.

As shown in FIG. 57, the authentication section 83 first receives management server ID information of the management server 9 and position information (latitude and longitude) of a distribution device 3 to be set, which is included in a request for authentication indicated by authentication request receiving section 82 (Step S5702).

Next, the authentication section 83 determines whether the received management server ID information of the management server 9 is included in the management server information storage section 86 (Step S5704). If included, it means that the request for authentication is sent via the management server 9 that has granted the setting position information on the distribution device 3, hence it can be regarded as a valid request, not an invalid request from a third party without a right to set.

If determining positive at the previous step (YES at Step S5704), the authentication section determines whether the received position information (latitude and longitude) is included in the managed building area that is stored in the management-server-information storage section 86 (Step S5706). If included, it turns out that the position information to be set is not wrong information.

If determining positive at the previous step (YES at Step S706), the authentication section 83 determines that the requesting management terminal 6 has the right to set (Step S5708).

On the other hand, if determining negative at Step S5704 or Step S706, the authentication section 83 determines that the requesting management terminal 6 does not have the right to set (Step S5710).

If a dedicated line, a VPN (Virtual Private Network), or the like, is used for communication between the management server 9 and the authentication server 8, the determination at Step S5704 above may be based on whether a request for authentication is sent via the dedicate line, the VPN, or the like.

Referring to FIG. 53 again, the certificate/decryption key generating section 84 is implemented with operations of the CPU 8210, to generate a certificate of genuineness of the position information to be set if it is determined that a requesting management terminal 6 has a right to set. A certificate is uniquely generated for the distribution devices 3 included in the request for authentication. The certificate includes an encrypted digital signature. The certificate/decryption key generating section 84 also generates a decryption key to decrypt the digital signature. The certificate/decryption key generating section 84, then, associates the generated certificate and decryption key with the ID information of the distribution device 3, to store the associated data into the certificate/decryption-key storage section 88. Having generated the certificate, the certificate/decryption key generating section 84 indicates the generated certificate to the authentication response section 85. If it is not determined that a requesting management terminal 6 has a right to set, the certificate/decryption key generating section 84 just indicates the authentication result to the authentication response section 85.

The authentication response section 85 is implemented with operations of the CPU 8210, to generate a response to a request for authentication, then to send the response to the management server 9. The response includes an authentication result and a certificate if generated.

The decryption key response section 87 is implemented with operations of the CPU 8210, to receive a request for a decryption key sent by a communication terminal 5, then to read the decryption key corresponding to the ID information of the distribution device 3 included in the request from the certificate/decryption-key storage section 88. Next, the decryption key response section 87 generates a response to the request that includes the read decryption key, then sends the response to the communication terminal 5.

The certificate/decryption-key storage section 88 associates the certificate and the decryption key with the ID information of the distribution device 3 included in the request for authentication, then stores the associated data into, for example, the HD 8240, the RAM 8230, or the like.

<Communication Terminal>

The communication terminal 5 includes a communication I/F section 51, an IMES signal receiving section 52, a decryption-key obtaining section 53, a decryption section 54, a position-information-registering-request section 55, a received position information storage section, and the like.

The communication I/F section 51 is implemented with operations of the CPU 5010 and the communication circuit 5040, to send/receive data with wireless LAN.

The IMES signal receiving section 52 is implemented with operations of the CPU 4010 and the communication circuit 4040, to receive an IMES message sent by a distribution device 3. If position information is included in the IMES message, the IMES signal receiving section 52 stores the position information into the received position information storage section 56. If receiving an IMES message including a certificate after receiving an IMES message including position information, the IMES signal receiving section 52 makes a request for the decryption key to the decryption-key obtaining section 53 to decrypt the digital signature included in the certificate.

The decryption-key obtaining section 53 is implemented with operations of the CPU 5010, to send the request for the decryption key to the authentication server 8 for obtaining the decryption key.

The decryption section 54 is implemented with operations of the CPU 5010, to decrypt the digital signature included in the certificate, then upon a successful decryption, directs the position-information-registering-request section 55 to register the position information.

The position-information-registering-request section 55 is implemented with operations of the CPU 5010, to generate a request for setting position information to the management server 9 to set position information of itself, then to send the generated request to the distribution device 3. The request for setting position information includes the ID information of the communication terminal 5 (for example, a MAC address) and position information to be stored into the received position information storage section 56.

<Gateway Device>

The gateway device 7 includes a communication I/F section 71, a communication conversion section 72, and the like.

The communication I/F section 71 is implemented with operations of the CPU 7010, the communication circuit 7040, the CPU 8010, and the I/F 8080b, to send/receive data with the distribution devices 3 and the management server 9.

The communication conversion section 72 is implemented with operations of the CPU 8010 and the Ethernet controller 8050. The communication conversion section 72 converts communication methods so that the data sent from a distribution device 3 can be transferred as packets in Ethernet.

<Operational Sequence>

Figure 58:
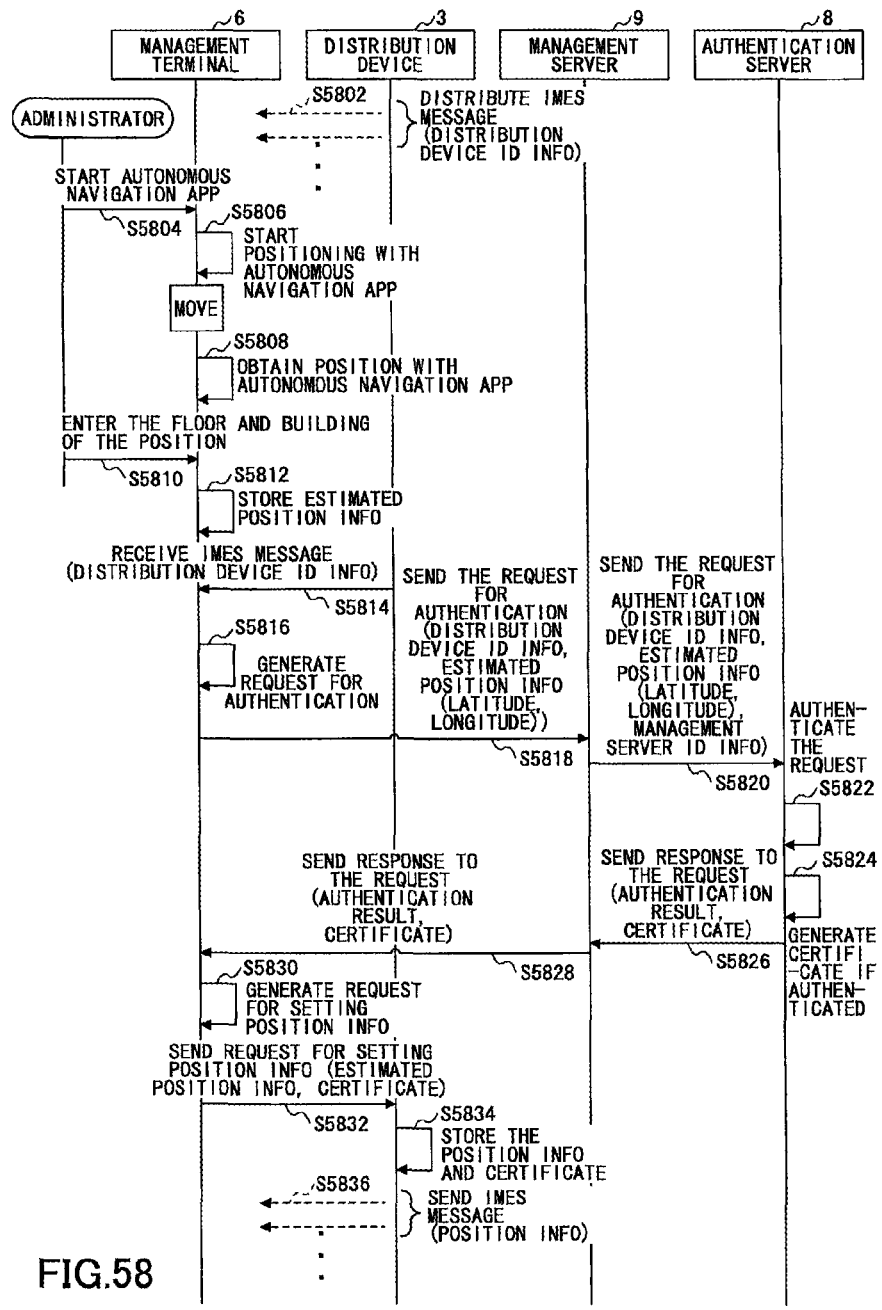
FIG. 58 is a sequence chart of operations executed by a position information setting system according to an embodiment of the invention.

Next, an operational sequence of the position information setting system 1 will be described in which position information is set on a distribution device 3 that has not been set with position information. FIG. 58 is a sequence chart of operations executed by the position information setting system 1 according to the present embodiment. In the sequence chart shown in FIG. 58, it is assumed that a distribution device 3 is not set with position information initially. Also assumed is that an administrator carrying a management terminal 6 with him is outdoors initially.

The IMES signal generation/distribution section 33 of the distribution device 3 distributes an IMES message including the ID information of the distribution device 3 to a predetermined area, with a predetermined cycle (for example, one-second cycle) because position information is not stored in the position information storage section 35 (Step S5802).

The administrator who carries the management terminal 6 operates the touch panel 6370 of the management terminal 6 to have the autonomous navigation application 60 start up and display a screen like the one shown in FIG. 54A, then pushes the "START" button to start positioning with autonomous navigation (Step S5804). The autonomous-navigation-based positioning section 62 obtains reference position information for autonomous navigation using GPS positioning, then starts positioning with autonomous navigation (Step S5806).

The administrator, outdoors, moves into the building in which the distribution device 3 is installed whose position information is to be set. When the administrator reaches the place where the distribution device 3 is installed, the autonomous-navigation-based positioning section 62 obtains the latitude and longitude of the position with positioning by autonomous navigation (Step S5808). Next, the administrator operates the touch panel 6370 of the management terminal 6 to input the floor and building of the position on the screen like the one shown in FIG. 54C, which is saved by pushing the "SAVE" button (Step S5810). Thus, the latitude and longitude obtained with positioning by autonomous navigation and the floor and building manually set by the administrator are stored into the estimated position information storage section 67 (Step S5812).

The IMES signal receiving section 63 of the management terminal 6 receives the IMES message distributed by the distribution device 3 at the predetermined cycle (Step S5814). The IMES message includes the ID information of the distribution device 3 because the distribution device 3 is not set with position information, as at Step S5802. The IMES signal receiving section 63 indicates the ID information of the distribution device 3 includes in the IMES message to the authentication request section 64.

The authentication request section 64 generates a request for authentication including the latitude and longitude stored in the estimated position information storage section 67, and the ID information of the distribution device 3 included in the received IMES message (Step S5816).

The authentication request section 64 sends the request for authentication to the management server 9 via the communication I/F section 61 (Step S5818).

The authentication request transfer section 92 of the management server 9 adds ID information of itself, or the management server 9, to the received request for authentication, then sends it to the authentication server 8 (Step S5820). If receiving the request for authentication, the authentication request receiving section 82 of the authentication server 8 indicates the received request for authentication to the authentication section 83.

The authentication section 83 determines whether the requesting management terminal 6 has a right to set position information on the distribution device 3 (Step S5822), based on the flowchart described with FIG. 57. If the management terminal 6 is determined to have the right by the authentication section 83, the certificate/decryption key generating section 84 generates a certificate (Step S5824). A certificate is uniquely generated for the distribution device 3, and is encrypted to be decrypted by a decryption key. The certificate/decryption key generating section 84 indicates the authentication result to the authentication response section 85 along with the certificate if generated. If the authentication result shows that the management terminal 6 does not have a right, no certificate is generated at Step S5824. The authentication response section 85 generates a response to the request for authentication with the authentication result and the certificate if generated, then sends the response to the management server 9 (Step S5826).

Receiving the response to the request for authentication, the authentication response transfer section 93 of the management server 9 sends the response to the requesting management terminal 6 (Step S5828).

Receiving the authentication result and the certificate, the authentication response receiving section 65 of the management terminal 6 indicates the response to the position-information-setting-request section 66. If authorized with the response, the position-information-setting-request section 66 generates a request for setting position information including the position information (latitude, longitude, floor, and building) stored in the estimated position information storage section 67 and the received certificate (Step S5830). Next, the position-information-setting-request section 66 sends the request for setting position information to the distribution device 3 with NFC (Near Field Communication) (Step S5832).

Receiving the request for setting position information, the position information-setting-request receiving section 32 of the distribution device 3 stores the position information and certificate included in the request into the position information storage section 35 (Step S5834). Next, the IMES signal generation/distribution section 33 reads position information stored in the position information storage section 35, then distributes an IMES message including the position information of the distribution device 3 (see FIG. 49) to a predetermined area, with a predetermined cycle (for example, one-second cycle) (Step S5836).

With the operational sequence above, the position information setting system 1 can set position information on a distribution device 3 that has not been set with position information, using the position information obtained with positioning by autonomous navigation if the management terminal 6 is determined to have a right to set the position information on a distribution device 3, and the genuineness of the position information is confirmed.

By using autonomous navigation indoors, it is possible for an administrator to obtain estimated position information to be set on a distribution device 3 even if position information of the distribution device 3 is not known because the latitude and longitude indoors can be obtained with autonomous navigation without receiving a GPS signal or without a detailed map of the position where the distribution device 3 is located.

Also, by determining the right to set position information on a distribution device 3 by a management terminal 6, it is possible to prevent an unauthorized third party from illegally setting position information.

Also, by determining genuineness of position information to be set on the distribution device 3, it is possible to prevent a wrong position from being set. Thus, the distribution device 3 can be set with highly precise position information, with which position information of a communication terminal 5 can be managed accurately.

Modified Example 1

In this modified example 1, an authentication server 8 is omitted because authentication is not executed. This makes the configuration of a position information setting system 1 simpler. Here, the management server 9 includes functions executed by the certificate/decryption key generating section 84 in the previous embodiments.

Figure 59:
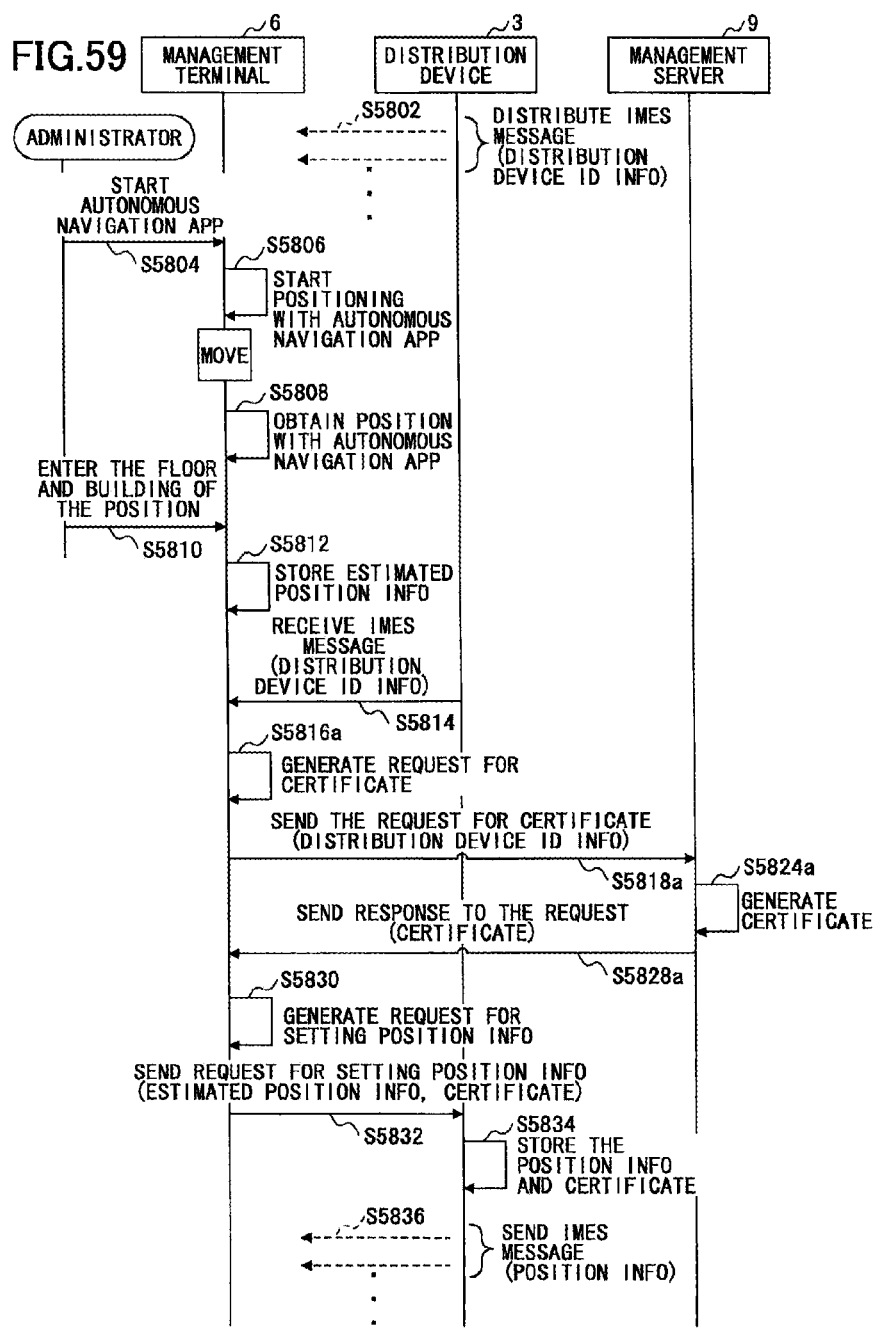
FIG. 59 is a sequence chart of operations executed by a position information setting system according to a modified example of an embodiment of the invention.

FIG. 59 is a sequence chart of operations executed by the position information setting system 1 according to the modified example 1. In FIG. 59, the same numerical codes are assigned as in FIG. 58 for the same steps, and their detailed descriptions are omitted here.

Steps S5802-S5814 are the same as in FIG. 58.

If the IMES signal receiving section 63 of the management terminal 6 receives an IMES message including the ID information of the distribution device 3 (Step S5814), the authentication request section 64 generates a request for issuing a certificate including the ID information of the distribution device 3 (Step S5816a). Next, the management terminal 6 sends the request to the management server 9 (Step S5818a). Receiving the request, the management server 9 generates a certificate for the distribution device 3 included in the request for issuing certificate (Step S5824a).

Next, the management server 9 sends a response to the request for issuing a certificate including the generated certificate to the management terminal 6 (Step S5828a). Steps after S5830 are the same as in FIG. 58.

If simpler usage is needed, a certificate may not be used in the position information setting system 1.

According to the modified example 1, the position information setting system 1 can be configured easier than in the previous embodiments because an authentication server 8 is not needed, which reduces the cost for hardware.

Modified Example 2

In this modified example 2, a distribution device 3 is configured so that a distinction can be made whether position information set on a distribution device 3 is position information obtained by a request for setting position information by a management terminal 6, or position information set by an administrator manually. The 3-bit MSG Type field of an IMES message is used for identifying the distinction as shown in FIG. 60. In addition, a communication terminal 5 or a management terminal 6, which is a receiver of an IMES message, may be configured so that the message type is, for example, displayed on the display unit of the terminal. Moreover, for example, a request for setting position information generated by a communication terminal 5 may include the message type.

FIG. 60 is a table for operations executed by the position information setting system 1 according to the modified example 2. As shown in FIG. 60, a MSG Type of 110 designates that position information set on a distribution device 3 is based on estimated position information obtained by a request for setting position information by a management terminal 6, whereas a MSG Type of 010 designates that position information set on a distribution device 3 has been set by an administrator manually. The other fields of the frame structure are the same as shown in FIG. 49.

According to the modified example 2, position information can be managed with a distinction indicating whether position information is estimated position information obtain by autonomous navigation, or position information is set by an administrator preferably with higher precision.

The invention has been described as above with preferred embodiments and examples. The invention, however, is not limited to these embodiments and examples, but various variations and modifications may be made without departing from the scope of the invention. The embodiments, examples, variations, and modifications may be combined if necessary.

The present application is based on and claims the benefit of priority of Japanese Priority Application NO. 2012-144140 filed on Jun. 27, 2012, and Japanese Priority Application NO. 2013-052514 filed on Mar. 14, 2013, with the Japanese Patent Office, the entire contents of which are hereby incorporated by reference.

What is claimed is:

1. A communication system comprising:
a wireless terminal;
an authentication server;
a communication device configured to communicate with the wireless terminal position information indicative of a position of the communication device;
wherein the communication device includes
a first storage medium configured to store the position information of the communication device, and a certificate to guarantee correctness of the position information, the certificate being issued upon the position information being authenticated by an authentication server,
a transmitter configured to send the position information and the certificate, and a controller configured to control the transmitter so that the position information stored in the first storage medium is sent to the wireless terminal along with the certificate;

wherein the wireless terminal includes
   a second storage medium configured to store a decryption key to decrypt the certificate, the decryption key being issued along with the certificate,
   a receiver configured to receive the position information from the communication device, and the certificate, and
   a decrypter configured to decrypt the certificate received by the receiver, with the decryption key stored in the second storage medium; and the wireless terminal is configured to
   obtain position information outdoors and indoors depending on a place of the wireless terminal,
   transmit the obtained position information to the communication device when the wireless terminal detects a change of acceleration, and
   when positional information is not set on the communication device,
   the wireless terminal is configured to
      activate an autonomous navigation application installed on the wireless terminal to start positioning by autonomous navigation,
      transmit a request for authentication to set positional information positioned by the autonomous navigation on the communication device to the authentication server,
      receive a response to the authentication request from the authentication server, and
      transmit a request for setting positional information including the positional information positioned by the autonomous navigation to the communication device.

2. The communication system as claimed in claim 1, wherein the wireless terminal is configured to send estimated position information of the communication device to a management server configured to manage the position information of the wireless terminal,
   wherein upon receiving the estimated position information, the management server is configured to obtains the certificate.

3. The communication system as claimed in claim 2, wherein the management server is configured to send a request for authentication of the estimated position information to the authentication server to obtain the certificate.

4. The communication system as claimed in claim 2, wherein the estimated position information of the communication device is obtained with positioning by autonomous navigation executed on the wireless terminal.

5. The communication system as claimed in claim 1, wherein the wireless terminal is configured to
   make a request for authentication of a right to set the position information on the communication device to the authentication server, and
   set the position information on the communication device if the authentication server authenticates that the wireless terminal has the right to set the position information on the communication device.

6. The communication system as claimed in claim 1, wherein the authentication server is configured to issue the certificate if the authentication device determines that the wireless terminal has a right to set the position information on the communication device, and wherein the wireless terminal is configured to set the issued certificate on the communication device.

7. The communication system as claimed in claim 1, wherein the wireless terminal is configured to obtain, as the outdoor position information, GPS position information, and as the indoor position information, position information based on direction information and acceleration information obtained by an inertia sensor provided in the wireless terminal.

8. The communication system as claimed in claim 1, wherein
the communication device is configured to set the positional information positioned by the autonomous navigation into itself, the positional information being included in the request for setting positional information received from the wireless terminal.

9. A method for operating a wireless terminal, comprising:
receiving, using at least one processor of the wireless terminal, position information from a communication device, and a certificate to guarantee correctness of the position information, the certificate being issued upon the position information being authenticated by an authentication server, the position information indicative of a position of the communication device;
storing on a second storage medium of the wireless terminal, using the at least one processor, a decryption key to decrypt the certificate, the decryption key being issued along with the certificate;
decrypting, using the at least one processor, the certificate with the decryption key;
obtaining, using the at least one processor, position information outdoors and indoors depending on a place of the wireless terminal;
transmitting, using the at least one processor, the obtained position information to the communication device when the wireless terminal detects a change of acceleration; and
when positional information is not set on the communication device,
   activating, using the at least one processor, an autonomous navigation application installed on the wireless terminal, to start positioning by autonomous navigation,
   transmitting, using the at least one processor, a request for authentication to set positional information positioned by the autonomous navigation on the communication device to the authentication server,
   receiving, using the at least one processor, a response to the authentication request from the authentication server, and
   transmitting, using the at least one processor, a request for setting positional information including the positional information positioned by the autonomous navigation to the communication device.

10. The method as claimed in claim 9, further comprising:
transmitting estimated position information of the communication device to a management server configured to manage the position information of the wireless terminal, wherein upon receiving the estimated position information, the management server obtains the certificate.

11. The method as claimed in claim 10, wherein the management server sends a request for authentication of the estimated position information to the authentication server to obtain the certificate.

12. The method as claimed in claim 10, wherein the estimated position information of the communication device is obtained with positioning by autonomous navigation executed on the wireless terminal.

13. The method as claimed in claim 9, further comprising:
transmitting, using the at least one processor, a request for authentication of a right to set the position information on the communication device to the authentication server; and
setting, using the at least one processor, the position information on the communication device if the authentication server authenticates that the wireless terminal has the right to set the position information on the communication device.

14. The method as claimed in claim 9, further comprising:
setting, using the at least one processor, the issued certificate on the communication device when the authentication server issues the certificate in response to determining that the wireless terminal has a right to set the position information on the communication device.

15. The method as claimed in claim 9, further comprising:
obtaining, using the at least one processor, as the outdoor position information GPS position information, and as the indoor position information, position information based on direction information and acceleration information obtained by an inertia sensor provided in the wireless terminal.

16. The method as claimed in claim 9, further comprising:
setting, using the at least one processor, the positional information positioned by the autonomous navigation into itself, the positional information being included in the request for setting positional information received from the wireless terminal.

\* \* \* \* \*